US012757007B2

(12) United States Patent
Wu et al.

(10) Patent No.: US 12,757,007 B2
(45) **Date of Patent: *Oct. 6, 2026**

(54) PCF DETERMINING METHOD, APPARATUS, AND SYSTEM

(71) Applicant: Huawei Technologies Co., Ltd., Shenzhen (CN)

(72) Inventors: Yizhuang Wu, Beijing (CN); Chunshan Xiong, Shenzhen (CN); Haiyang Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 125 days.

This patent is subject to a terminal disclaimer.

(21) Appl. No.: 17/334,233

(22) Filed: May 28, 2021

(65) Prior Publication Data

US 2021/0360379 A1 Nov. 18, 2021

Related U.S. Application Data

(63) Continuation of application No. 16/851,584, filed on Apr. 17, 2020, now Pat. No. 11,026,080, which is a (Continued)

(30) Foreign Application Priority Data

Oct. 17, 2017 (CN) ......................... 201710967538.3
Nov. 21, 2017 (CN) ......................... 201711168274.1

(51) Int. Cl.
*H04W 8/14* (2009.01)
*H04W 28/06* (2009.01)

(52) U.S. Cl.
CPC ............. *H04W 8/14* (2013.01); *H04W 28/06* (2013.01)

(58) Field of Classification Search
CPC ................................ H04W 8/14; H04W 28/06
See application file for complete search history.

(56) References Cited

U.S. PATENT DOCUMENTS 6,034,634 A 3/2000 Karlsson et al.
11,026,080 B2 * 6/2021 Wu ....................... H04W 28/06

(Continued)

FOREIGN PATENT DOCUMENTS

CN 1436414 A 8/2003
CN 103220721 A 7/2013

(Continued)

OTHER PUBLICATIONS

Qualcomm Incorporated, "TS23.502: Procedures for CM-CONNECTED with RRC inactive state," SA WG2 Meeting #S2-122, Jun. 26-30, 2017, San Jose Del Cabo, Mexico, S2-174472, 14 pages.

(Continued)

*Primary Examiner* — Steven S Kelley

(57) ABSTRACT

A PCF determining method includes: receiving, by a first AMF, PCF identification information sent by a second AMF, and obtaining, by the first AMF, policy information from a target PCF when at least one PCF corresponding to the PCF identification information includes the target PCF, where the PCF identification information includes identification information of at least one first PCF, where the identification information of the first PCF includes at least one of an IP address of the first PCF, an IP prefix of the first PCF, or an FQDN of the first PCF, where the first AMF is an AMF providing a service for the terminal to access a network this time, and where the second AMF is an AMF providing a service for the terminal to access a network last time.

19 Claims, 20 Drawing Sheets

Related U.S. Application Data continuation of application No. PCT/CN2018/109219, filed on Sep. 30, 2018.

(56) References Cited

U.S. PATENT DOCUMENTS

| | | | | |
|---|---|---|---|---|
| 2005/0025116 | A1 | 2/2005 | Chen et al. | |
| 2007/0223452 | A1 | 9/2007 | Semper | |
| 2017/0142591 | A1 | 5/2017 | Vrzic et al. | |
| 2017/0288972 | A1 | 10/2017 | Li et al. | |
| 2018/0270840 | A1* | 9/2018 | Griot | H04L 41/0806 |
| 2018/0376445 | A1 | 12/2018 | Yoon et al. | |
| 2019/0007500 | A1* | 1/2019 | Kim | H04L 67/141 |
| 2019/0037636 | A1 | 1/2019 | Kim et al. | |
| 2019/0053117 | A1 | 2/2019 | Bae et al. | |
| 2019/0053147 | A1 | 2/2019 | Qiao et al. | |
| 2019/0116520 | A1* | 4/2019 | Chaponniere | H04W 4/20 |
| 2020/0059989 | A1* | 2/2020 | Velev | H04W 8/08 |
| 2020/0107256 | A1* | 4/2020 | Nilsson | H04W 8/22 |
| 2021/0153018 | A1* | 5/2021 | Fernandez Alonso | H04W 28/06 |
| 2022/0094566 | A1* | 3/2022 | Deshpande | H04M 15/66 |

FOREIGN PATENT DOCUMENTS

| | | | |
|---|---|---|---|
| CN | 107018542 | A | 8/2017 |
| EP | 2456278 | A1 | 5/2012 |
| RU | 2488237 | C2 | 7/2013 |
| WO | 2017142362 | A1 | 8/2017 |
| WO | 2018206429 | A1 | 11/2018 |
| WO | 2019211496 | A1 | 11/2019 |

OTHER PUBLICATIONS

LG Electronics, "De-registration procedure (TS 23.502)," 3GPP Draft; S2-170079, Jan. 16, 2017, XP051216266, 5 pages.

QUALCOMM Incorporated, "TS23.502: Procedures for CM-CONNECTED with RRCinactive state," 3GPP Draft; S2-1 4472-23502, Jun. 25, 2017, XP051303319, 14 pages.

Ericsson, et al., "23.502: PCF Services information in call flows." SA WG2 Meeting #122bis, Aug. 21-25, 2017, Sophia Antipolis, France, S2-176207, 43 pages.

3GPP TS 23.501 V1.4.0, "3rd Generation Partnership Project; Technical Specification Group Services and System Aspects; System Architecture for the 5G System; Stage 2 (Release 15)," Sep. 2017, 151 pages.

3GPP TS 23.502 V1.2.0, "3rd Generation Partnership Project; Technical Specification Group Services and System Aspects; Procedures for the 5G System; Stage 2 (Release 15)," Sep. 2017, 165 pages.

SA WG2 Meeting #121, S2-173006, Ericsson"23.501: SMF Service Areas," May 15-19, 2017, Hangzhou, China, 13 pages.

SA WG2 Meeting #122, S2-174591, LG Electronics, "TS 23.502: DN authorization and PDU session anchor relocation," May 26-30, 2017, San Jose Del Cabo, Mexico, 11 pages.

SA WG2 Meeting #122Bis, S2-176082, TS 23.502: Proactive notification of UE reachability toward SMF, Samsung, Aug. 21-25, 2017, Sophia Antipolis, France, 8 pages.

* cited by examiner

PCF DETERMINING METHOD, APPARATUS, AND SYSTEM

CROSS-REFERENCE TO RELATED APPLICATIONS

This application is a continuation of U.S. patent application Ser. No. 16/851,584, filed on Apr. 17, 2020, which is a continuation of International Patent Application No. PCT/CN2018/109219, filed on Sep. 30, 2018, which claims priority to Chinese Patent Application No. 201711168274.1, filed on Nov. 21, 2017 and Chinese Patent Application No. 201710967538.3, filed on Oct. 17, 2017, all of which are hereby incorporated by reference in their entireties.

TECHNICAL FIELD

Embodiments of the present application relate to the field of communications technologies, and in particular, to a policy control function (PCF) determining method, an apparatus, and a system.

BACKGROUND

With rapid development of communications technologies, a network in which a 5th generation (5G) mobile communications technology is used (which may be referred to as a 5G network herein) is being designed, researched, and developed. To satisfy different service requirements of a terminal, different policy control services may be provided to the terminal.

Currently, in a 5G network, a policy control function (PCF) may be configured for a terminal to provide different policy control services to the terminal. A method for determining a PCF serving a terminal may include the following steps. In a process in which a terminal accesses a 5G network and is registered with the network, an access and mobility management function (AMF) in a 5G communications system may determine a PCF. Specifically, the AMF interacts with a network function (NF) repository function (NRF) that is in the communications system and that stores PCF information, to find PCFs (that is, to obtain information about the PCFs from the NRF), and selects an appropriate PCF to serve the terminal. Alternatively, after a terminal accesses a network, in a process in which the terminal establishes a packet data unit (PDU) session with the network, a session management function (SMF) in the communications system may determine a PCF. Specifically, the SMF interacts with an NRF to find PCFs (that is, to obtain information about the PCFs from the NRF), and selects an appropriate PCF to serve the terminal.

However, in the foregoing method for determining a PCF by an AMF, each time a terminal accesses a network, an AMF needs to interact with an NRF to obtain a PCF. As a result, signaling overheads required for determining the PCF are relatively high. In the foregoing method for determining a PCF by an SMF, in a process in which a terminal accesses a network, an AMF has selected a PCF, and then in a process in which the terminal establishes a PDU session with the network, an SMF also needs to interact with an NRF to determine a PCF. As a result, signaling overheads required for determining the PCF are relatively high.

SUMMARY

This application provides a PCF determining method, an apparatus, and a system, to reduce, to some extent, signaling overheads required for determining a PCF.

To achieve the foregoing objective, the following technical solutions are used in this application.

According to a first aspect, a PCF determining method is provided. The method is applied to a process in which a terminal accesses a network, and the method may include receiving, by a first AMF, PCF identification information sent by a second AMF, and obtaining, by the first AMF, policy information from a target PCF when at least one first PCF corresponding to the PCF identification information includes the target PCF, where the PCF identification information includes identification information of at least one first PCF, where the first AMF is an AMF providing a service for the terminal to access a network this time, and where the second AMF is an AMF providing a service for the terminal to access a network last time.

Based on the PCF determining method provided in this application, in the process in which the terminal accesses the network, the first AMF providing a service for the terminal to access the network this time may receive the PCF identification information sent by the second AMF providing a service for the terminal to access the network last time, and the first AMF obtains the policy information from the target PCF when the at least one first PCF corresponding to the PCF identification information includes the target PCF. Therefore, the first AMF does not need to interact with an NRF to determine the target PCF, thereby reducing, to some extent, signaling overheads required for determining the PCF.

In a first optional implementation of the first aspect, the PCF determining method provided in this application may further include determining, by the first AMF, the target PCF based on PCF information when the at least one first PCF corresponding to the PCF identification information does not include the target PCF, where the PCF information includes identification information of at least one second PCF.

In this application, when the at least one first PCF corresponding to the PCF identification information does not include the target PCF, the first AMF may determine the target PCF based on the PCF information obtained using another method, thereby ensuring that the terminal smoothly accesses the network.

In a second optional implementation of the first aspect, after the receiving, by a first AMF, PCF identification information sent by a second AMF, the PCF determining method provided in this application may further include determining, by the first AMF, whether the at least one first PCF corresponding to the PCF identification information includes the target PCF.

In a third optional implementation of the first aspect, the PCF information is obtained by the first AMF from a network function repository function NRF; or the PCF information is stored in the first AMF.

In a fourth optional implementation of the first aspect, the PCF determining method provided in this application may further include sending, by the first AMF, first indication information to the second AMF, where the first indication information is used to notify the second AMF that the first AMF determines the target PCF in the at least one first PCF corresponding to the PCF identification information. Alternatively, the first indication information is used to instruct the second AMF when receiving a terminal context management deletion notification sent by a unified data management (UDM) function, to delete a terminal context stored in the second AMF and reserve the terminal context stored in the target PCF.

In this application, when the first AMF determines to use the PCF of the at least one first PCF corresponding to the PCF identification information, because the first indication information sent by the first AMF to the second AMF may be used to instruct the second AMF to reserve the terminal context stored in the target PCF, the first AMF may obtain the policy information from the target PCF.

In a fifth optional implementation of the first aspect, the PCF determining method provided in this application may further include sending, by the first AMF, first indication information to the second AMF, where the first indication information is used to indicate, to the second AMF, that the target PCF is different from the first PCF. Alternatively, the first indication information is used to instruct the second AMF when receiving a terminal context management deletion notification sent by a UDM function, to delete, based on the first indication information, a terminal context stored in the second AMF and delete a terminal context stored in the at least one first PCF corresponding to the PCF identification information.

In a sixth optional implementation of the first aspect, the PCF determining method provided in this application may further include sending, by the first AMF, second indication information to the target PCF, where the second indication information is used to instruct the target PCF to update the terminal context.

In this application, the second indication information may be used to instruct the target PCF to update the terminal context. Therefore, the target PCF may interact with a corresponding AMF based on the updated terminal context, in order to ensure that the terminal smoothly accesses the network.

In a seventh optional implementation of the first aspect, the PCF determining method provided in this application may further include sending, by the first AMF, third indication information to the target PCF, where the third indication information is used to instruct the target PCF to stop sending the policy information to the first AMF, or the third indication information is used to instruct the target PCF to send the policy information to the first AMF.

In this application, the first AMF may further obtain the policy information from the second AMF, and when the policy information obtained by the first AMF is available, the third indication information may be used to instruct the target PCF to stop sending the policy information to the first AMF. To be more specific, the target PCF does not send the policy information to the first AMF, thereby saving transmission resources. When the policy information obtained by the first AMF is unavailable, the third indication information may be used to instruct the target PCF to send the policy information to the first AMF, thereby ensuring that the terminal smoothly accesses the network.

In an eighth optional implementation of the first aspect, each of the network accessed by the terminal this time and the network accessed by the terminal last time is a home public land mobile network (HPLMN); and the target PCF is a target home PCF (H-PCF), and the target H-PCF is a PCF in the HPLMN.

In a ninth optional implementation of the first aspect, each of the network accessed by the terminal this time and the network accessed by the terminal last time is a same visited public land mobile network or visited public land mobile network (VPLMN). Additionally, the target PCF includes a target H-PCF and a target visited PCF (V-PCF), the at least one first PCF corresponding to the PCF identification information includes at least one H-PCF and at least one V-PCF, the target H-PCF is a PCF in an HPLMN, and the target V-PCF is a PCF in the VPLMN.

In a tenth optional implementation of the first aspect, when the target PCF includes the target H-PCF and the target V-PCF, the sending, by the first AMF, second indication information to the target PCF may include sending, by the first AMF, second indication information to the target V-PCF, where the second indication information is used to instruct the target V-PCF to update the terminal context.

In an eleventh optional implementation of the first aspect, the network accessed by the terminal last time is a first VPLMN, and the network accessed by the terminal this time is a second VPLMN; or the network accessed by the terminal last time is an HPLMN, and the network accessed by the terminal this time is a VPLMN; and the target PCF includes a target H-PCF and a target V-PCF, the at least one first PCF corresponding to the PCF identification information includes at least one H-PCF, and the target H-PCF is a PCF in an HPLMN.

The PCF determining method provided in this application may further include: obtaining, by the first AMF, V-PCF information from the NRF, and determining the target V-PCF based on the V-PCF information; or determining, by the first AMF, the target V-PCF based on V-PCF information stored in the first AMF.

In a twelfth optional implementation of the first aspect, when the target PCF includes the target H-PCF and the target V-PCF, the sending, by the first AMF, second indication information to the target PCF may include sending, by the first AMF, identification information of the target H-PCF and the second indication information to the target V-PCF, where the identification information of the target H-PCF and the second indication information are used by the target V-PCF to instruct the target H-PCF to update the terminal context.

In a thirteenth optional implementation of the first aspect, the network accessed by the terminal last time is a VPLMN, and the network accessed by the terminal this time is an HPLMN. Additionally, the target PCF is a target H-PCF, and the target H-PCF is a PCF in the HPLMN.

In a fourteenth optional implementation of the first aspect, the identification information of the first PCF includes at least one of an internet protocol (IP) address of the first PCF, an IP prefix of the first PCF, or a fully qualified domain name (FQDN) of the first PCF. Additionally, the identification information of the second PCF includes at least one of an IP address of the second PCF, an IP prefix of the second PCF, or an FQDN of the second PCF.

According to a second aspect, a PCF determining method is provided. The method is applied to a process in which a terminal accesses a network, and the method may include sending, by a second AMF, PCF identification information to a first AMF, where the PCF identification information includes identification information of at least one first PCF, where the PCF identification information is used to determine a target PCF, where the first AMF is an AMF providing a service for the terminal to access a network this time, and where the second AMF is an AMF providing a service for the terminal to access a network last time.

For descriptions of technical effects of the second aspect, refer to descriptions of technical effects of the first aspect. Details are not described herein again.

In a first optional implementation of the second aspect, the PCF determining method provided in this application may further include receiving, by the second AMF, management indication information sent by the first AMF, where the management indication information is used to notify the second AMF that the first AMF determines the target PCF in the at least one first PCF corresponding to the PCF identification information. Alternatively, the management indication information is used to instruct the second AMF when receiving a terminal context management deletion notification sent by a UDM function, to delete a terminal context stored in the second AMF and reserve the terminal context stored in the target PCF.

In a second optional implementation of the second aspect, the PCF determining method provided in this application may further include receiving, by the second AMF, management indication information sent by the first AMF, where the management indication information is used to indicate, to the second AMF, that the target PCF is different from the first PCF. Alternatively, the management indication information is used to instruct the second AMF when receiving a terminal context management deletion notification sent by a UDM function, to delete, based on the management indication information, a terminal context stored in the second AMF and delete a terminal context stored in the at least one first PCF corresponding to the PCF identification information.

In a third optional implementation of the second aspect, before the sending, by a second AMF, PCF identification information to a first AMF, the PCF determining method provided in this application may further include determining, by the second AMF, PCF identification information corresponding to at least one available PCF based on an object served by the first AMF.

In this application, the second AMF may determine the PCF identification information corresponding to the at least one available PCF based on the object served by the first AMF. Therefore, the first AMF may determine the target PCF in the at least one available PCF.

In a fourth optional implementation of the second aspect, the identification information of the first PCF includes at least one of an IP address of the first PCF, an IP prefix of the first PCF, or an FQDN of the first PCF.

According to a third aspect, a PCF determining method is provided. The method is applied to a process in which a terminal establishes a session with a network, and the method may include: receiving, by an SMF, PCF identification information sent by an AMF; and obtaining, by the SMF, policy information from a target PCF when the at least one first PCF corresponding to the PCF identification information includes the target PCF, where the PCF identification information includes identification information of at least one first PCF.

Based on the PCF determining method provided in this application, in the process in which the terminal establishes the session with the network, the SMF in the network may receive the PCF identification information sent to the AMF, and the SMF obtains the policy information from the target PCF when the at least one first PCF corresponding to the PCF identification information includes the target PCF. Therefore, the SMF does not need to interact with an NRF to obtain and determine the target PCF, thereby reducing, to some extent, signaling overheads required for determining the PCF.

In a first optional implementation of the third aspect, the PCF determining method provided in this application may further include determining, by the SMF, the target PCF based on PCF information when the at least one first PCF corresponding to the PCF identification information does not include the target PCF, where the PCF information includes identification information of at least one second PCF.

In this application, when the at least one first PCF corresponding to the PCF identification information does not include the target PCF, the SMF may determine the target PCF based on the PCF information obtained using another method, thereby ensuring that the terminal smoothly accesses the network.

In a second optional implementation of the third aspect, after the receiving, by an SMF, PCF identification information sent by an AMF, the PCF determining method provided in this application may further include determining, by the SMF, whether the at least one first PCF corresponding to the PCF identification information includes the target PCF.

In a third optional implementation of the third aspect, the PCF information is obtained by the SMF from an NRF. Alternatively, the PCF information is stored in the SMF.

In a fourth optional implementation of the third aspect, a network accessed by the terminal is a VPLMN, and a session type of the terminal is local breakout. Further, the target PCF is a target V-PCF, and the target V-PCF is a PCF in the VPLMN.

In a fifth optional implementation of the third aspect, a network accessed by the terminal is a VPLMN, and a session type of the terminal is home routed. Further, the target PCF is a target H-PCF, and the H-PCF is a PCF in the HPLMN.

In a sixth optional implementation of the third aspect, when a network accessed by the terminal is an HPLMN, the PCF determining method provided in this application may further include determining, by the SMF, an H-PCF determined by the AMF in a process in which the terminal accesses the HPLMN as a target H-PCF.

In a seventh optional implementation of the third aspect, the PCF identification information is sent by the AMF to the SMF after the AMF receives PCF identification information sent by a first SMF, the first SMF serves a first session, the SMF serves a second session, the SMF is the same as or different from the first SMF, and the second session is a session established between the terminal and a network when the first SMF determines to relocate a UPF serving the first session.

In an eighth optional implementation of the third aspect, the identification information of the first PCF includes at least one of an IP address of the first PCF, an IP prefix of the first PCF, or an FQDN of the first PCF.

According to a fourth aspect, a PCF determining method is provided. The method is applied to a process in which a terminal establishes a session with a network, and the method may include: determining, by an AMF, PCF identification information based on an attribute of the session established between the terminal and the network; and sending, by the AMF, the PCF identification information to an SMF, where the PCF identification information includes identification information of at least one first PCF, and where the PCF identification information is used to determine a target PCF.

In a first optional implementation of the fourth aspect, the determining, by an AMF, PCF identification information based on an attribute of the session established between the terminal and the network may include: determining, by the AMF if a type of the session established between the terminal and the network is local breakout, that the PCF identification information is V-PCF identification information; or determining, by the AMF if a type of the session established between the terminal and the network is home routed, that the PCF identification information is H-PCF identification information.

In this application, the AMF may determine, based on the attribute of the session established between the terminal and the network, the PCF identification information required for the type of the established session. Therefore, the AMF may provide the appropriate PCF identification information to the SMF.

In a second optional implementation of the fourth aspect, the PCF determining method provided in this application may further include determining, by the AMF, the PCF identification information based on at least one of an object served by the SMF or an object served by the PCF.

In a third optional implementation of the fourth aspect, the identification information of the first PCF includes at least one of an IP address of the first PCF, an IP prefix of the first PCF, or an FQDN of the first PCF.

According to a fifth aspect, a PCF determining method is provided. The method is applied to a process of relocating a UPF, and the method may include: receiving, by an AMF, PCF identification information sent by a first SMF, where the PCF identification information includes identification information of at least one first PCF, and where the first SMF serves a first session; determining, by the AMF, a second SMF, where the second SMF serves a second session, and the second SMF is the same as or different from the first SMF; and sending, by the AMF, the PCF identification information to the second SMF, where the PCF identification information is used to determine a target PCF.

In a first optional implementation of the fifth aspect, in a process in which a terminal establishes the second session with a network, the sending, by the AMF, the PCF identification information to the second SMF may include sending, by the AMF, the PCF identification information to the SMF based on an identifier of the first session and an identifier of the second session that are sent by the terminal.

In a second optional implementation of the fifth aspect, in the process in which the terminal establishes the second session with the network, when the second SMF is the same as the first SMF, the PCF determining method provided in this embodiment of the present application further includes sending, by the AMF, first indication information to the second SMF, where the first indication information is used to instruct the second SMF to determine the target PCF based on the PCF identification information stored in the second SMF.

In a third optional implementation of the fifth aspect, the identification information of the first PCF includes at least one of an IP address of the first PCF, an IP prefix of the first PCF, or an FQDN of the first PCF.

According to a sixth aspect, an indication method is provided. The method is applied to a process in which a terminal accesses a network, and the method may include: receiving, by a PCF, update indication information and stop indication information that are sent by an AMF; then updating, by the PCF, a terminal context based on the update indication information; and stopping, by the PCF, sending policy information to the AMF based on the stop indication information, or sending, by the PCF, policy information to the AMF based on the stop indication information.

For descriptions of technical effects of the sixth aspect, refer to descriptions of technical effects of the first aspect. Details are not described herein again.

According to a seventh aspect, an AMF is provided. The AMF is applied to a process in which a terminal accesses a network, the AMF is a first AMF, and the first AMF may include a receiving module and an obtaining module. The receiving module may be configured to receive PCF identification information sent by a second AMF; and the obtaining module may be configured to obtain policy information from a target PCF when at least one first PCF corresponding to the PCF identification information received by the receiving module includes the target PCF, where the PCF identification information includes identification information of at least one first PCF, where the first AMF is an AMF providing a service for the terminal to access a network this time, and where the second AMF is an AMF providing a service for the terminal to access a network last time.

In a first optional implementation of the seventh aspect, the first AMF provided in this application may further include a determining module. The determining module may be configured to determine the target PCF based on PCF information when the at least one first PCF corresponding to the PCF identification information received by the receiving module does not include the target PCF, where the PCF information includes identification information of at least one second PCF.

In a second optional implementation of the seventh aspect, the determining module may be further configured to: after the receiving module receives the PCF identification information sent by the second AMF, determine whether the at least one first PCF corresponding to the PCF identification information includes the target PCF.

In a third optional implementation of the seventh aspect, the PCF information is obtained by the first AMF from an NRF. Alternatively, the PCF information is stored in the first AMF.

In a fourth optional implementation of the seventh aspect, the first AMF provided in this application may further include a sending module. The sending module may be configured to send first indication information to the second AMF, where the first indication information is used to notify the second AMF that the first AMF determines the target PCF in the at least one first PCF corresponding to the PCF identification information. Alternatively, the first indication information is used to instruct the second AMF when receiving a terminal context management deletion notification sent by a UDM function, to delete a terminal context stored in the second AMF and reserve the terminal context stored in the target PCF.

In a fifth optional implementation of the seventh aspect, the first AMF provided in this application may further include a sending module. The sending module may be configured to send first indication information to the second AMF, where the first indication information is used to indicate, to the second AMF, that the target PCF is different from the first PCF. Alternatively, the first indication information is used to instruct the second AMF when receiving a terminal context management deletion notification sent by a UDM function, to delete, based on the first indication information, a terminal context stored in the second AMF and delete a terminal context stored in the at least one first PCF corresponding to the PCF identification information.

In a sixth optional implementation of the seventh aspect, the sending module may be further configured to send second indication information to the target PCF, where the second indication information is used to instruct the target PCF to update the terminal context.

In a seventh optional implementation of the seventh aspect, the sending module may be further configured to send third indication information to the target PCF, where the third indication information is used to instruct the target PCF to stop sending the policy information to the first AMF. Alternatively, the third indication information is used to instruct the target PCF to send the policy information to the first AMF.

In an eighth optional implementation of the seventh aspect, each of the network accessed by the terminal this time and the network accessed by the terminal last time is an HPLMN. Further, the target PCF is a target H-PCF, and the target H-PCF is a PCF in the HPLMN.

In a ninth optional implementation of the seventh aspect, the network accessed by the terminal this time and the network accessed by the terminal last time are a same VPLMN. Further, the target PCF includes a target H-PCF and a target V-PCF, the at least one first PCF corresponding to the PCF identification information includes at least one H-PCF and at least one V-PCF, the target H-PCF is a PCF in an HPLMN, and the target V-PCF is a PCF in the VPLMN.

In a tenth optional implementation of the seventh aspect, when the target PCF includes the target H-PCF and the target V-PCF, the sending module is configured to send second indication information to the target V-PCF, where the second indication information is used to instruct the target V-PCF to update the terminal context.

In an eleventh optional implementation of the seventh aspect, the network accessed by the terminal last time is a first VPLMN, and the network accessed by the terminal this time is a second VPLMN. Alternatively, the network accessed by the terminal last time is an HPLMN, and the network accessed by the terminal this time is a VPLMN. Additionally, the target PCF includes a target H-PCF and a target V-PCF, the at least one first PCF corresponding to the PCF identification information includes at least one H-PCF, and the target H-PCF is a PCF in an HPLMN. The obtaining module may be further configured to obtain V-PCF information from the NRF. Additionally, the determining module is configured to: determine the target V-PCF based on the V-PCF information; or the determining module is configured to determine the target V-PCF based on V-PCF information stored in the first AMF.

In a twelfth optional implementation of the seventh aspect, when the target PCF includes the target H-PCF and the target V-PCF, the sending module is configured to send identification information of the target H-PCF and the second indication information to the target V-PCF, where the identification information of the target H-PCF and the second indication information are used by the target V-PCF to instruct the target H-PCF to update the terminal context.

In a thirteenth optional implementation of the seventh aspect, the network accessed by the terminal last time is a VPLMN, and the network accessed by the terminal this time is an HPLMN. Further, the target PCF is a target H-PCF, and the target H-PCF is a PCF in the HPLMN.

In a fourteenth optional implementation of the seventh aspect, the identification information of the first PCF includes at least one of an IP address of the first PCF, an IP prefix of the first PCF, or an FQDN of the first PCF. Further, the identification information of the second PCF includes at least one of an IP address of the second PCF, an IP prefix of the second PCF, or an FQDN of the second PCF.

For descriptions of technical effects of the seventh aspect, refer to related descriptions of technical effects of the first aspect. Details are not described herein again.

According to an eighth aspect, an AMF is provided. The AMF is applied to a process in which a terminal accesses a network, the AMF is a second AMF, and the second AMF may include a sending module. The sending module may be configured to send PCF identification information to a first AMF, where the PCF identification information includes identification information of at least one first PCF, where the PCF identification information is used to determine a target PCF, where the first AMF is an AMF providing a service for the terminal to access a network this time, and where the second AMF is an AMF providing a service for the terminal to access a network last time.

In a first optional implementation of the eighth aspect, the second AMF provided in this application may further include a receiving module. The receiving module may be configured to receive management indication information sent by the first AMF, where the management indication information is used to notify the second AMF that the first AMF determines the target PCF in the at least one first PCF corresponding to the PCF identification information. Alternatively, the management indication information is used to instruct the second AMF when receiving a terminal context management deletion notification sent by a UDM function, to delete a terminal context stored in the second AMF and reserve the terminal context stored in the target PCF.

In a second optional implementation of the eighth aspect, the second AMF provided in this application may further include a receiving module. The receiving module may be configured to receive management indication information sent by the first AMF, where the management indication information is used to indicate, to the second AMF, that the target PCF is different from the first PCF. Alternatively, the management indication information is used to instruct the second AMF when receiving a terminal context management deletion notification sent by a UDM function, to delete, based on the management indication information, a terminal context stored in the second AMF and delete a terminal context stored in the at least one first PCF corresponding to the PCF identification information.

In a third optional implementation of the eighth aspect, the second AMF provided in this application may further include a determining module. The determining module may be configured to: before the sending module sends the PCF identification information to the first AMF, determine PCF identification information corresponding to at least one available PCF based on an object served by the first AMF.

In a fourth optional implementation of the eighth aspect, the identification information of the first PCF includes at least one of an IP address of the first PCF, an IP prefix of the first PCF, or an FQDN of the first PCF.

For descriptions of technical effects of the eighth aspect, refer to related descriptions of technical effects of the second aspect. Details are not described herein again.

According to a ninth aspect, an SMF is provided. The SMF is applied to a process in which a terminal establishes a session with a network, and the SMF may include a receiving module and an obtaining module. The receiving module may be configured to receive PCF identification information sent by an AMF. Additionally, the obtaining module may be configured to obtain policy information from a target PCF when at least one first PCF corresponding to the PCF identification information received by the receiving module includes the target PCF, where the PCF identification information includes identification information of at least one first PCF.

In a first optional implementation of the ninth aspect, the SMF provided in this application may further include a determining module. When the at least one first PCF corresponding to the PCF identification information received by the receiving module does not include the target PCF, the SMF determines the target PCF based on PCF information, where the PCF information includes identification information of at least one second PCF.

In a second optional implementation of the ninth aspect, the determining module may be further configured to after the receiving module receives the PCF identification information sent by the AMF, determine whether the at least one first PCF corresponding to the PCF identification information includes the target PCF.

In a third optional implementation of the ninth aspect, the PCF information is obtained by the SMF from an NRF; or the PCF information is stored in the SMF.

In a fourth optional implementation of the ninth aspect, a network accessed by the terminal is a VPLMN, and a session type of the terminal is local breakout; and the target PCF is a target V-PCF, and the target V-PCF is a PCF in the VPLMN.

In a fifth optional implementation of the ninth aspect, a network accessed by the terminal is a VPLMN, and a session type of the terminal is home routed; and the target PCF is a target H-PCF, and the H-PCF is a PCF in the HPLMN.

In a sixth optional implementation of the ninth aspect, when a network accessed by the terminal is an HPLMN, the determining module may be further configured to determine an H-PCF determined by the AMF in a process in which the terminal accesses the HPLMN as a target H-PCF.

In a seventh optional implementation of the ninth aspect, the PCF identification information is sent by the AMF to the SMF after the AMF receives PCF identification information sent by a first SMF, the first SMF serves a first session, the SMF serves a second session, the SMF is the same as or different from the first SMF, and the second session is a session established between the terminal and a network when the first SMF determines to relocate a UPF serving the first session.

In an eighth optional implementation of the ninth aspect, the identification information of the first PCF includes at least one of an IP address of the first PCF, an IP prefix of the first PCF, or an FQDN of the first PCF.

For descriptions of technical effects of the ninth aspect, refer to related descriptions of technical effects of the third aspect. Details are not described herein again.

According to a tenth aspect, an AMF is provided. The AMF is applied to a process in which a terminal establishes a session with a network, and the AMF may include a determining module and a sending module. The determining module may be configured to determine PCF identification information based on an attribute of the session established between the terminal and the network; and the sending module may be configured to send the PCF identification information determined by the determining module to an SMF. The PCF identification information includes identification information of at least one first PCF, and the PCF identification information is used to determine a target PCF.

In a first optional implementation of the tenth aspect, the determining module is configured to determine, if a type of the session established between the terminal and the network is local breakout, that the PCF identification information is V-PCF identification information; or determine, if a type of the session established between the terminal and the network is home routed, that the PCF identification information is H-PCF identification information.

In a second optional implementation of the tenth aspect, the determining module may be further configured to determine the PCF identification information based on at least one of an object served by the SMF or an object served by the PCF.

In a third optional implementation of the tenth aspect, the identification information of the first PCF includes at least one of an IP address of the first PCF, an IP prefix of the first PCF, or an FQDN of the first PCF.

For descriptions of technical effects of the tenth aspect, refer to related descriptions of technical effects of the fourth aspect. Details are not described herein again.

According to an eleventh aspect, this application provides an AMF. The AMF is applied to a process of relocating a UPF, and the AMF may include a receiving module, a determining module, and a sending module. The receiving module is configured to receive PCF identification information sent by a first SMF, where the PCF identification information includes identification information of at least one first PCF, and where the first SMF serves a first session; the determining module is configured to determine a second SMF, where the second SMF serves a second session, and the second SMF is the same as or different from the first SMF; and the sending module is configured to send the PCF identification information to the second SMF, where the PCF identification information is used to determine a target PCF.

In a first optional implementation of the eleventh aspect, the sending module is further configured to send, in the process in which the terminal establishes the second session with the network, the PCF identification information to the SMF based on an identifier of the first session and an identifier of the second session that are sent by the terminal.

In a second optional implementation of the eleventh aspect, the sending module is further configured to in the process in which the terminal establishes the second session with the network, when the second SMF is the same as the first SMF, send first indication information to the second SMF, where the first indication information is used to instruct the second SMF to determine the target PCF based on the PCF identification information stored in the second SMF.

In a third optional implementation of the eleventh aspect, the identification information of the first PCF includes at least one of an IP address of the first PCF, an IP prefix of the first PCF, or an FQDN of the first PCF.

According to a twelfth aspect, a PCF is provided. The PCF is applied to a process in which a terminal accesses a network, and the PCF includes a receiving module, an update module, and a sending module. The receiving module may be configured to receive update indication information and stop indication information that are sent by an AMF; the update module may be configured to update a terminal context based on the update indication information; and the sending module may be configured to stop, based on the stop indication information, sending policy information to the AMF, or the sending module may be configured to send policy information to the AMF based on the stop indication information.

According to a thirteenth aspect, an AMF is provided. The AMF may include a processor and a memory coupled to the processor. The memory may be configured to store a computer instruction. When the AMF runs, the processor executes the computer instruction stored in the memory, to enable the AMF to perform the PCF determining method according to any one of the first aspect and various optional implementations of the first aspect.

According to a fourteenth aspect, a computer readable storage medium is provided. The computer readable storage medium may include a computer instruction. When the computer instruction runs on an AMF, the AMF is enabled to perform the PCF determining method according to any one of the first aspect and various optional implementations of the first aspect.

According to a fifteenth aspect, a computer program product including a computer instruction is provided. When the computer program product runs on an AMF, the AMF is enabled to perform the PCF determining method according to any one of the first aspect and various optional implementations of the first aspect.

According to a sixteenth aspect, an AMF is provided. The AMF exists in a chip product form, a structure of the apparatus includes a processor and a memory, the memory is coupled to the processor, the memory may be configured to store a computer instruction, and the processor is configured to execute the computer instruction stored in the memory, to enable the AMF to perform the PCF determining method according to any one of the first aspect and various optional implementations of the first aspect.

For descriptions of technical effects of the thirteenth aspect to the sixteenth aspect, refer to related descriptions of technical effects of the first aspect. Details are not described herein again.

According to a seventeenth aspect, an AMF is provided. The AMF may include a processor and a memory coupled to the processor. The memory may be configured to store a computer instruction. When the AMF runs, the processor executes the computer instruction stored in the memory, to enable the AMF to perform the PCF determining method according to any one of the second aspect and various optional implementations of the second aspect.

According to an eighteenth aspect, a computer readable storage medium is provided. The computer readable storage medium may include a computer instruction. When the computer instruction runs on an AMF, the AMF is enabled to perform the PCF determining method according to any one of the second aspect and various optional implementations of the second aspect.

According to a nineteenth aspect, a computer program product including a computer instruction is provided. When the computer program product runs on an AMF, the AMF is enabled to perform the PCF determining method according to any one of the second aspect and various optional implementations of the second aspect.

According to a twentieth aspect, an AMF is provided. The AMF exists in a chip product form, a structure of the apparatus includes a processor and a memory, the memory is coupled to the processor, the memory may be configured to store a computer instruction, and the processor is configured to execute the computer instruction stored in the memory, to enable the AMF to perform the PCF determining method according to any one of the second aspect and various optional implementations of the second aspect.

For descriptions of technical effects of the seventeenth aspect to the twentieth aspect, refer to related descriptions of technical effects of the second aspect. Details are not described herein again.

According to a twenty first aspect, an SMF is provided. The SMF may include a processor and a memory coupled to the processor. The memory may be configured to store a computer instruction. When the SMF runs, the processor executes the computer instruction stored in the memory, to enable the SMF to perform the PCF determining method according to any one of the third aspect and various optional implementations of the third aspect.

According to a twenty second aspect, a computer readable storage medium is provided. The computer readable storage medium may include a computer instruction. When the computer instruction runs on an SMF, the SMF is enabled to perform the PCF determining method according to any one of the third aspect and various optional implementations of the third aspect.

According to a twenty third aspect, a computer program product including a computer instruction is provided. When the computer program product runs on an SMF, the SMF is enabled to perform the PCF determining method according to any one of the third aspect and various optional implementations of the third aspect.

According to a twenty fourth aspect, an SMF is provided. The SMF exists in a chip product form, a structure of the apparatus includes a processor and a memory, the memory is coupled to the processor, the memory may be configured to store a computer instruction, and the processor is configured to execute the computer instruction stored in the memory, to enable the SMF to perform the PCF determining method according to any one of the third aspect and various optional implementations of the third aspect.

For descriptions of technical effects of the twenty first aspect to the twenty fourth aspect, refer to related descriptions of technical effects of the third aspect. Details are not described herein again.

According to a twenty fifth aspect, an AMF is provided. The AMF may include a processor and a memory coupled to the processor. The memory may be configured to store a computer instruction. When the AMF runs, the processor executes the computer instruction stored in the memory, to enable the AMF to perform the PCF determining method according to any one of the fourth aspect and various optional implementations of the fourth aspect.

According to a twenty sixth aspect, a computer readable storage medium is provided. The computer readable storage medium may include a computer instruction. When the computer instruction runs on an AMF, the AMF is enabled to perform the PCF determining method according to any one of the fourth aspect and various optional implementations of the fourth aspect.

According to a twenty seventh aspect, a computer program product including a computer instruction is provided. When the computer program product runs on an AMF, the AMF is enabled to perform the PCF determining method according to any one of the fourth aspect and various optional implementations of the fourth aspect.

According to a twenty eighth aspect, an AMF is provided. The AMF exists in a chip product form, a structure of the apparatus includes a processor and a memory, the memory is coupled to the processor, the memory may be configured to store a computer instruction, and the processor is configured to execute the computer instruction stored in the memory, to enable the AMF to perform the PCF determining method according to any one of the fourth aspect and various optional implementations of the fourth aspect.

For descriptions of technical effects of the twenty fifth aspect to the twenty eighth aspect, refer to related descriptions of technical effects of the fourth aspect. Details are not described herein again.

According to a twenty ninth aspect, an AMF is provided. The AMF may include a processor and a memory coupled to the processor. The memory may be configured to store a computer instruction. When the AMF runs, the processor executes the computer instruction stored in the memory, to enable the AMF to perform the PCF determining method according to any one of the fifth aspect and various optional implementations of the fifth aspect.

According to a thirtieth aspect, a computer readable storage medium is provided. The computer readable storage medium may include a computer instruction. When the computer instruction runs on an AMF, the AMF is enabled to perform the PCF determining method according to any one of the fifth aspect and various optional implementations of the fifth aspect.

According to a thirty first aspect, a computer program product including a computer instruction is provided. When the computer program product runs on an AMF, the AMF is enabled to perform the PCF determining method according to any one of the fifth aspect and various optional implementations of the fifth aspect.

According to a thirty second aspect, an AMF is provided. The AMF exists in a chip product form, a structure of the apparatus includes a processor and a memory, the memory is coupled to the processor, the memory may be configured to store a computer instruction, and the processor is configured to execute the computer instruction stored in the memory, to enable the AMF to perform the PCF determining method according to any one of the fifth aspect and various optional implementations of the fifth aspect.

According to a thirty third aspect, a PCF is provided. The PCF may include a processor and a memory coupled to the processor. The memory may be configured to store a computer instruction. When the PCF runs, the processor executes the computer instruction stored in the memory, to enable the PCF to perform the indication method according to any one of the sixth aspect and various optional implementations of the sixth aspect.

According to a thirty fourth aspect, a computer readable storage medium is provided. The computer readable storage medium may include a computer instruction. When the computer instruction runs on a PCF, the PCF is enabled to perform the indication method according to any one of the sixth aspect and various optional implementations of the sixth aspect.

According to a thirty fifth aspect, a computer program product including a computer instruction is provided. When the computer program product runs on a PCF, the PCF is enabled to perform the indication method according to any one of the sixth aspect and various optional implementations of the sixth aspect.

According to a thirty sixth aspect, a PCF is provided. The PCF exists in a chip product form, a structure of the apparatus includes a processor and a memory, the memory is coupled to the processor, the memory may be configured to store a computer instruction, and the processor is configured to execute the computer instruction stored in the memory, to enable the PCF to perform the indication method according to any one of the sixth aspect and various optional implementations of the sixth aspect.

For descriptions of technical effects of the thirty third aspect to the thirty sixth aspect, refer to related descriptions of technical effects of the sixth aspect. Details are not described herein again.

According to a thirty seventh aspect, a communications system is provided. The communications system may include a PCF, the AMF according to any one of the seventh aspect and various optional implementations of the seventh aspect, and the AMF according to any one of the eighth aspect and various optional implementations of the eighth aspect.

Alternatively, the communications system may include a PCF, the AMF according to the thirteenth aspect, and the AMF according to the seventeenth aspect.

For descriptions of related content and technical effects of the thirty first aspect, refer to related descriptions of related content and technical effects of the first aspect or any possible implementation, or the second aspect or any possible implementation. Details are not described herein again.

According to a thirty second aspect, a communications system is provided. The communications system may include a PCF, the SMF according to the ninth aspect, and the AMF according to the tenth aspect or the eleventh aspect.

Alternatively, the communications system may include a PCF, the SMF according to the twenty first aspect, and the AMF according to the twenty fifth aspect or the twenty ninth aspect.

For descriptions of related content and technical effects of the thirty second aspect, refer to related descriptions of related content and technical effects of the third aspect or any possible implementation, the fourth aspect or any possible implementation, or the fifth aspect or any possible implementation of the fifth aspect. Details are not described herein again.

DESCRIPTION OF EMBODIMENTS

Figure 1:
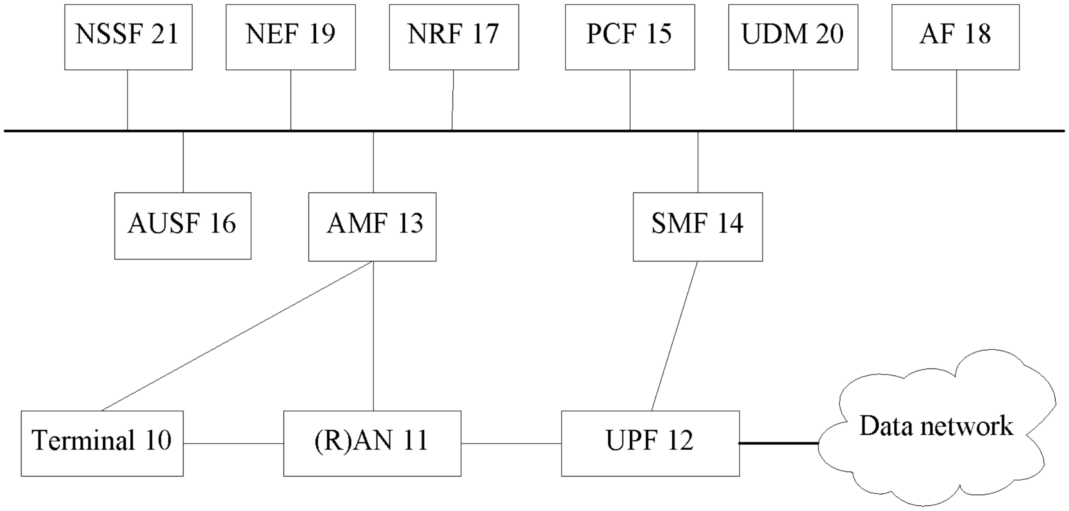
FIG. 1 is a schematic architectural diagram of a communications system according to an embodiment of the present application.

The term "and/or" in this specification describes only an association relationship for describing associated objects and represents that three relationships may exist. For example, A and/or B may represent the following three cases, only A exists, both A and B exist, and only B exists.

In the specification and claims in the embodiments of the present application, the terms "first", "second", "third", "fourth", and the like are intended to distinguish between different objects but do not indicate a particular order of the objects. For example, a first AMF, a second AMF, and the like are used to distinguish different AMFs, and are not used to describe a particular order of the AMFs.

In addition, in the embodiments of the present application, the word "exemplary" or "for example" is used to represent giving an example, an illustration, or a description. Any embodiment or design scheme described as an "exemplary" or "for example" in the embodiments of the present application should not be explained as being more preferred or having more advantages than another embodiment or design scheme. Exactly, use of the word "exemplary" or "example" or the like is intended to present a related concept in a specific manner.

In the descriptions of the embodiments of the present application, unless otherwise stated, "a plurality of" means two or more than two. For example, a plurality of processing units means two or more than two processing units; and a plurality of systems means two or more than two systems.

Some concepts in a PCF determining method, an apparatus, and a system provided in the embodiments of the present application are first explained and described.

Network slice. In a 5G network, the concept of network slice is introduced. A network slice is a set including a group of network functions, resources for running these network functions, and specific configurations of these network functions. One network slice may form one end-to-end logical network. In the 5G network, different types of network slices may be selected for a terminal based on service requirements of the terminal. For example, network slices may include different types of network slices applied to a mobile broadband (MBB) scenario, an internet of things (IOT) scenario, a mobile edge computing (MEC) scenario, and the like, and the network slices include respective service functions (for example, an AMF, a user plane function (UPF), and a PCF).

HPLMN. It may be understood as a PLMN to which a terminal subscribes. For example, for a terminal, if a mobile network (for example, China Mobile, China Unicom, or China Telecom) to which the terminal subscribes is China Mobile, it may be considered that a PLMN of China Mobile is an HPLMN of the terminal. In addition, for a terminal, there is only one PLMN to which the terminal is homed. To be more specific, there is only one HPLMN for one terminal.

VPLMN. It may be understood as a network accessed by a terminal through a PLMN network having a roaming protocol other than a home PLMN. For example, for a terminal, assuming that a home network of the terminal is China Mobile, when the terminal accesses a network through China Unicom to obtain a service, a PLMN of China Unicom is a VPLMN.

Non-roaming state. A terminal is located in a home network of the terminal. If a network accessed by the terminal is an HPLMN, it is considered that the terminal is in a non-roaming state.

Roaming state. A terminal is located in a network beyond a home location of the terminal. If a network accessed by the terminal is a VPLMN, it is considered that the terminal is in a roaming state.

When the terminal in the roaming state, the terminal performs a registration process through an AMF of the VPLMN, where types of a session established between the terminal and the network may include local breakout and home routed.

Local breakout. It means that when a terminal is in a roaming state, local breakout (LBO) may be performed on user plane data of the terminal. For example, a user plane of a PLMN (that is, a VPLMN) of a current roaming location of the terminal processes the user plane data of the terminal (for example, the user plane data of the terminal is routed by the VPLMN), and the user plane data of the terminal does not need to be returned to a home network (that is, an HPLMN) of the terminal.

Home routed. It means that when a terminal is in a roaming state, all user plane data of the terminal needs to be returned to a home network (that is, an HPLMN) of the terminal and be processed, that is, routed by the HPLMN.

To resolve a problem of relatively high signaling overheads in a PCF determining process in the background, an embodiment of the present application provides a PCF determining method, where in a process in which a terminal accesses a network or a process in which a terminal establishes a session with a network, if a previously determined PCF (an old PCF) is still available in the network, the old PCF is reused, thereby reducing, to some extent, signaling overheads required for determining a PCF.

The PCF determining method provided in this embodiment of the present application may be applied to a wireless communications system. The wireless communications system may be a Long-Term Evolution (LTE) system, an LTE-advanced (LTE-A) system, a system in which a 5th generation mobile communications technology is used (which may be referred to as a 5G system herein), or the like, and a 5G system is used as an example. FIG. 1 is a schematic architectural diagram of a 5G system according to an embodiment of the present application. In FIG. 1, the 5G system may include a terminal 10, a radio access network (RAN) or an access network (AN) 11, a UPF 12, an AMF 13, an SMF 14, a PCF 15, an authentication server function (AUSF) 16, an NRF 17, an application function (AF) 18, a network exposure function (NEF) 19, a UDM 20, a network slice selection function (NSSF) 21, and the like. The terminal 10 accesses a 5G network (for example, the terminal 10 accesses the 5G system that may provide the 5G network), and establishes a session with the network, and then the terminal 10 may communicate, through the (R)AN 11, with a function (for example, the UPF 12 or the AMF 13) serving the terminal 10. Usually, during actual application, a connection between the foregoing devices or service functions may be a wireless connection or a wired connection. For ease of visually representing a connection relationship between the devices, a schematic description is made using a solid line in FIG. 1.

(R)AN 11. It is used by the terminal 10 to access a network, and the (R)AN 11 may include devices such as a base station, an evolved node base station (eNB), a next generation node base station (gNB), a new radio eNB, a macro base station, a micro base station, a high-frequency base station or transmission and reception point (TRP), a non-3GPP access network (for example, Wi-Fi), and/or a non-3GPP interworking function (N3IWF).

UPF 12. It is configured to process user plane related events, for example, data packet transmission or routing, data packet detection, traffic volume reporting, quality of service (QoS) processing, lawful interception, and downlink data packet storage.

AMF 13. It is configured to perform connection management, mobility management, registration management, access authentication and authorization, accessibility management, security context management, and the like.

SMF 14. It is configured to perform session management (for example, session establishment, session modification, and session release), selection and control of the UPF 12, selection of a service and session continuity mode, a roaming service, and the like.

PCF 15. It is configured to formulate a policy, provide a policy control service, and obtain policy decision related subscription information and the like.

AUSF 16. It is configured to interact with the UDM 20 to obtain user information, and perform an authentication related function, for example, generate an intermediate key.

NRF 17. It is configured to discover services, and maintain a network function profile of available network function instances and services supported by these network functions.

AF 18. It interacts with a 3GPP core network, to provide a service or a server, for example, may interact with the NEF 19.

NEF 19. It securely exposes various services and capabilities (including content exposure, exposure to a third party, or the like) provided by 3GPP network functions, and converts or translates between information exchanged with the AF 18 and information exchanged with an internal network function, for example, between an AF service identifier and internal 5G core network information (for example, network slice selection assistance information).

UDM 20. It processes information authentication, user identity information processing, access authorization, registration and mobility management, subscription management, SMS management, and the like in a 3GPP authentication and key negotiation mechanism.

NSSF 21. It is configured to select a group of network slices for the terminal 10, determine network slice selection assistance information, and determine an AMF set serving the terminal 10 (the AMF set is a set of a plurality of AMFs that may serve the terminal 10).

Optionally, in this embodiment of the present application, all of the function modules (that is, the UPF 12, the AMF 13, the SMF 14, the PCF 15, the AUSF 16, the NRF 17, the AF 18, the NEF 19, the UDM 20, and the NSSF 21) may be integrated in a server, in order to implement functions of the function modules.

Figure 2:
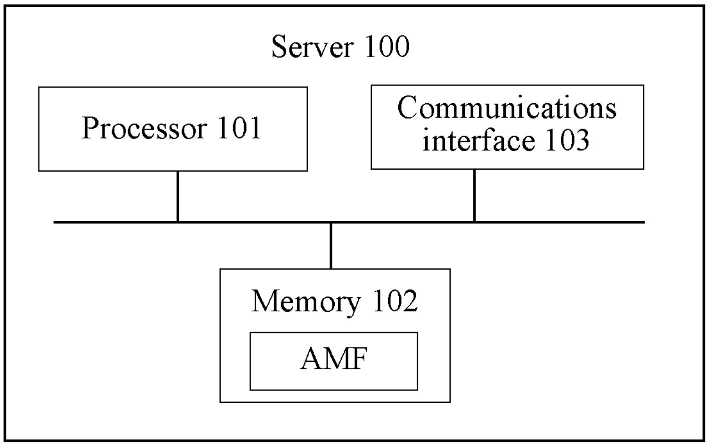
FIG. 2 is a first schematic hardware diagram of a server according to an embodiment of the present application.

In an embodiment of the present application, an AMF may be integrated in a server to implement a function of the AMF. Components of a server in which an AMF is integrated according to an embodiment of the present application are described below with reference to FIG. 2. As shown in FIG. 2, the server 100 may include a processor 101, a memory 102, a communications interface 103, and the like.

Processor 101. It is a core component of the server 100, and is configured to run an operating system of the server 100 and application programs (including a system application program and a third party application program) on the server 100.

In this embodiment of the present application, the processor 101 may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor can implement or execute various exemplary logical blocks, modules, and circuits described with reference to the content disclosed in the embodiments of the present application. Alternatively, the processor may be a combination for implementing a computing function, for example, a combination including one or more microprocessors or a combination of a DSP and a microprocessor.

Memory 102. It may be configured to store a software program and a module, and the processor 101 runs the software program and the module stored in the memory 102, thereby performing various function applications and data processing of the server 100. The memory 102 may include one or more computer readable storage media. The memory 102 includes a program storage area and a data storage area, where the program storage area may store an operating system, an application program required by at least one function, and the like, and where the data storage area may store data created by the server 100 and the like. In this embodiment of the present application, the memory 102 may include the AMF, and run the AMF to complete access of a terminal to a network or establishment of a session by a terminal with a network.

In this embodiment of the present application, the memory 102 may include a volatile memory, for example, a random access memory (RAM). The memory may alternatively include a non-volatile memory, for example, a read-only memory (ROM), a flash memory, a hard disk drive (HDD), or a solid-state drive (SSD). The memory may alternatively include a combination of the foregoing memories.

Communications interface 103. It is an interface circuit through which the server 100 communicates with another device. A communications interface may be a structure having a receive/transmit function, such as a transceiver or a receive/transmit circuit, and communications interfaces include a serial communications interface and a parallel communications interface.

Figure 3:
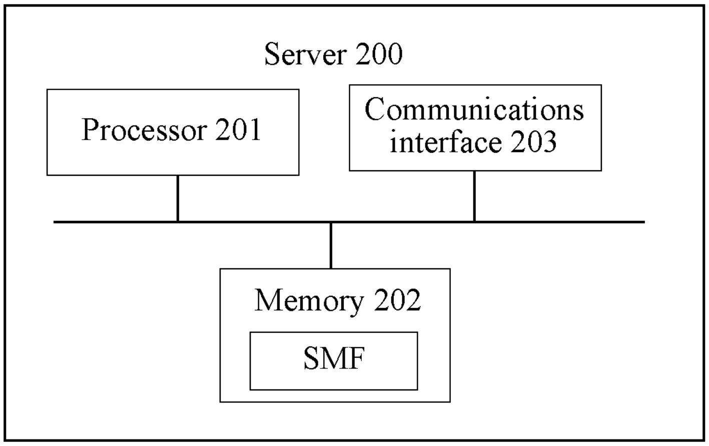
FIG. 3 is a second schematic hardware diagram of a server according to an embodiment of the present application.

In an embodiment of the present application, an SMF may be integrated in a server to implement a function of the SMF. Components of a server in which the SMF is integrated according to an embodiment of the present application are described below with reference to FIG. 3. As shown in FIG.

3, the server 200 may include a processor 201, a memory 202, a communications interface 203, and the like.

Processor 201. It is a core component of the server 200, and is configured to run an operating system of the server 200 and application programs (including a system application program and a third party application program) on the server 200.

In this embodiment of the present application, the processor 201 may be a CPU, a general purpose processor, a DSP, an ASIC, an FPGA or another programmable logic device, a transistor logic device, a hardware component, or any combination thereof. The processor can implement or execute various exemplary logical blocks, modules, and circuits described with reference to the content disclosed in the embodiments of the present application. Alternatively, the processor may be a combination for implementing a computing function, for example, a combination including one or more microprocessors or a combination of a DSP and a microprocessor.

Memory 202. It may be configured to store a software program and a module, and the processor 201 runs the software program and the module stored in the memory 202, thereby performing various function applications and data processing of the server 200. The memory 202 may include one or more computer readable storage media. The memory 202 includes a program storage area and a data storage area, where the program storage area may store an operating system, an application program required by at least one function, and the like, and where the data storage area may store data created by the server 200 and the like. In this embodiment of the present application, the memory 202 may include the SMF, and run the SMF to complete establishment of a session by a terminal with a network.

In this embodiment of the present application, the memory 202 may include a volatile memory, for example, a RAM. The memory may alternatively include a non-volatile memory, for example, a ROM, a flash memory, an HDD, or an SSD. The memory may alternatively include a combination of the foregoing memories.

Communications interface 203. It is an interface circuit through which the server 200 communicates with another device. A communications interface may be a structure having a receive/transmit function, such as a transceiver or a receive/transmit circuit, and communications interfaces include a serial communications interface and a parallel communications interface.

Optionally, the AMF and the SMF may be respectively integrated in different servers, or may be integrated in a same server. This is determined based on an actual situation, and is not limited in this embodiment of the present application.

In this embodiment of the present application, when a terminal processes a service through a network, the terminal first accesses the network, and then establishes a session with the network, to implement communication with another device. Based on the PCF determining method provided in this embodiment of the present application, for example, a PCF may be determined in a process in which a terminal accesses a network, or a PCF may be determined in a process in which a terminal establishes a session with a network (determining a PCF may be understood as selecting a PCF serving the terminal). A method for determining a PCF in a process in which a terminal accesses a network and a method for determining a PCF in a process in which a terminal establishes a session with a network are separately described below through examples.

In this embodiment of the present application, an AMF serving the terminal when the terminal accesses a network this time may be different from an AMF serving the terminal when the terminal accesses a network last time. In this embodiment of the present application, using an example in which the AMF serving the terminal when the terminal accesses the network this time is different from the AMF serving the terminal when the terminal accesses the network last time, the PCF determining method provided in this embodiment of the present application is described through an example.

It should be noted that, in this embodiment of the present application, all PCF information obtained by a first AMF from a second AMF is referred to as PCF identification information, and all PCF information obtained by the first AMF from an NRF is referred to as PCF information.

Figure 4:
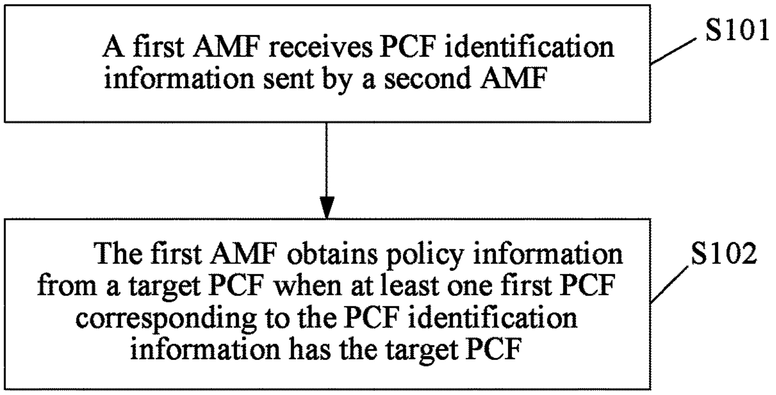
FIG. 4 is a first schematic diagram of a PCF determining method according to an embodiment of the present application.

With reference to FIG. 1, as shown in FIG. 4, a PCF determining method provided in an embodiment of the present application in a process in which a terminal accesses a network may include S101 and S102.

S101. A first AMF receives PCF identification information sent by a second AMF.

In this embodiment of the present application, the first AMF is an AMF providing a service for the terminal to access a network this time, and the second AMF is an AMF providing a service for the terminal to access a network last time. When the terminal accesses the network this time, the second AMF providing a service for the terminal to access the network last time may provide the PCF identification information to the first AMF providing a service for the terminal to access the network this time, where the PCF identification information may include identification information of a PCF determined by the second AMF (that is, a PCF used by the second AMF) when the terminal accesses the network last time, and where the PCF identification information may further include other PCF identification information (which may be understood as identification information of another PCF instance) obtained by the first AMF from an NRF.

The PCF identification information may include identification information of at least one first PCF. For example, identification information of each of the at least one first PCF may include at least one of an IP address of the first PCF, an IP prefix of the first PCF, or an FQDN of the first PCF. Optionally, in this embodiment of the present application, the IP address of the first PCF may include an IP version 4 address (IPv4) address or an IP version 6 address (IPv6) address of the first PCF, and the IP prefix of the first PCF may be a prefix of the IPv6 address of the first PCF.

For example, using an example in which the PCF identification information includes identification information of five first PCFs (which are respectively marked as identification information of a PCF 1, identification information of a PCF 2, identification information of a PCF 3, identification information of a PCF 4, and identification information of a PCF 5), the identification information of the PCF 1 is an IPv4 address of the PCF 1, the identification information of the PCF 2 is also an IPv6 address of the PCF 2, the identification information of the PCF 3 is an IPv4 address and an IPv6 address of the PCF 3, the identification information of the PCF 4 is an FQDN of the PCF 4, and the identification information of the PCF 5 is an IPv4 address and an FQDN of the PCF 5. An example of the PCF identification information is shown in Table 1.

TABLE 1

| PCF identification information | Content of identification information |
|---|---|
| Identification information of PCF 1 | IPv4 address of PCF 1 |
| Identification information of PCF 2 | IPv6 address of PCF 2 |
| Identification information of PCF 3 | IPv4 address and IPv6 address of PCF 3 |
| Identification information of PCF 4 | FQDN of PCF 4 |
| Identification information of PCF 5 | IPv4 address and FQDN of PCF 5 |

The PCF identification information in this embodiment of the present application may be included in an existing message for sending, for example, included in a Response to Namf_Communication_UEContextTransfer message for sending, or may be sent as an independent message. When the PCF identification information is included in the existing message for sending, for example, the Response to Namf_Communication_UEContextTransfer message, if the message does not include identification information of a PCF, optionally, the first AMF interacts with the NRF to obtain PCF information or obtains PCF information locally, and selects a target PCF based on the PCF information.

In another optional implementation, a manner in which the first AMF determines whether there is a target PCF is as follows. The first AMF obtains a dynamic policy through at least one PCF corresponding to the PCF identification information (for example, the first AMF is connected to the at least one PCF corresponding to the PCF identification information to obtain the dynamic policy), and when the first AMF fails to interact with all PCFs corresponding to the PCF identification information, it is acknowledged that the received PCF identification information does not include a corresponding target PCF, and therefore the first AMF interacts with the NRF to obtain PCF information or obtains PCF information locally, and selects a target PCF based on the PCF information.

S102. The first AMF obtains policy information from a target PCF when at least one first PCF corresponding to the PCF identification information includes the target PCF.

The target PCF is a PCF providing a service to the terminal in the process in which the terminal accesses the network this time.

In this embodiment of the present application, the obtaining, by the first AMF when at least one first PCF corresponding to the PCF identification information received by the first AMF includes a target PCF, policy information from the target PCF may include, registering, by the first AMF, the terminal with the target PCF (that is, establishing a terminal context on the PCF). Alternatively, when the target PCF includes a target V-PCF and a target H-PCF, the first AMF triggers establishment of terminal contexts on the target V-PCF and the target H-PCF, and the first AMF may subscribe to a service of the target PCF. To be more specific, when determining that the policy information is changed, the target PCF actively sends updated policy information to the first AMF. Therefore, the first AMF obtains the policy information from the target PCF, to ensure that the terminal smoothly accesses the network.

Further, optionally, the first AMF triggers the target PCF to update a context established for the terminal. Alternatively, when the target PCF includes a target V-PCF and a target H-PCF, the first AMF triggers update of terminal contexts on the target V-PCF and/or the target H-PCF, and the first AMF may subscribe to a service of the target PCF. To be more specific, when determining that the policy information is changed, the target PCF actively sends updated policy information to the first AMF. Therefore, the first AMF obtains the policy information from the target PCF, to ensure that the terminal smoothly accesses the network.

Figure 5:
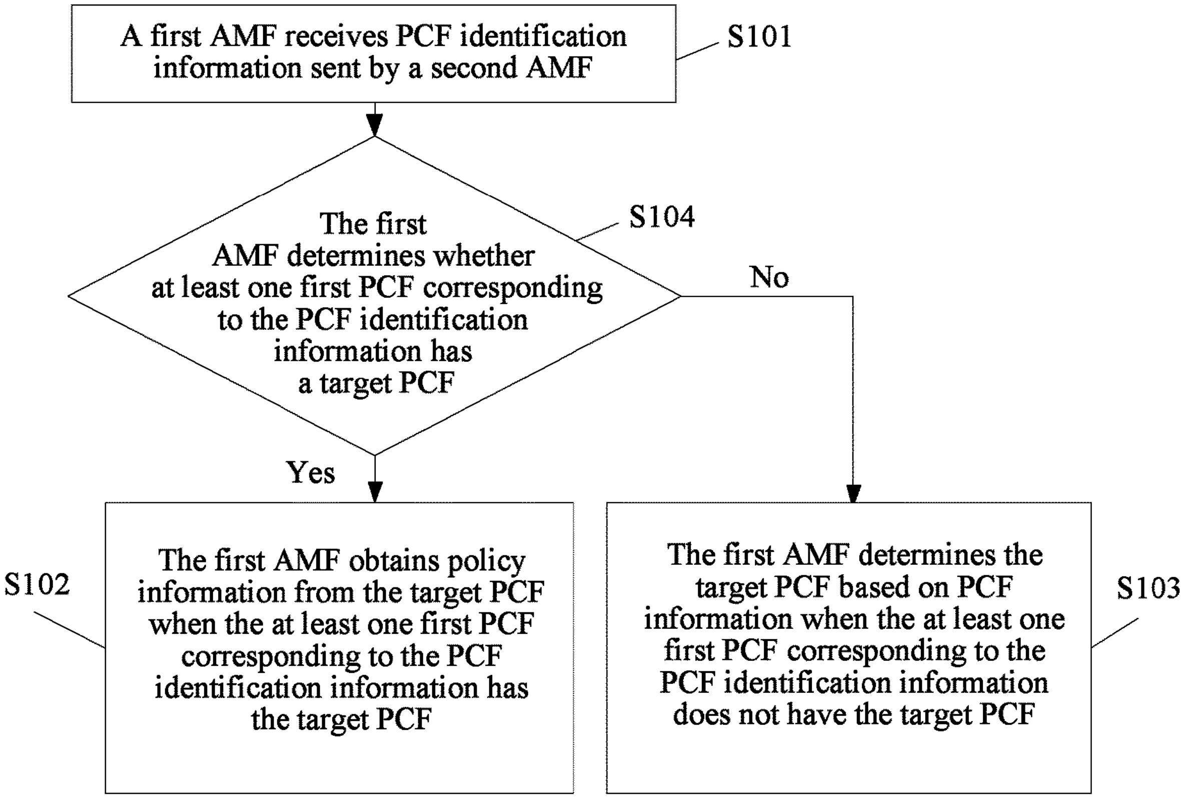
FIG. 5 is a second schematic diagram of a PCF determining method according to an embodiment of the present application.

With reference to FIG. 4, as shown in FIG. 5, the PCF determining method provided in this embodiment of the present application may further include S103.

S103. The first AMF determines the target PCF based on PCF information when the at least one first PCF corresponding to the PCF identification information does not include the target PCF.

In this embodiment of the present application, the PCF information includes identification information of at least one second PCF, where identification information of each of the at least one second PCF includes at least one of an IP address of the second PCF, an IP prefix of the second PCF, or an FQDN of the second PCF.

In this embodiment of the present application, the PCF information may be PCF information obtained by the first AMF by interacting with the NRF in the network, or PCF information stored in (for example, locally preconfigured by) the first AMF. Therefore, the first AMF may determine the target PCF based on the PCF information, in order to ensure that the policy information is obtained, thereby ensuring that the terminal smoothly accesses the network.

For other detailed descriptions of the identification information of the second PCF, refer to the descriptions of the identification information of the first PCF in S101. Details are not described herein again.

It should be noted that, in this embodiment of the present application, a method for the first AMF to determine the target PCF based on the PCF information may be similar to a method for the first AMF to determine the target PCF based on the PCF identification information obtained by the first AMF from the second AMF in S102. Therefore, for the method for the first AMF to determine the target PCF based on the PCF information, refer to the related descriptions of S102. Details are not described herein again.

As shown in FIG. 5, after S101, the PCF determining method provided in this embodiment of the present application may further include S104.

S104. The first AMF determines whether the at least one first PCF corresponding to the PCF identification information includes the target PCF.

In this embodiment of the present application, the first AMF may determine, based on an object served by the first AMF (for example, a network slice supported by the first AMF or a PLMN to which the first AMF belongs) or an object served by a PCF used by the second AMF (for example, a network slice supported by the PCF or a PLMN to which the PCF belongs), whether the at least one first PCF corresponding to the PCF identification information sent by the second AMF includes the target PCF. For example, if the at least one first PCF corresponding to the PCF identification information includes a PCF that may serve an object served by the first AMF, the first AMF determine that the at least one first PCF corresponding to the PCF identification information includes the target PCF. Alternatively, when an object served by a PCF (that is, a PCF that may provide a service to the terminal and that is determined by the second AMF when the terminal accesses the network last time) used by the second AMF includes an object served by the first AMF (if the PCF used by the second AMF serves an entire PLMN, the first AMF belongs to the PLMN), the first AMF determines that the at least one first PCF corresponding to the PCF identification information includes the target PCF.

If the first AMF determines that each of the at least one first PCF corresponding to the PCF identification information cannot serve the first AMF (that is, the at least one first PCF corresponding to the PCF identification information has no available PCF), the first AMF determines that the at least one first PCF corresponding to the PCF identification information does not include the target PCF; or if the first AMF determines that an object served by each PCF of the at least one first PCF corresponding to the PCF identification information does not include an object served by the first AMF, the first AMF determines that the at least one PCF corresponding to the PCF identification information does not include the target PCF.

Further, in this embodiment of the present application, a PCF that may serve an object served by the first AMF and that is of the at least one first PCF corresponding to the PCF identification information may be used as the target PCF, or a PCF that serves objects including an object served by the first AMF and that is of the at least one first PCF corresponding to the PCF identification information may be used as the target PCF.

For example, using the determining, based on an object of a PCF used by the second AMF, whether the at least one first PCF corresponding to the PCF identification information includes the target PCF as an example, if the first AMF determines that the at least one first PCF corresponding to the PCF identification information has one or more first PCFs, and objects served by the one or more first PCFs include an object served by the first AMF, assuming that one of the at least one first PCF corresponding to the PCF identification information may serve a VPLMN 1, the first AMF may serve a network slice 1, and the VPLMN 1 includes the network slice 1, to be more specific, the network slice 1 is one network slice in the VPLMN 1, the first AMF determines that the first PCF is the target PCF.

Optionally, in this embodiment of the present application, the first AMF determines, based on at least one of an object served by the first AMF or an object served by a PCF used by the second AMF, that there may be a plurality of first PCFs corresponding to the PCF identification information. To be more specific, there are a plurality of available PCFs. In this case, the first AMF may determine the target PCF in the plurality of available PCFs. Optionally, the first AMF may select, based on a PCF load status, one PCF having minimum load from a plurality of PCFs as the target PCF; or the first AMF may select one PCF closest to the terminal from a plurality of PCFs as the target PCF, or the first AMF may select any PCF from a plurality of available PCFs as the target PCF.

Further, the first AMF preferentially determines whether the PCF used by the second AMF in the process in which the terminal accesses the network last time is available. If the PCF used by the second AMF is unavailable, the first AMF determines whether information about other PCF instances is available. For example, the target PCF may be determined in a plurality of PCFs based on an actual use requirement. This is not limited in this embodiment of the present application.

Optionally, in this embodiment of the present application, the second AMF may send only PCF identification information corresponding to a PCF used by the second AMF to the first AMF. Therefore, the first AMF determines whether the PCF is available, and if the PCF is available, the first AMF uses the PCF as the target PCF. The second AMF may further determine PCF identification information corresponding to at least one available PCF based on an object served by the first AMF, and then send the PCF identification information to the first AMF. Therefore, the first AMF may directly use the at least one PCF corresponding to the PCF identification information.

Based on the PCF determining method provided in this embodiment of the present application, in the process in which the terminal accesses the network, the first AMF providing a service for the terminal to access the network this time may receive the PCF identification information sent by the second AMF providing a service for the terminal to access the network last time, and the first AMF obtains the policy information from the target PCF when the at least one first PCF corresponding to the PCF identification information includes the target PCF. Compared with some approaches, in this embodiment of the present application, because the at least one first PCF corresponding to the PCF identification information includes the target PCF, the first AMF does not need to interact with the NRF to determine the target PCF, thereby reducing, to some extent, signaling overheads required for determining a PCF.

Optionally, in this embodiment of the present application, when the first AMF determines that the at least one first PCF corresponding to the PCF identification information includes the target PCF, the PCF determining method provided in this embodiment of the present application may further include S105.

S105. The first AMF sends first indication information to the second AMF.

The first indication information (which may also be referred to as management indication information) is used to notify the second AMF that the first AMF determines the target PCF in the at least one first PCF corresponding to the PCF identification information, to be more specific, the first AMF determines to use the at least one first PCF corresponding to the PCF identification information, or the first indication information is used to instruct the second AMF when receiving a terminal context management deletion notification sent by a UDM function, to delete a terminal context stored in the second AMF and reserve the terminal context stored in the target PCF.

In this embodiment of the present application, when the first AMF determines that the at least one first PCF corresponding to the PCF identification information includes the target PCF, the first AMF may notify, by sending indication information to the second AMF, the second AMF that the first AMF uses the at least one first PCF corresponding to the PCF identification information, that is, notify the second AMF that the first AMF determines to use the at least one first PCF corresponding to the PCF identification information. For example, when receiving the terminal context management deletion notification sent by the UDM function, the second AMF deletes, under an instruction of the first indication information, only the terminal context stored in the second AMF, and does not instruct the target PCF to delete the terminal context stored in the target PCF, that is, reserves the terminal context stored in the target PCF.

Optionally, in this embodiment of the present application, the first indication information may be carried in a message or a service sent by the first AMF to the second AMF in the process in which the terminal accesses the network, for example, a registration complete notification sent by the first AMF to the second AMF, or the first indication information may be carried in another message or implemented using different message types or different service types. This is not specifically limited in this embodiment of the present application.

In this embodiment of the present application, the first indication information may be represented using “0” or “1”. For example, “0” may be used to represent that the first AMF determines the target PCF in the at least one first PCF corresponding to the PCF identification information, or “1” may be used to represent that the first AMF determines the target PCF in the at least one first PCF corresponding to the PCF identification information. Certainly, in this embodiment of the present application, the first indication information may be further set using other signs satisfying an actual use requirement, and the signs are not listed one by one in this embodiment of the present application.

Optionally, with reference to FIG. 4, in this embodiment of the present application, when the first AMF determines that the at least one first PCF corresponding to the PCF identification information includes the target PCF, the PCF determining method provided in this embodiment of the present application may further include S106.

S106. The first AMF sends second indication information to the target PCF.

The second indication information (which may also be referred to as update indication information) is used to instruct the target PCF to update the terminal context.

In this embodiment of the present application, because an (R)AN has selected a new AMF, that is, the first AMF for the terminal, and the first AMF determines to use the at least one first PCF corresponding to the PCF identification information provided by the second AMF (herein, the used first PCF is the target PCF), the target PCF may update, based on the second indication information sent by the first AMF, the terminal context stored in the target PCF. Therefore, in a subsequent process of accessing a network, the target PCF may provide the policy information to the first AMF.

For example, using an example in which the terminal is located in an HPLMN, after the terminal accesses the network last time, the terminal context stored in the PCF providing a service to the terminal (that is, the target PCF determined in the process in which the terminal accesses the network this time) includes an ID of the second AMF. In the process in which the terminal accesses the network this time, if the AMF selected by the (R)AN is the first AMF, the updating, by the target PCF, the terminal context based on the second indication information includes deleting, by the target PCF, the ID of the second AMF from the terminal context stored in the target PCF, and storing an ID of the first AMF, that is, replacing the ID of the second AMF with the ID of the first AMF.

Optionally, in this embodiment of the present application, when the first AMF determines that the at least one first PCF corresponding to the PCF identification information includes the target PCF, the PCF determining method provided in this embodiment of the present application may further include S107.

S107. The first AMF sends third indication information to the target PCF.

The third indication information (which may also be referred to as stop indication information) is used to instruct the target PCF to stop sending the policy information to the first AMF, or the third indication information is used to instruct the target PCF to send the policy information to the first AMF.

Optionally, in this embodiment of the present application, the first AMF receives the policy information sent by the second AMF, and if the policy information sent by the second AMF is available, the third indication information sent by the first AMF to the target PCF may be used to instruct the target PCF to stop sending the policy information to the first AMF, to be more specific, the target PCF does not need to send the policy information to the first AMF; or if the policy information sent by the second AMF is unavailable, the third indication information sent by the first AMF to the target PCF may be used to instruct the target PCF to send the policy information to the first AMF, to be more specific, the first AMF obtains the policy information again from the target PCF.

Optionally, in this embodiment of the present application, the second indication information and the third indication information may be carried in a message or a service sent by the first AMF to the target PCF when the terminal accesses the network, for example, a policy control obtaining service sent by the first AMF to the target PCF, or the second indication information and the third indication information may be carried in other messages or services, or may be indicated using different message names or service names. This is not specifically limited in this embodiment of the present application.

It should be noted that, in this embodiment of the present application, the second indication information and the third indication information may be carried in a same message or service. For example, the second indication information and the third indication information may be both carried in a policy control service sent by the first AMF to the target PCF, or the second indication information and the third indication information may be respectively carried in different messages or services, or may be indicated using different message names or service names. This may be determined based on an actual use requirement, and is not limited in this embodiment of the present application.

Optionally, in this embodiment of the present application, when the first AMF determines that the at least one first PCF corresponding to the PCF identification information does not include the target PCF, the first indication information may be used to indicate, to the second AMF, that the target PCF is different from the first PCF, to be specific, the first indication information may be used to instruct that the first AMF has not determined the target PCF in the at least one first PCF corresponding to the PCF identification information, that is, has not used the at least one first PCF corresponding to the PCF identification information; or the first indication information is used to instruct the second AMF when receiving the terminal context management deletion notification sent by the UDM function, to delete, based on the first indication information, the terminal context stored in the second AMF, and delete the terminal context stored in the at least one first PCF corresponding to the PCF identification information. Therefore, when receiving the terminal context management deletion notification sent by the UDM function, the second AMF deletes the terminal context stored in the second AMF, and sends a policy deletion request to the at least one first PCF corresponding to the PCF identification information, so as to delete the terminal context stored in the at least one first PCF corresponding to the PCF identification information.

In this embodiment of the present application, the process in which the terminal accesses the network is a complex process, the process in which the terminal accesses the network further includes a plurality of other signaling interworking steps, and the steps described in the foregoing embodiment are only steps of determining the target PCF in the process in which the terminal accesses the network. In the following embodiments, a complete process in which the terminal accesses the network and a related application scenario as an example to describe in detail the PCF determining method provided in this embodiment of the present application.

In the process in which the terminal accesses the network, because the network accessed by the terminal last time and the network accessed by the terminal this time may be a same network or may be different networks, and the terminal may be in a roaming state or may be in a non-roaming state, it can be learned that there are a plurality of scenarios in the process in which the terminal accesses the network. Therefore, a method for determining a PCF in the process in which the terminal accesses the network may be described in detail from the perspective of different scenarios. Based on the network accessed by the terminal and whether the terminal is in the roaming state, the PCF determining method provided in this embodiment of the present application may be applied to the following five scenarios that are respectively marked as a first scenario, a second scenario, a third scenario, a fourth scenario, and a fifth scenario.

First scenario. The network accessed by the terminal last time is an HPLMN, and the network accessed by the terminal this time is also an HPLMN. It can be learned that the terminal is in the non-roaming state.

Second scenario. The network accessed by the terminal last time and the network accessed by the terminal this time are both a same VPLMN. It can be learned that the terminal is in the roaming state.

Third scenario. The network accessed by the terminal last time is a first VPLMN, and the network accessed by the terminal this time is a second VPLMN, where the first VPLMN is different from the second VPLMN. It can be learned that the terminal is in the roaming state.

Fourth scenario. The network accessed by the terminal last time is an HPLMN, and the network accessed by the terminal this time is a VPLMN. In this case, the terminal is changed from the non-roaming state to the roaming state.

Fifth scenario. The network accessed by the terminal last time is a VPLMN, and the network accessed by the terminal this time is an HPLMN. It can be learned that the terminal is changed from the roaming state to the non-roaming state.

It should be noted that, in this embodiment of the present application, when the terminal is in the non-roaming state, that is, when the terminal is located in an HPLMN, a PCF serving the terminal is a PCF in the HPLMN of the terminal, which may be marked as an H-PCF. Alternatively, when the terminal is in the roaming state, that is, when the terminal is located in a VPLMN, PCFs serving the terminal include a PCF in the VPLMN in which the terminal is located, which may be marked as a V-PCF, and a PCF in an HPLMN of the terminal (that is, an H-PCF). For example, the V-PCF may interact with the H-PCF, in order to obtain the policy information.

A method for determining a PCF in the process in which the terminal accesses the network is described below using the foregoing five scenarios separately.

First Scenario

With reference to FIG. 1, a network accessed by a terminal last time is an HPLMN, a network accessed by the terminal this time is also an HPLMN, the terminal is in a non-roaming state, a target PCF that needs to be determined in a process in which the terminal accesses the network this time is a target H-PCF, and a PCF determining method provided in an embodiment of the present application may include the following steps.

S201. The terminal sends a registration request message to an (R)AN.

S202. After receiving the registration request message, the (R)AN performs an AMF selection process, and determines that a first AMF provides a service to the terminal.

In this embodiment of the present application, in a process in which the terminal accesses a network, the (R)AN performs the AMF selection process, and the (R)AN determines that the first AMF providing a service for the terminal to access the network this time. Therefore, the first AMF may select another service function, and interact with the other service function to complete registration of the terminal. As such, the terminal accesses the network.

S203. The (R)AN sends the registration request message to the first AMF.

In this embodiment of the present application, the (R)AN selects, for the terminal, a new AMF, that is, the first AMF providing a service for the terminal, and the terminal first completes registration on the first AMF. Therefore, the (R)AN sends the registration request message of the terminal to the first AMF.

S204. The first AMF sends a terminal context transmission service to a second AMF.

The first AMF is an AMF providing a service for the terminal to access a network this time, and the second AMF is an AMF providing a service for the terminal to access a network last time.

In this embodiment of the present application, the first AMF determines the second AMF based on the registration request message received by the first AMF, and to obtain a terminal context in the second AMF, the first AMF sends the terminal context transmission service to the second AMF.

S205. The second AMF sends a terminal context response message to the first AMF, where the response message carries PCF identification information.

In this embodiment of the present application, the PCF identification information is used to determine the target PCF, and at least one first PCF corresponding to the PCF identification information (which may include one or more PCFs) includes a PCF determined by the second AMF (which may be understood as a PCF used by the second AMF) when the terminal accesses the network last time, and may also include some other PCF information (which may also be referred to as PCF instance information or PCF service instance information) obtained by the second AMF when the terminal accesses the network last time.

Optionally, in this embodiment of the present application, the second AMF may send, to the first AMF, only PCF identification information corresponding to the PCF used by the second AMF; and the second AMF may further determine PCF identification information corresponding to at least one available PCF based on an object served by the first AMF, and then send the PCF identification information to the first AMF. For example, if the object served by the first AMF is a PLMN 1, identification information corresponding to a PCF of the PLMN 1 is provided (identification information corresponding to a PCF in the PLMN 1 is provided).

For other detailed descriptions of the PCF identification information, refer to the related descriptions of the PCF identification information in S101. Details are not described herein again.

S206. The first AMF determines whether the at least one first PCF corresponding to the PCF identification information includes the target PCF.

For detailed descriptions of S206, refer to the related descriptions of S102 in the foregoing embodiment. Details are not described herein again.

In this embodiment of the present application, if the first AMF determines that the at least one first PCF corresponding to the PCF identification information does not include the target PCF, the first AMF interacts with an NRF (for details, refer to the related descriptions of S105) or the first AMF determines a target H-PCF based on PCF information stored in the first AMF (that is, locally configured PCF information), to be more specific, S207 to S223 may be performed after S206; or if the first AMF determines that the at least one first PCF corresponding to the PCF identification information includes the target PCF, the first AMF determines a target H-PCF in the at least one first PCF corresponding to the PCF identification information, to be more specific, S207*a* to S224*a* may be performed after S206 to complete access of the terminal to the network.

Figure 6A:
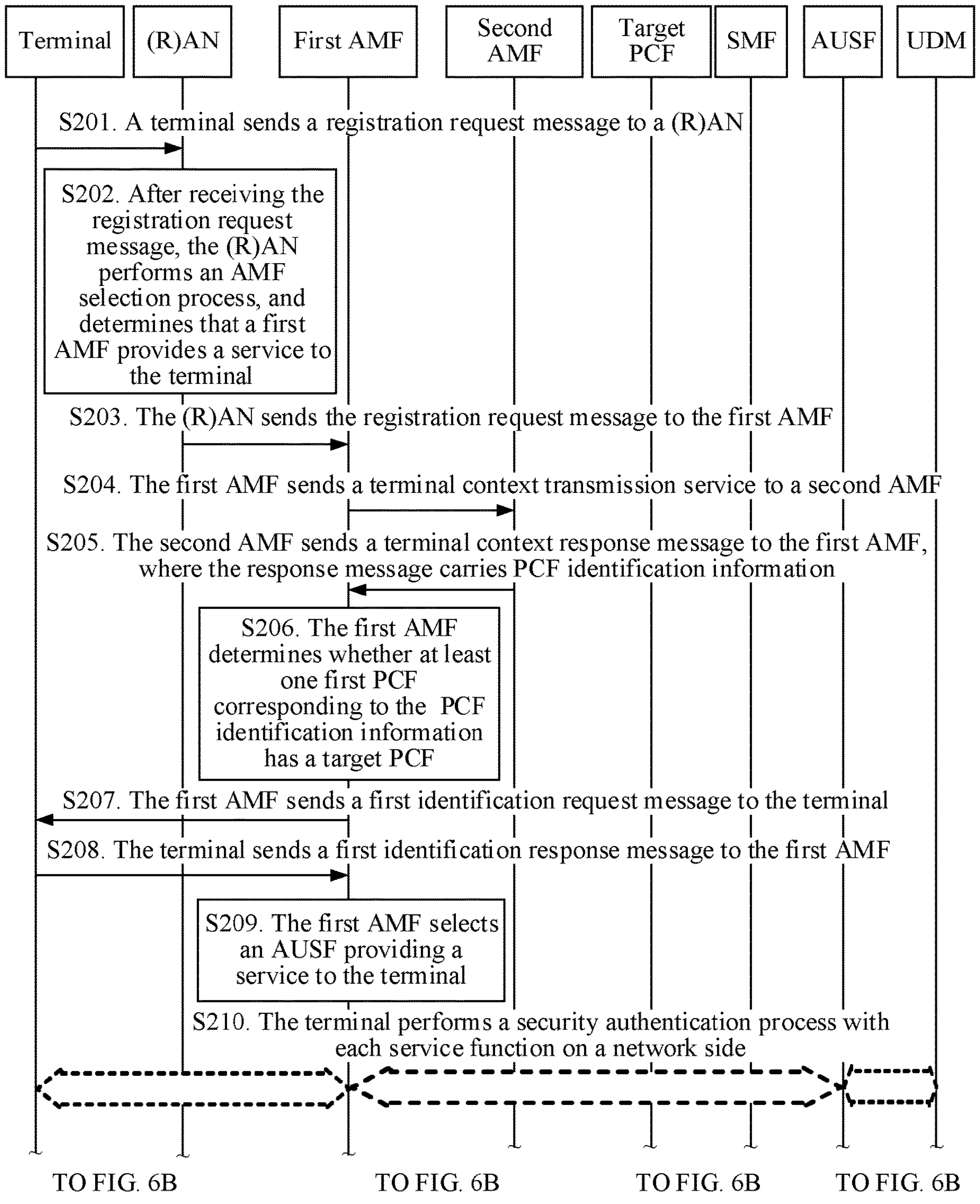
FIG. 6A and FIG. 6B are a third schematic diagram of a PCF determining method according to an embodiment of the present application.
Figure 6B:
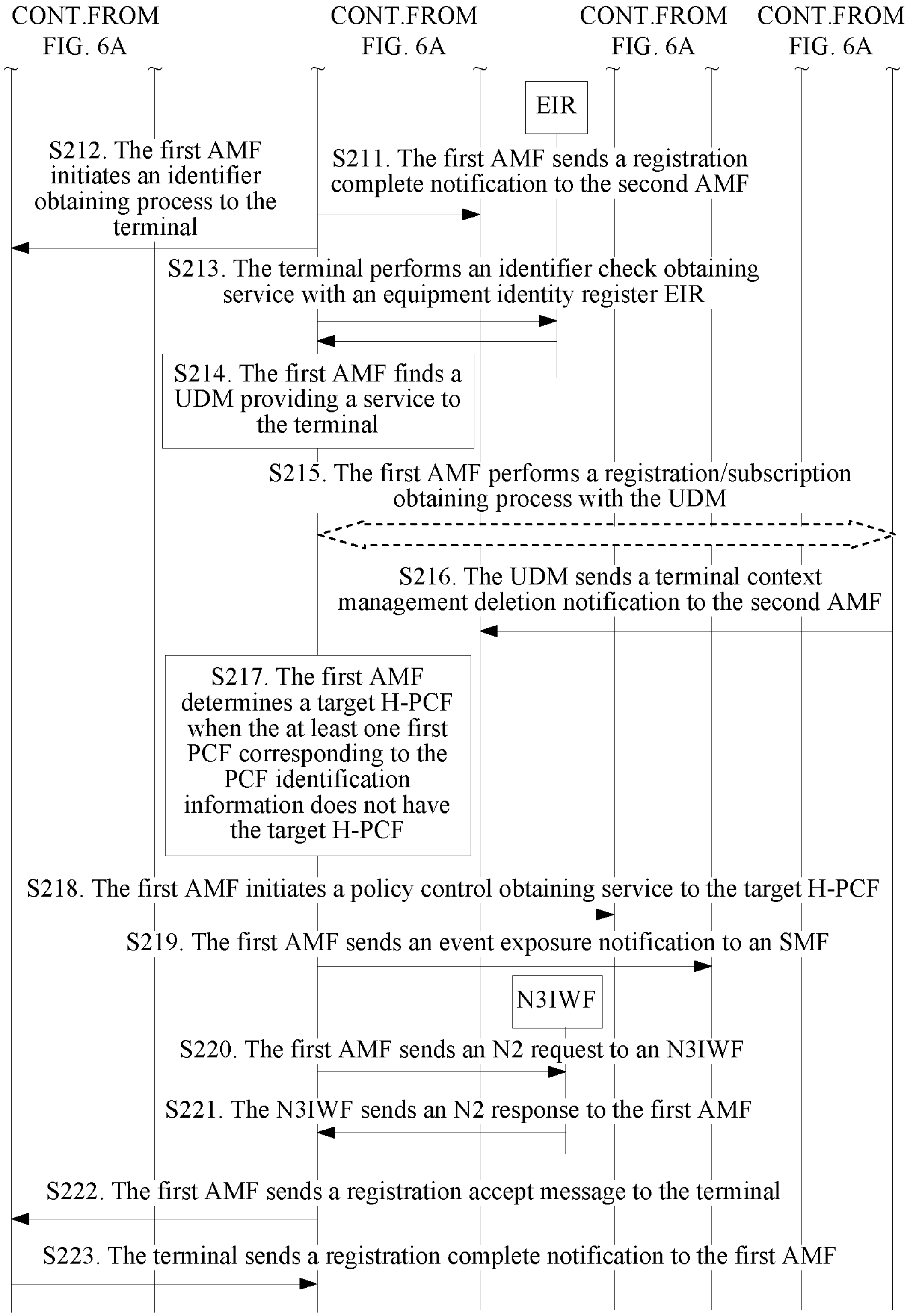

With reference to FIG. 1, as shown in FIG. 6A and FIG. 6B, in the process in which the terminal accesses the network, S207 to S223 may be performed after S206.

S207. The first AMF sends a first identification request message to the terminal.

S208. The terminal sends a first identification response message to the first AMF.

In this embodiment of the present application, after the (R)AN determines the new AMF (that is, the first AMF), optionally, when the terminal context obtained by the first AMF is unavailable, the first AMF may request identification information of the terminal from the terminal. Therefore, the first AMF determines that the first AMF provides a service to the lawful terminal.

It should be noted that, in this embodiment of the present application, the identification information herein is a subscription permanent identifier (SUPI), that is, an SUPI of the terminal.

S209. The first AMF selects an AUSF providing a service to the terminal.

In this embodiment of the present application, in the process in which the terminal accesses the network, the first AMF may select the AUSF serving the terminal. Therefore, the terminal may complete authentication in the AUSF. To be more specific, the terminal is a lawful user of the network.

S210. The terminal performs a security authentication process with each service function on a network side.

In this embodiment of the present application, service functions on the network side that are related to the security authentication process include the first AMF, the AUSF, and a UDM.

S211. The first AMF sends a registration complete notification to the second AMF.

The registration complete notification is used to indicate that the terminal is registered with the first AMF successfully.

S212. The first AMF initiates an identifier obtaining process to the terminal.

In this embodiment of the present application, the initiating, by the first AMF, an identifier obtaining process to the terminal may include sending, by the first AMF, a second identification request message to the terminal, and receiving a second identification response message sent by the terminal, where the second identification response message includes identification information of the terminal.

It should be noted that, in this embodiment of the present application, the identification information herein is a permanent equipment identifier (PEI), that is, a PEI of the terminal.

S213. The terminal performs an identifier check obtaining service with an equipment identity register (EIR).

The EIR is a device storing a lawful equipment identity.

S214. The first AMF finds a UDM providing a service to the terminal.

S215. The first AMF performs a registration/subscription obtaining process with the UDM.

S216. The UDM sends a terminal context management deletion notification to the second AMF.

In this embodiment of the present application, after the first AMF completes the registration/subscription obtaining process with the UDM, the second AMF performs a deregistration process between the second AMF and the UDM. For example, the UDM sends the terminal context management deletion notification to the second AMF, and after the second AMF receives the terminal context management deletion notification, the second AMF usually deletes a terminal context stored in the second AMF, and initiates a policy control deletion service to the at least one first PCF corresponding to the PCF identification information obtained by the second AMF, in order to instruct the first PCF to delete a terminal context stored in the first PCF.

S217. The first AMF determines the target H-PCF when the at least one first PCF corresponding to the PCF identification information does not include the target H-PCF.

In this embodiment of the present application, if the first AMF determines that the at least one first PCF corresponding to the PCF identification information does not include the target PCF, the first AMF interacts with an NRF in a network (in the first scenario, each NRF in the following is an NRF in an HPLMN, which may be referred to as an H-NRF) to determine the target H-PCF. For example, the first AMF interacts with the NRF to obtain PCF information, and determines the target H-PCF based on the PCF information. Alternatively, the first AMF determines the target H-PCF based on PCF information stored in the first AMF.

Optionally, in this embodiment of the present application, when the terminal context response message sent by the second AMF to the first AMF in S205 does not include the PCF identification information, the first AMF interacts with the NRF to determine the target H-PCF, or the first AMF determines the target H-PCF based on the PCF information stored in the first AMF.

For example, when the first AMF interacts with the NRF in the network, the determining, by the first AMF, the target H-PCF in S217 may be implemented through S2171 to S2174.

S2171. The first AMF sends an NF discovery request service to the NRF.

In this embodiment of the present application, the first AMF sends the NF discovery request service to the NRF. To be more specific, the first AMF makes a request to the NRF to discover the PCF information stored in the NRF.

S2172. The NRF authorizes the NF discovery request service sent by the first AMF.

In this embodiment of the present application, after the NRF receives the NF discovery request service sent by the first AMF, the NRF may determine, based on the discovery request service, that the first AMF is authorized to obtain the PCF information stored in the NRF. Therefore, the first AMF may obtain the PCF information from the NRF.

S2173. The NRF sends an NF discovery request service response to the first AMF.

S2174. The first AMF determines the target H-PCF based on the PCF information.

In this embodiment of the present application, the NRF may send the PCF information to the first AMF by sending the NF discovery request service response to the first AMF. Therefore, the first AMF may determine the target H-PCF based on the PCF information, such that the terminal smoothly accesses the network.

S218. The first AMF initiates a policy control obtaining service to the target H-PCF.

In this embodiment of the present application, after the first AMF determines the target H-PCF, the first AMF initiates the policy control obtaining service to the target H-PCF, in order to obtain the policy information from the target H-PCF.

S219. The first AMF sends an event exposure notification to an SMF.

S220. The first AMF sends an N2 request to a non-3GPP interworking function (N3IWF).

S221. The N3IWF sends an N2 response to the first AMF. N2 is an interface between an AMF and the N3IWF.

It should be noted that, in this embodiment of the present application, if the terminal accesses a non-3GPP network, S220 and S221 need to be performed, such that the first AMF establishes a connection with the N3IWF.

S222. The first AMF sends a registration accept message to the terminal.

S223. The terminal sends a registration complete notification to the first AMF.

Optionally, in this embodiment of the present application, the second AMF may initiate the policy control deletion service to the PCF used by the second AMF. When the second AMF determines that the first AMF does not use the PCF used by the second AMF, after the second AMF receives the terminal context management deletion notification sent by the UDM, the second AMF may initiate the policy control deletion service to the PCF used by the second AMF, in order to delete the terminal context stored in the PCF used by the second AMF.

So far, the process of determining a PCF in the process in which the terminal accesses the network is completed.

Figure 7A:
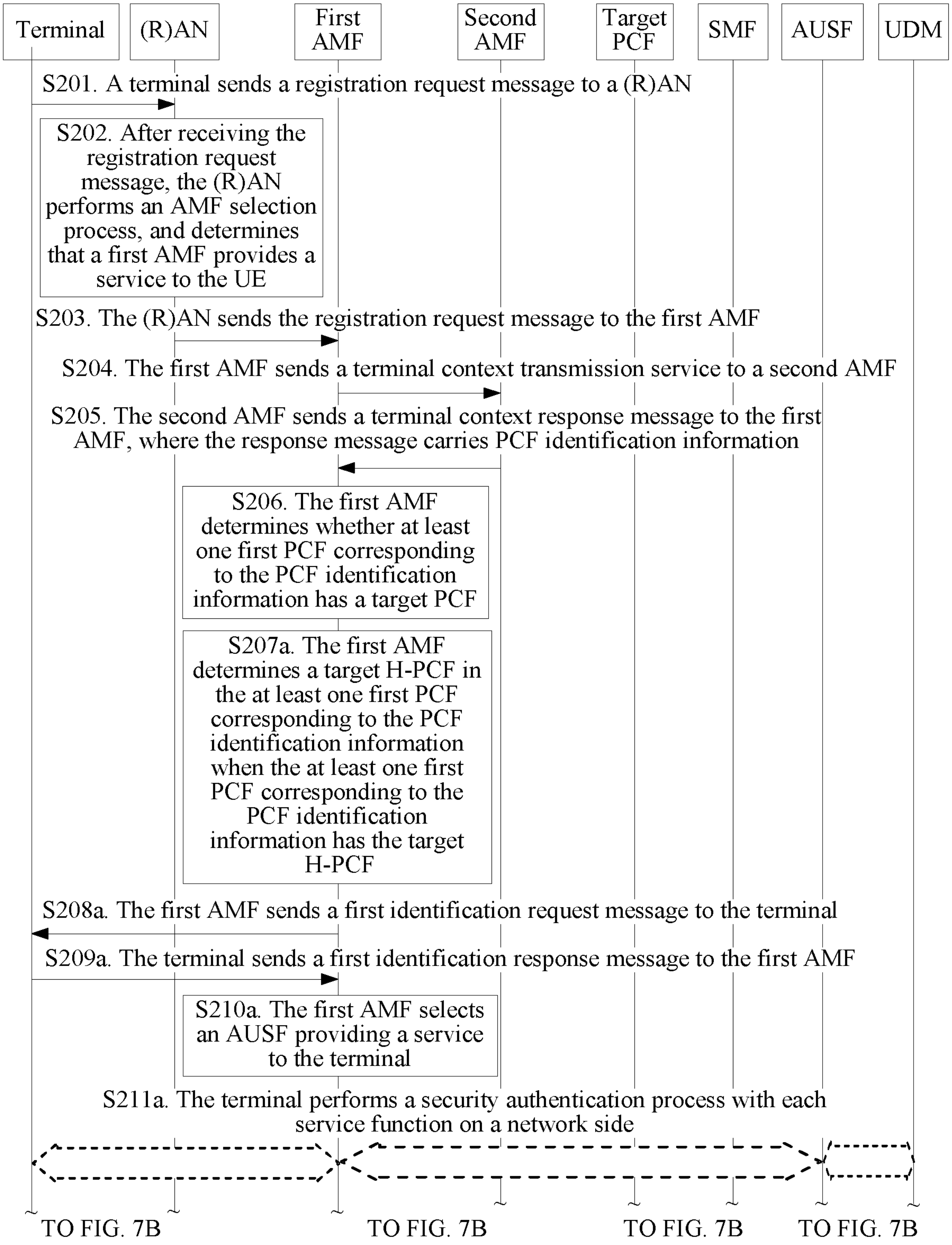
FIG. 7A and FIG. 7B are a fourth schematic diagram of a PCF determining method according to an embodiment of the present application.
Figure 7B:
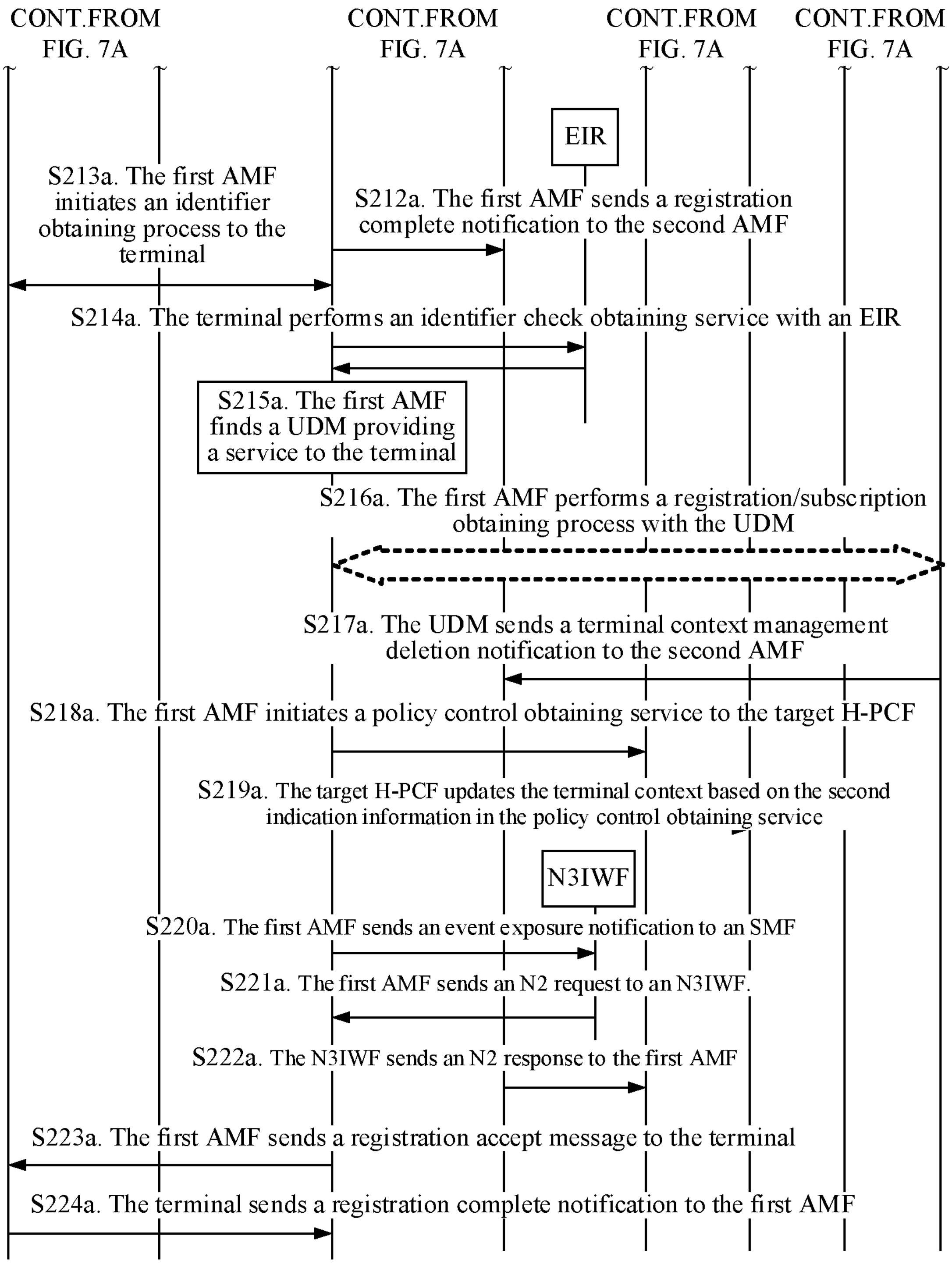

With reference to FIG. 1, as shown in FIG. 7A and FIG. 7B, a method for determining a PCF in the process in which the terminal accesses the network includes S201 to S206, and S207*a* to S224*a*.

S207*a*. The first AMF determines the target H-PCF in the at least one first PCF corresponding to the PCF identification information when the at least one first PCF corresponding to the PCF identification information includes the target H-PCF.

For descriptions of the method for determining the target H-PCF in S207*a*, refer to the related descriptions of the method for determining the target PCF in S102 in the foregoing embodiment. Details are not described herein again.

S208*a*. The first AMF sends a first identification request message to the terminal.

S209*a*. The terminal sends a first identification response message to the first AMF.

S210*a*. The first AMF selects an AUSF providing a service to the terminal.

S211*a*. The terminal performs a security authentication process with each service function on a network side.

For detailed descriptions of S208*a* to S211*a*, refer to the related descriptions of S207 to S210. Details are not described herein again.

S212*a*. The first AMF sends a registration complete notification to the second AMF.

The registration complete notification is used to indicate that the terminal is registered with the first AMF successfully.

Optionally, in this embodiment of the present application, the registration complete notification sent by the first AMF to the second AMF may carry first indication information. For the related descriptions of the first indication information, refer to the descriptions of S105. Details are not described herein again.

S213*a*. The first AMF initiates an identifier obtaining process to the terminal.

S214*a*. The terminal performs an identifier check obtaining service with an EIR.

S215*a*. The first AMF finds a UDM providing a service to the terminal.

S216*a*. The first AMF performs a registration/subscription obtaining process with the UDM.

For detailed descriptions of S213*a* to S216*a*, refer to the related descriptions of S212 to S215. Details are not described herein again.

S217*a*. The UDM sends a terminal context management deletion notification to the second AMF.

In this embodiment of the present application, because the first AMF determines to use the PCF (that is, the target PCF) in the at least one first PCF corresponding to the PCF identification information, and through S205, the terminal context response message received by the second AMF carries the first indication information, after the second AMF receives the terminal context management deletion notification, the second AMF deletes, based on a function of the first indication information described in the foregoing embodiment, the terminal context stored in the second AMF, and reserves the terminal context stored in the target H-PCF. To be more specific, the second AMF does not initiate the policy control deletion service to the target H-PCF. Therefore, the terminal context stored in the target H-PCF may be reserved, and it may also be understood that the target H-PCF may still provide the policy information.

S218*a*. The first AMF initiates a policy control obtaining service to the target H-PCF.

Optionally, the first AMF determines the target H-PCF in the at least one first PCF corresponding to the PCF identification information, and the first AMF may add the second indication information to the policy control obtaining service.

S219*a*. The target H-PCF updates the terminal context based on the second indication information in the policy control obtaining service.

In this embodiment of the present application, the updating, by the target H-PCF, the terminal context based on the second indication information may include deleting, by the target H-PCF, an ID of the second AMF from the target H-PCF, and storing an ID of the first AMF.

Optionally, in this embodiment of the present application, the policy control obtaining service may further carry third indication information. For detailed descriptions of the third indication information, refer to the related descriptions of S107. Details are not described herein again.

S220*a*. The first AMF sends an event exposure notification to an SMF.

S221*a*. The first AMF sends an N2 request to an N3IWF.

S222*a*. The N3IWF sends an N2 response to the first AMF.

S223*a*. The first AMF sends a registration accept message to the terminal.

S224*a*. The terminal sends a registration complete notification to the first AMF.

So far, the process in which the terminal accesses the network is completed. In this embodiment of the present application, when the at least one first PCF corresponding to the PCF identification information includes the target H-PCF, the first AMF obtains the policy information from the target H-PCF. Therefore, the first AMF does not need to interact with an NRF to determine the target H-PCF, thereby reducing, to some extent, signaling overheads required for determining the target PCF.

Second Scenario

With reference to FIG. 1, the network accessed by the terminal last time and the network accessed by the terminal this time are a same VPLMN, and the terminal is in the roaming state. In the process in which the terminal accesses the network this time, target PCFs that need to be determined include a target V-PCF and a target H-PCF, the process in which the terminal accesses the network in the second scenario is similar to the process in the first scenario, and only steps different from those in the first scenario are described below in detail. For each of other steps, refer to a related step in the first scenario.

S301. The terminal sends a registration request message to an (R)AN.

S302. After receiving the registration request message, the (R)AN performs a process of selecting an AMF, and determines that a first AMF provides a service to the terminal.

S303. The (R)AN sends the registration request message to the first AMF.

S304. The first AMF sends a terminal context transmission service to a second AMF.

S305. The second AMF sends a terminal context response message to the first AMF, where the response message carries PCF identification information.

At least one first PCF corresponding to the PCF identification information includes at least one H-PCF and at least one V-PCF.

For other detailed descriptions of the PCF identification information, refer to the related descriptions of the PCF identification information in S101. Details are not described herein again.

S306. The first AMF determines whether the at least one first PCF corresponding to the PCF identification information includes the target PCF.

In this embodiment of the present application, the determining, by the first AMF, whether the at least one first PCF corresponding to the PCF identification information includes the target PCF is determining, by the first AMF, whether the at least one first PCF corresponding to the PCF identification information includes a target V-PCF and a target H-PCF.

In this embodiment of the present application, if the first AMF determines that the at least one first PCF corresponding to the PCF identification information does not include the target H-PCF and the target V-PCF, S307 to S323 may be performed after S306; or if the first AMF determines that the at least one first PCF corresponding to the PCF identification information includes the target H-PCF and the target V-PCF, S307*a* to S324*a* may be performed after S306 to complete access of the terminal to the network.

With reference to FIG. 1, in the process in which the terminal accesses the network, S307 to S323 may be performed after S306.

S307. The first AMF sends a first identification request message to the terminal.

S308. The terminal sends a first identification response message to the first AMF.

S309. The first AMF selects an AUSF providing a service to the terminal.

S310. The terminal performs a security authentication process with each service function on a network side.

S311. The first AMF sends a registration complete notification to the second AMF.

The registration complete notification is used to indicate that the terminal is registered with the first AMF successfully.

S312. The first AMF initiates an identifier obtaining process to the terminal.

S313. The terminal performs an identifier check obtaining service with an EIR.

S314. The first AMF finds a UDM providing a service to the terminal.

S315. The first AMF performs a registration/subscription obtaining process with the UDM.

S316. The UDM sends a terminal context management deletion notification to the second AMF.

S317. The first AMF determines the target H-PCF and the target V-PCF when the at least one first PCF corresponding to the PCF identification information does not include the target H-PCF and the target V-PCF.

In this embodiment of the present application, if the first AMF determines that the at least one first PCF corresponding to the PCF identification information does not include the target H-PCF and the target V-PCF, the first AMF interacts with an NRF in the network to determine the target H-PCF and the target V-PCF. For example, the first AMF may interact with a V-NRF to obtain V-PCF information, and determine the target V-PCF based on H-PCF information, where the V-NRF is an NRF in a V-PLMN. Additionally, the first AMF may interact with the V-NRF and an H-NRF to obtain the H-PCF information, and determine the target H-PCF based on the PCF information. Alternatively, the first AMF obtains the V-PCF information and the H-PCF information that are locally stored, determines the target V-PCF based on the V-PCF information, and determines the target H-PCF based on the H-PCF information.

For a method for interacting, by the first AMF, with the V-NRF to determine the target V-PCF, refer to the related descriptions of S217 (which includes S2171 to S2174) in the first scenario. Details are not described herein again.

In this embodiment of the present application, a method for interacting, by the first AMF, with the V-NRF and the H-NRF to determine the target H-PCF may include S3171 to S3174.

S3171. The first AMF sends an NF discovery request service to the V-NRF.

S3172. The V-NRF performs an NF discovery request process between the V-NRF and the H-NRF.

In this embodiment of the present application, because the first AMF is located in the VPLMN, and the first AMF cannot directly interact with the H-NRF to obtain the H-PCF information (that is, the PCF information), the first AMF obtains the H-PCF information from the H-NRF through the V-NRF. For example, after the V-NRF receives the NF discovery request service sent by the first AMF, the V-NRF may send the NF discovery request service to the H-NRF, and the H-NRF authorizes the NF discovery request service sent by the V-NRF, and sends the NF discovery request service response carrying the H-PCF information to the V-NRF.

S3173. The V-NRF sends the H-PCF information to the first AMF.

S3174. The first AMF determines the target H-PCF based on the H-PCF information.

S318. The first AMF initiates a policy control obtaining service to the target V-PCF.

In this embodiment of the present application, the initiating, by the first AMF, a policy control obtaining service to the target PCF may include initiating, by the first AMF, the policy control obtaining service to the target V-PCF, and then obtaining, by the target V-PCF, the policy information from the target H-PCF.

S319. The first AMF sends an event exposure notification to an SMF.

S320. The first AMF sends an N2 request to an N3IWF.

S321. The N3IWF sends an N2 response to the first AMF.

S322. The first AMF sends a registration accept message to the terminal.

S323. The terminal sends a registration complete notification to the first AMF.

For other descriptions of S301 to S323 in the process in which the terminal accesses the network, refer to the related descriptions of S201 to S223. Details are not described herein again.

So far, the process of determining a PCF in the process in which the terminal accesses the network is completed.

In the process in which the terminal accesses the network, when the at least one first PCF corresponding to the PCF identification information includes the target H-PCF and the target V-PCF, S307*a* to S324*a* may be performed after S306.

S307*a*. The first AMF determines the target H-PCF and the target V-PCF in the at least one first PCF corresponding to the PCF identification information when the at least one first PCF corresponding to the PCF identification information includes the target H-PCF and the target V-PCF.

For descriptions of the method for determining the target H-PCF and the target V-PCF in S307*a*, refer to the related descriptions of the method for determining the target PCF in S102 in the foregoing embodiment. Details are not described herein again.

S308*a*. The first AMF sends a first identification request message to the terminal.

S309*a*. The terminal sends a first identification response message to the first AMF.

S310*a*. The first AMF selects an AUSF providing a service to the terminal.

S311*a*. The terminal performs a security authentication process with each service function on a network side.

S312*a*. The first AMF sends a registration complete notification to the second AMF.

The registration complete notification is used to indicate that the terminal is registered with the first AMF successfully.

Similar to S217*a*, the registration complete notification sent by the first AMF to the second AMF may carry first indication information.

S313*a*. The first AMF initiates an identifier obtaining process to the terminal.

S314*a*. The terminal performs an identifier check obtaining service with an EIR.

S315*a*. The first AMF finds a UDM providing a service to the terminal.

S316*a*. The first AMF performs a registration/subscription obtaining process with the UDM.

S317*a*. The UDM sends a terminal context management deletion notification to the second AMF.

In this embodiment of the present application, because the first AMF determines to use the H-PCF and the V-PCF (that is, the target H-PCF and the target V-PCF) in the at least one first PCF corresponding to the PCF identification information, and through S305, the terminal context response message received by the second AMF carries the first indication information, after the second AMF receives the terminal context management deletion notification, the second AMF deletes, based on a function of the first indication information described in the foregoing embodiment, the terminal context stored in the second AMF, and reserves the terminal context stored in the target V-PCF. To be more specific, the second AMF does not initiate the policy control deletion service to the target V-PCF. Therefore, the terminal context stored in the target V-PCF may be reserved.

S318*a*. The first AMF initiates a policy control obtaining service to the target V-PCF.

In this embodiment of the present application, the first AMF may add second indication information to the policy control obtaining service.

S319*a*. The target V-PCF updates the terminal context based on the second indication information in the policy control obtaining service.

In this embodiment of the present application, the updating, by the target V-PCF, the terminal context based on the second indication information may include deleting, by the target V-PCF, an ID of the second AMF from the target V-PCF, and storing an ID of the first AMF.

Optionally, in this embodiment of the present application, the policy control obtaining service may further carry third indication information, and when the policy information obtained by the first AMF from the second AMF is available, the third indication information may indicate that the target V-PCF does not need to send the policy information to the first AMF. Therefore, the target V-PCF does not need to initiate the policy control obtaining service to the target H-PCF. To be more specific, it may be understood that the target V-PCF does not need to obtain the policy information from the target H-PCF. When the policy information obtained by the first AMF from the second AMF is unavailable, the third indication information may be used to instruct the target V-PCF to send the policy information to the first AMF. Therefore, the target V-PCF initiates the policy control obtaining service to the target H-PCF, and obtains the policy information from the target H-PCF, thereby sending the policy information to the first AMF.

S320*a*. The first AMF sends an event exposure notification to an SMF.

S321*a*. The first AMF sends an N2 request to an N3IWF.

S322*a*. The N3IWF sends an N2 response to the first AMF.

S323*a*. The first AMF sends a registration accept message to the terminal.

S324*a*. The terminal sends a registration complete notification to the first AMF.

So far, the process in which the terminal accesses the network is completed. In this embodiment of the present application, when the at least one first PCF corresponding to the PCF identification information includes the target H-PCF and the target V-PCF, the first AMF obtains the policy information from the target H-PCF through the target V-PCF. Therefore, the first AMF does not need to interact with the V-NRF and the H-NRF to determine the target H-PCF, and the first AMF does not need to interact with the V-NRF to determine the target V-PCF either, thereby reducing, to some extent, signaling overheads required for determining the target PCF.

Third Scenario

With reference to FIG. 1, the network accessed by the terminal last time is a first VPLMN, the network accessed by the terminal this time is a second VPLMN, the first VPLMN is different from the second VPLMN, and the terminal is in the roaming state. In the process in which the terminal accesses the network this time, target PCFs that need to be determined include a target V-PCF and a target H-PCF. The process in which the terminal accesses the network in the third scenario is similar to the process in the first scenario and the process in the second scenario, and only steps different from those in the first scenario and the second scenario are described below in detail. For each of other steps, refer to a related step in the first scenario and the second scenario.

The PCF determining method provided in this embodiment of the present application may include S401 to S424.

S401. The terminal sends a registration request message to an (R)AN.

S402. After receiving the registration request message, the (R)AN performs a process of selecting an AMF, and determines that a first AMF provides a service to the terminal.

The first AMF is an AMF in the first VPLMN.

S403. The (R)AN sends the registration request message to the first AMF.

S404. The first AMF sends a terminal context transmission service to a second AMF.

The second AMF is an AMF in the second VPLMN.

S405. The second AMF sends a terminal context response message to the first AMF, where the response message carries PCF identification information.

At least one first PCF corresponding to the PCF identification information includes at least one H-PCF. To be more specific, the PCF identification information includes H-PCF identification information.

Optionally, in this embodiment of the present application, the VPLMN accessed by the terminal this time is different from the VPLMN accessed by terminal last time, and in the second VPLMN, the PCF identification information obtained by the second AMF includes V-PCF identification information and the H-PCF identification information, where a V-PCF corresponding to the V-PCF identification information is no longer applicable to the first VPLMN. Therefore, the PCF identification information sent by the second AMF to the first AMF does not include the V-PCF identification information. To be more specific, the at least one first PCF corresponding to the PCF identification information does not include the V-PCF.

Optionally, in this embodiment of the present application, the PCF identification information may alternatively include the V-PCF identification information. To be more specific, the at least one first PCF corresponding to the PCF identification information also includes at least one V-PCF. In this case, in a subsequent process, the first AMF may perform determining, thereby determining that the at least one V-PCF is unavailable.

S406. The first AMF determines whether the at least one first PCF corresponding to the PCF identification information includes the target PCF.

In this embodiment of the present application, the determining, by the first AMF, whether the at least one first PCF corresponding to the PCF identification information includes the target PCF is determining, by the first AMF if the at least one first PCF corresponding to the PCF identification information includes at least one H-PCF, whether the at least one first PCF corresponding to the PCF identification information includes the target H-PCF.

It should be noted that, if the at least one first PCF corresponding to the PCF identification information includes at least one H-PCF and at least one V-PCF, the first AMF determines whether the at least one first PCF corresponding to the PCF identification information includes the target H-PCF and the target V-PCF.

In this embodiment of the present application, using an example in which the PCF identification information includes only the H-PCF identification information and does not include the V-PCF identification information (that is, the at least one first PCF corresponding to the PCF identification information includes only an H-PCF and does not include a V-PCF), if the first AMF determines that the at least one first PCF corresponding to the PCF identification information does not include the target H-PCF, the first AMF may interact with a V-NRF and an H-NRF to determine the target H-PCF. For example, the first AMF may interact with the V-NRF and the H-NRF to obtain H-PCF information, and determine the target H-PCF based on the H-PCF information; or the first AMF determines the target H-PCF based on H-PCF information stored in the first AMF.

For a method in which the first AMF may interact with the V-NRF and the H-NRF to determine the target H-PCF, refer to the related descriptions of S3171 to S3174 in S317 in the second scenario. Details are not described herein again.

It should be noted that, in this embodiment of the present application, the V-PCF corresponding to the V-PCF identification information in the PCF identification information obtained by the second AMF in the process in which the terminal accesses the network last time is no longer applicable to the first VPLMN accessed by the terminal this time. Therefore, the first AMF needs to interact with the V-NRF to determine the target V-PCF. To be more specific, the first AMF obtains V-PCF information from the NRF, and determines the target V-PCF based on the V-PCF information. For a method, refer to the related descriptions of S217 (which includes S2171 to S2174) in the first scenario. Details are not described herein again.

S407. The first AMF determines the target H-PCF in the at least one first PCF corresponding to the PCF identification information when the at least one first PCF corresponding to the PCF identification information includes the target H-PCF.

For descriptions of the method for determining the target H-PCF in S407, refer to the related descriptions of the method for determining the target PCF in S102 in the foregoing embodiment. Details are not described herein again.

S408. The first AMF sends a first identification request message to the terminal.

S409. The terminal sends a first identification response message to the first AMF.

S410. The first AMF selects an AUSF providing a service to the terminal.

S411. The terminal performs a security authentication process with each service function on a network side.

S412. The first AMF sends a registration complete notification to the second AMF.

The registration complete notification is used to indicate that the terminal is registered with the first AMF successfully.

Similar to S217*a*, the registration complete notification sent by the first AMF to the second AMF may carry first indication information.

S413. The first AMF initiates an identifier obtaining process to the terminal.

S414. The terminal performs an identifier check obtaining service with an EIR.

S415. The first AMF finds a UDM providing a service to the terminal.

S416. The first AMF performs a registration/subscription obtaining process with the UDM.

S417. The UDM sends a terminal context management deletion notification to the second AMF.

In this embodiment of the present application, because the first AMF determines to use the H-PCF (that is, the target H-PCF) in the at least one first PCF corresponding to the PCF identification information, and through S405, the terminal context response message received by the second AMF carries the first indication information, after the second AMF receives the terminal context management deletion notification, the second AMF deletes, based on a function of the first indication information described in the foregoing embodiment, the terminal context stored in the second AMF, and reserves the terminal context stored in the target H-PCF. For example, the second AMF does not need to initiate a policy control deletion service to an old V-PCF, such that the old V-PCF does not need to initiate a policy control deletion service to the target H-PCF either, thereby reserving the terminal context stored in the target H-PCF, where the old V-PCF is a V-PCF determined in the process in which the terminal accesses the network, namely, the first VPLMN last time. Alternatively, the second AMF may initiate a policy control deletion service to an old V-PCF, and add one piece of indication information to the policy control deletion service, where the indication information is used to instruct the old V-PCF to delete a terminal context stored in the old V-PCF, and to indicate that the old V-PCF does not need to initiate a policy control deletion service to the target H-PCF, that is, to instruct the old V-PCF to reserve the terminal context stored in the target H-PCF.

S418. The first AMF initiates a policy control obtaining service to the target V-PCF.

In this embodiment of the present application, the first AMF adds identification information of the target H-PCF and second indication information to the policy control obtaining service, where the identification information of the target H-PCF and the second indication information are used by the target H-PCF to update the terminal context.

S419. The target V-PCF instructs, based on the identification information of the target H-PCF and the second indication information, the target H-PCF to update the terminal context.

In this embodiment of the present application, after the target V-PCF receives the identification information of the target H-PCF and the second indication information that are sent by the first AMF, the target V-PCF initiates the policy control obtaining service to the target H-PCF, and adds the second indication information to the policy control obtaining service, in order to instruct the H-PCF to update the terminal context. The updating, by the H-PCF, the terminal context may include deleting, by the target H-PCF, an ID of the old V-PCF stored in the target H-PCF, and storing an ID of the target V-PCF.

Optionally, in this embodiment of the present application, after the target H-PCF receives the second indication information sent by the target V-PCF, the target H-PCF may initiate the policy control deletion service to the V-PCF, in order to delete the terminal context in the V-PCF.

Optionally, in this embodiment of the present application, the policy control obtaining service may further carry third indication information, and when the policy information obtained by the first AMF from the second AMF is available, the third indication information may indicate that the target V-PCF does not need to send the policy information to the first AMF. Therefore, the target V-PCF does not need to initiate the policy control obtaining service to the target H-PCF. To be more specific, it may be understood that the target V-PCF does not need to obtain the policy information from the target H-PCF. When the policy information obtained by the first AMF from the second AMF is unavailable, the third indication information may be used to instruct the target V-PCF to send the policy information to the first AMF. Therefore, the target V-PCF initiates the policy control obtaining service to the target H-PCF, and obtains the policy information from the target H-PCF, thereby sending the policy information to the first AMF.

S420. The first AMF sends an event exposure notification to an SMF.

S421. The first AMF sends an N2 request to an N3IWF.

S422. The N3IWF sends an N2 response to the first AMF.

S423. The first AMF sends a registration accept message to the terminal.

S424. The terminal sends a registration complete notification to the first AMF.

So far, the process in which the terminal accesses the network is completed. In this embodiment of the present application, the first AMF obtains the policy information from the target H-PCF when the at least one first PCF corresponding to the PCF identification information includes the target H-PCF. It can be learned that the first AMF does not need to interact with the V-NRF and the H-NRF to determine the target H-PCF, thereby reducing, to some extent, signaling overheads required for determining the target PCF.

Fourth Scenario

With reference to FIG. 1, the network accessed by the terminal last time is an HPLMN, the network accessed by the terminal this time is a VPLMN, and the terminal is in the roaming state. In the process in which the terminal accesses the network this time, target PCFs that need to be determined include a target V-PCF and a target H-PCF. Similarly, the process in which the terminal accesses the network in the fourth scenario is similar to the process in the first scenario, the process in the second scenario, and the process in the third scenario, and only steps different from those in the first scenario, the second scenario, and the third scenario are described below in detail. For each of other steps, refer to a related step in the first scenario, the second scenario, and the third scenario.

The PCF determining method provided in this embodiment of the present application may include S501 to S524.

S501. The terminal sends a registration request message to an (R)AN.

S502. After receiving the registration request message, the (R)AN performs a process of selecting an AMF, and determines that a first AMF provides a service to the terminal.

The first AMF is an AMF in the VPLMN.

S503. The (R)AN sends the registration request message to the first AMF.

S504. The first AMF sends a terminal context transmission service to a second AMF.

The second AMF is an AMF in the HPLMN.

S505. The second AMF sends a terminal context response message to the first AMF, where the response message carries PCF identification information.

At least one first PCF corresponding to the PCF identification information includes at least one H-PCF. To be more specific, the PCF identification information includes H-PCF identification information.

It should be noted that, in this embodiment of the present application, the network accessed by the terminal last time is the HPLMN, and the PCF identification information obtained by the second AMF includes only the H-PCF identification information, and does not include V-PCF identification information. Therefore, the PCF identification information sent by the second AMF to the first AMF includes the H-PCF identification information, and does not include the V-PCF identification information. To be more specific, the at least one first PCF corresponding to the PCF identification information does not include a V-PCF.

S506. The first AMF determines whether the at least one first PCF corresponding to the PCF identification information includes the target PCF.

In this embodiment of the present application, the determining, by the first AMF, whether the at least one first PCF corresponding to the PCF identification information includes at least one available PCF is determining, by the first AMF, whether the at least one first PCF corresponding to the PCF identification information includes an available target PCF.

In this embodiment of the present application, if the first AMF determines that the at least one first PCF corresponding to the PCF identification information does not include the target H-PCF, the first AMF may interact with a V-NRF and an H-NRF to determine the target H-PCF. For example, the first AMF may interact with the V-NRF and the H-NRF to obtain H-PCF information, and determine the target H-PCF based on the H-PCF information; or the first AMF determines the target H-PCF based on PCF information stored in the first AMF. For a method, refer to the related descriptions of S3171 to S3174 in S317 in the second scenario. Details are not described herein again.

The PCF identification information obtained by the second AMF in the process in which the terminal accesses the network last time does not include the V-PCF identification information. To be more specific, the at least one first PCF corresponding to the PCF identification information does not include the V-PCF. Therefore, the first AMF needs to interact with the V-NRF to determine the target V-PCF. For example, the first AMF obtains V-PCF information from the V-NRF, and determines the target V-PCF based on the V-PCF information. For a method, refer to the related descriptions of S217 (which includes S2171 to S2174) in the first scenario. Details are not described herein again.

S507. The first AMF determines the target H-PCF in the at least one first PCF corresponding to the PCF identification information when the at least one first PCF corresponding to the PCF identification information includes the target H-PCF.

For descriptions of the method for determining the target H-PCF in S507, refer to the related descriptions of the method for determining the target PCF in S102 in the foregoing embodiment. Details are not described herein again.

S508. The first AMF sends a first identification request message to the terminal.

S509. The terminal sends a first identification response message to the first AMF.

S510. The first AMF selects an AUSF providing a service to the terminal.

S511. The terminal performs a security authentication process with each service function on a network side.

S512. The first AMF sends a registration complete notification to the second AMF.

The registration complete notification is used to indicate that the terminal is registered with the first AMF successfully.

Similar to S217*a*, the registration complete notification sent by the first AMF to the second AMF may carry first indication information.

S513. The first AMF initiates an identifier obtaining process to the terminal.

S514. The terminal performs an identifier check obtaining service with an EIR.

S515. The first AMF finds a UDM providing a service to the terminal.

S516. The first AMF performs a registration/subscription obtaining process with the UDM.

S517. The UDM sends a terminal context management deletion notification to the second AMF.

In this embodiment of the present application, because the first AMF determines to use the H-PCF (that is, the target H-PCF) in the at least one first PCF corresponding to the PCF identification information, and through S505, the terminal context response message received by the second AMF carries the first indication information, after the second AMF receives the terminal context management deletion notification, the second AMF deletes, based on a function of the first indication information described in the foregoing embodiment, the terminal context stored in the second AMF, and reserves the terminal context stored in the target H-PCF. For example, the second AMF does not need to initiate a policy control deletion service to the target H-PCF. Therefore, the terminal context stored in the target H-PCF may be reserved.

S518. The first AMF initiates a policy control obtaining service to the target V-PCF.

In this embodiment of the present application, the first AMF adds identification information of the target H-PCF and second indication information to the policy control obtaining service, where the identification information of the target H-PCF and the second indication information are used by the target H-PCF to update the terminal context.

S519. The target V-PCF instructs, based on the identification information of the target H-PCF and the second indication information, the target H-PCF to update the terminal context.

In this embodiment of the present application, after the target V-PCF receives the identification information of the target H-PCF and the second indication information that are sent by the first AMF, the target V-PCF initiates the policy control obtaining service to the target H-PCF, and adds the second indication information to the policy control obtaining service, in order to instruct the H-PCF to update the terminal context. The updating, by the H-PCF, the terminal context may include deleting, by the target H-PCF, an ID of the second AMF stored in the target H-PCF, and storing an ID of the target V-PCF.

Optionally, in this embodiment of the present application, the policy control obtaining service may further carry third indication information, and when the policy information obtained by the first AMF from the second AMF is available, the third indication information may indicate that the target V-PCF does not need to send the policy information to the first AMF. Therefore, the target V-PCF does not need to initiate the policy control obtaining service to the target H-PCF. To be more specific, it may be understood that the target V-PCF does not need to obtain the policy information from the target H-PCF. When the policy information obtained by the first AMF from the second AMF is unavailable, the third indication information may be used to instruct the target V-PCF to send the policy information to the first AMF. Therefore, the target V-PCF initiates the policy control obtaining service to the target H-PCF, and obtains the policy information from the target H-PCF, thereby sending the policy information to the first AMF.

S520. The first AMF sends an event exposure notification to an SMF.

S521. The first AMF sends an N2 request to an N3IWF.

S522. The N3IWF sends an N2 response to the first AMF.

S523. The first AMF sends a registration accept message to the terminal.

S524. The terminal sends a registration complete notification to the first AMF.

So far, the process in which the terminal accesses the network is completed. The first AMF obtains the policy information from the target H-PCF when the at least one first PCF corresponding to the PCF identification information includes the target H-PCF. It can be learned that the first AMF does not need to interact with the V-NRF and the H-NRF to determine the target H-PCF, thereby reducing, to some extent, signaling overheads required for determining the target PCF.

Fifth Scenario

With reference to FIG. 1, the network accessed by the terminal last time is a VPLMN, the network accessed by the terminal this time is an HPLMN, and the terminal is in the roaming state. In the process in which the terminal accesses the network this time, target PCFs that need to be determined include a target V-PCF. Similarly, the process in which the terminal accesses the network in the fifth scenario is similar to the process in the first scenario, the process in the second scenario, the process in the third scenario, and the process in the fourth scenario, and only steps different from those in the first scenario, the second scenario, the third scenario, and the fourth scenario are described below in detail. For each of other steps, refer to a related step in the first scenario, the second scenario, the third scenario, and the fourth scenario.

The PCF determining method provided in this embodiment of the present application may include S601 to S624.

S601. The terminal sends a registration request message to an (R)AN.

S602. After receiving the registration request message, the (R)AN performs a process of selecting an AMF, and determines that a first AMF provides a service to the terminal.

The first AMF is an AMF in the HPLMN.

S603. The (R)AN sends the registration request message to the first AMF.

S604. The first AMF sends a terminal context transmission service to a second AMF.

The second AMF is an AMF in the VPLMN.

S605. The second AMF sends a terminal context response message to the first AMF, where the response message carries PCF identification information.

At least one first PCF corresponding to the PCF identification information includes at least one H-PCF. To be more specific, the PCF identification information includes H-PCF identification information.

Optionally, in this embodiment of the present application, the network accessed by the terminal last time is the VPLMN, and the PCF identification information obtained by the second AMF includes V-PCF identification information and the H-PCF identification information. The network accessed by the terminal this time is the HPLMN, a PCF serving the terminal is an H-PCF, and a V-PCF is not required. Therefore, the PCF identification information sent by the second AMF to the first AMF includes only the H-PCF identification information, and does not include the V-PCF identification information. To be more specific, the at least one first PCF corresponding to the PCF identification information does not include the V-PCF.

Optionally, in this embodiment of the present application, the PCF identification information may alternatively include the V-PCF identification information. To be more specific, the at least one first PCF corresponding to the PCF identification information also includes at least one V-PCF. In this case, in a subsequent process, the first AMF may perform determining, thereby determining that the at least one V-PCF is unavailable.

S606. The first AMF determines whether the at least one first PCF corresponding to the PCF identification information includes the target PCF.

In this embodiment of the present application, the determining, by the first AMF, whether the at least one first PCF corresponding to the PCF identification information includes the target PCF is determining, by the first AMF if the at least one first PCF corresponding to the PCF identification information includes at least one H-PCF, whether the at least one first PCF corresponding to the PCF identification information includes the target H-PCF.

It should be noted that, if the at least one first PCF corresponding to the PCF identification information includes at least one H-PCF and at least one V-PCF, the first AMF determines whether the at least one first PCF corresponding to the PCF identification information includes the target H-PCF and the target V-PCF.

In this embodiment of the present application, using an example in which the PCF identification information includes only the H-PCF identification information and does not include the V-PCF identification information (that is, the at least one first PCF corresponding to the PCF identification information includes only an H-PCF and does not include a V-PCF), if the first AMF determines that the at least one first PCF corresponding to the PCF identification information does not include the target H-PCF, the first AMF may interact with an H-NRF to determine the target H-PCF. For example, the first AMF may interact with the H-NRF to obtain H-PCF information, and determine the target H-PCF based on the H-PCF information; or determine the target H-PCF based on H-PCF information stored in the first AMF.

For a method for interacting, by the first AMF, with the H-NRF to determine the target H-PCF, refer to the related descriptions of S217 (which includes S2171 to S2174) in the first scenario. Details are not described herein again.

S607. The first AMF determines the target H-PCF in the at least one first PCF corresponding to the PCF identification information when the at least one first PCF corresponding to the PCF identification information includes the target H-PCF.

For descriptions of the method for determining the target H-PCF in S607, refer to the related descriptions of the method for determining the target PCF in S102 in the foregoing embodiment. Details are not described herein again.

S608. The first AMF sends a first identification request message to the terminal.

S609. The terminal sends a first identification response message to the first AMF.

S610. The first AMF selects an AUSF providing a service to the terminal.

S611. The terminal performs a security authentication process with each service function on a network side.

S612. The first AMF sends a registration complete notification to the second AMF.

The registration complete notification is used to indicate that the terminal is registered with the first AMF successfully.

Similar to S217*a*, the registration complete notification sent by the first AMF to the second AMF may carry first indication information.

S613. The first AMF initiates an identifier obtaining process to the terminal.

S614. The terminal performs an identifier check obtaining service with an EIR.

S615. The first AMF finds a UDM providing a service to the terminal.

S616. The first AMF performs a registration/subscription obtaining process with the UDM.

S617. The UDM sends a terminal context management deletion notification to the second AMF.

In this embodiment of the present application, because the first AMF determines to use the H-PCF (that is, the target H-PCF) in the at least one first PCF corresponding to the PCF identification information, and through S605, the terminal context response message received by the second AMF carries the first indication information, after the second AMF receives the terminal context management deletion notification, the second AMF deletes, based on a function of the first indication information described in the foregoing embodiment, the terminal context stored in the second AMF, and reserves the terminal context stored in the target H-PCF. For example, the second AMF does not need to initiate a policy control deletion service to an old V-PCF, such that the old V-PCF does not need to initiate a policy control deletion service to the target H-PCF either, thereby reserving the terminal context stored in the target H-PCF.

S618. The first AMF initiates a policy control obtaining service to the target H-PCF.

In this embodiment of the present application, the first AMF adds second indication information to the policy control obtaining service.

S619. The target H-PCF updates the terminal context based on the second indication information.

In this embodiment of the present application, the updating, by the H-PCF, the terminal context may include deleting, by the target H-PCF, an ID of the old V-PCF stored in the target H-PCF, and storing an ID of the second AMF.

Optionally, in this embodiment of the present application, after the target H-PCF receives the second indication information sent by the first AMF, the target H-PCF may initiate the policy control deletion service to the V-PCF, in order to delete the terminal context in the V-PCF.

Optionally, in this embodiment of the present application, the policy control obtaining service may further carry third indication information. When the policy information obtained by the first AMF from the second AMF is available, the third indication information sent by the first AMF to the target H-PCF may be used to instruct the target H-PCF to stop sending the policy information to the first AMF, to be more specific, the target H-PCF does not need to send the policy information to the first AMF; or if the policy information obtained by the first AMF from the second AMF is unavailable, the third indication information sent by the first AMF to the target H-PCF may be used to instruct the target H-PCF to send the policy information to the first AMF, to be more specific, the first AMF obtains the policy information again from the target H-PCF.

S620. The first AMF sends an event exposure notification to an SMF.

S621. The first AMF sends an N2 request to an N3IWF.

S622. The N3IWF sends an N2 response to the first AMF.

S623. The first AMF sends a registration accept message to the terminal.

S624. The terminal sends a registration complete notification to the first AMF.

So far, the process in which the terminal accesses the network is completed. In this embodiment of the present application, when the at least one first PCF corresponding to the PCF identification information includes the target H-PCF, the first AMF obtains the policy information from the target H-PCF, and the first AMF does not need to interact with an H-NRF to determine the target H-PCF, thereby reducing, to some extent, signaling overheads required for determining the target PCF.

A method for determining a PCF in a process in which a terminal establishes a session with a network after the terminal accesses the network is described below through examples.

It should be noted that, in this embodiment of the present application, all PCF information obtained by an SMF from an AMF is referred to as PCF identification information, and all PCF information obtained by the SMF from an NRF is referred to as PCF information.

Figure 8:
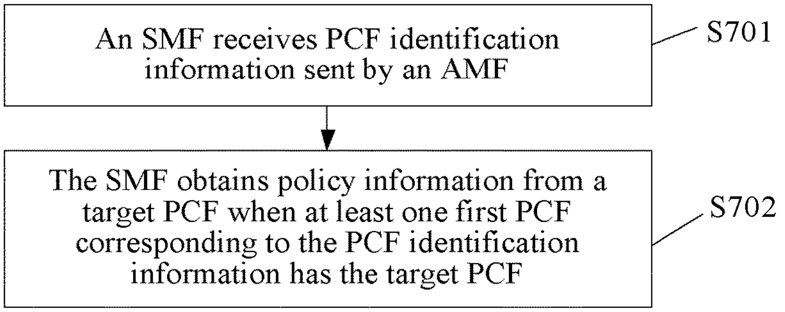
FIG. 8 is a fifth schematic diagram of a PCF determining method according to an embodiment of the present application.

With reference to FIG. 1, as shown in FIG. 8, a PCF determining method provided in an embodiment of the present application in a process in which a terminal establishes a session with a network may include S701 and S702.

S701. An SMF receives PCF identification information sent by an AMF.

The AMF is an AMF that may provide a service to the terminal and that is determined by an (R)AN in a process in which the terminal accesses the network. In addition, in the process in which the terminal accesses the network, the AMF has obtained the PCF identification information, and in the process of establishing the session, when sending a session creation service or message to the SMF, the AMF may add the PCF identification information to the session creation service or message.

For other descriptions of the PCF identification information, refer to the related descriptions of the PCF identification information in S101 of the foregoing embodiment. Details are not described herein again.

S702. The SMF obtains policy information from a target PCF when at least one first PCF corresponding to the PCF identification information includes the target PCF.

In this embodiment of the present application, for detailed descriptions of S702, refer to the related descriptions of S102 in the foregoing embodiment. Details are not described herein again.

Figure 9:
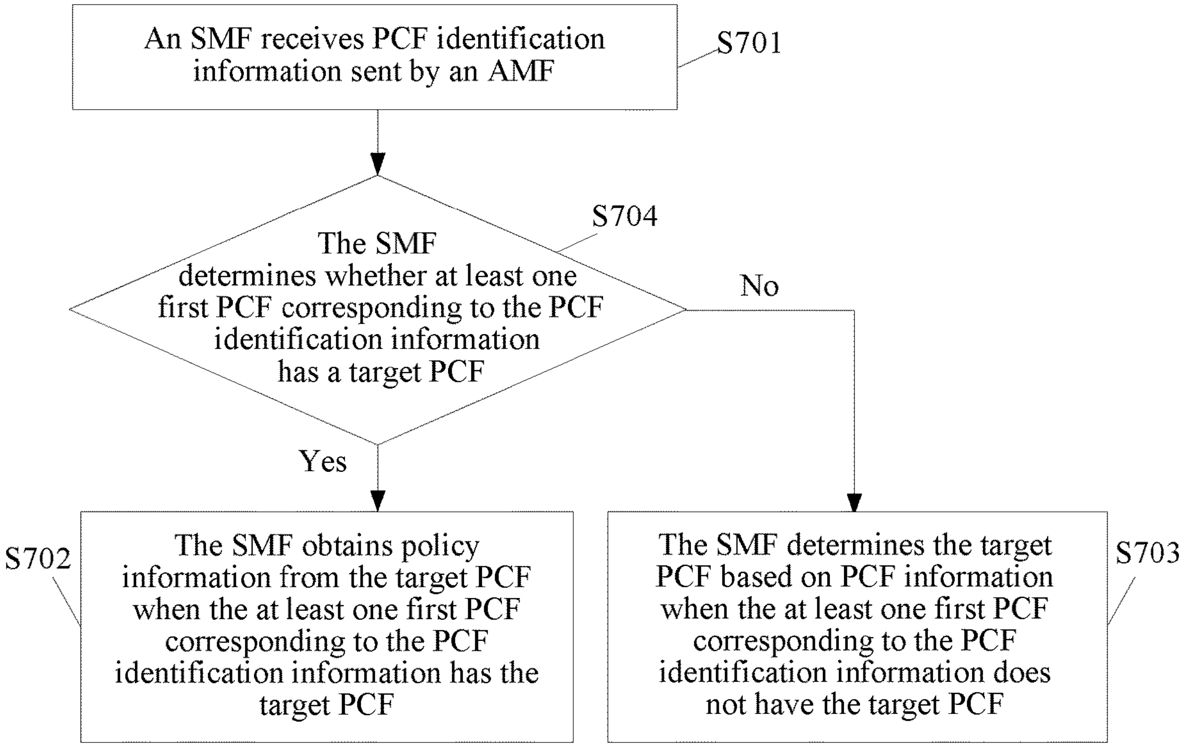
FIG. 9 is a sixth schematic diagram of a PCF determining method according to an embodiment of the present application.

With reference to FIG. 8, as shown in FIG. 9, the PCF determining method provided in this embodiment of the present application may further include S703.

S703. The SMF determines the target PCF based on PCF information when the at least one first PCF corresponding to the PCF identification information does not include the target PCF.

In this embodiment of the present application, the PCF information is PCF information obtained by the SMF by interacting with the NRF in the network, or PCF information stored in (for example, locally preconfigured by) the SMF. Therefore, the SMF may determine the target PCF based on the PCF information, in order to ensure that the policy information is obtained, thereby ensuring that the terminal smoothly establishes the session with the network.

In this embodiment of the present application, for other descriptions of S703, refer to the related descriptions of S103 in the foregoing embodiment. Details are not described herein again.

As shown in FIG. 9, after S701, the PCF determining method provided in this embodiment of the present application may further include S704.

S704. The SMF determines whether the at least one first PCF corresponding to the PCF identification information includes the target PCF.

In this embodiment of the present application, a method for determining, by the SMF, whether the at least one first PCF corresponding to the PCF identification information includes the target PCF in S704 is similar to a method for determining, by the first AMF, whether the at least one first PCF corresponding to the PCF identification information includes the target PCF in S104. For detailed descriptions of S704, refer to the related descriptions of S104 in the foregoing embodiment. Details are not described herein again.

Based on the PCF determining method provided in this embodiment of the present application, in the process in which the terminal establishes the session with the network, the SMF in the network may receive the PCF identification information sent to the AMF, and the SMF obtains the policy information from the target PCF when the at least one first PCF corresponding to the PCF identification information includes the target PCF. Compared with some approaches, in this embodiment of the present application, because the at least one first PCF corresponding to the PCF identification information includes the target PCF, the SMF does not need to interact with the NRF to obtain and determine the target PCF, thereby reducing, to some extent, signaling overheads required for determining a PCF.

In this embodiment of the present application, in the process in which the terminal establishes the session with the network, the network accessed by the terminal may be a VPLMN, or the network accessed by the terminal may be an HPLMN. To be more specific, the terminal may be in a roaming state, or the terminal may be in a non-roaming state. Therefore, it can be learned that there are a plurality of scenarios for the process in which the terminal establishes the session with the network. Therefore, a method for determining a PCF in the process in which the terminal establishes the session with the network may be described in detail from the perspective of different scenarios. Based on whether the terminal is in the roaming state, the PCF determining method provided in this embodiment of the present application may be applied to the following two scenarios that are respectively marked as a first scenario and a second scenario.

First, for the first scenario, the network accessed by the terminal is a VPLMN. To be more specific, the terminal is in the roaming state, and types of the session established by the terminal with the network may include local breakout and home routed.

Figure 10A:
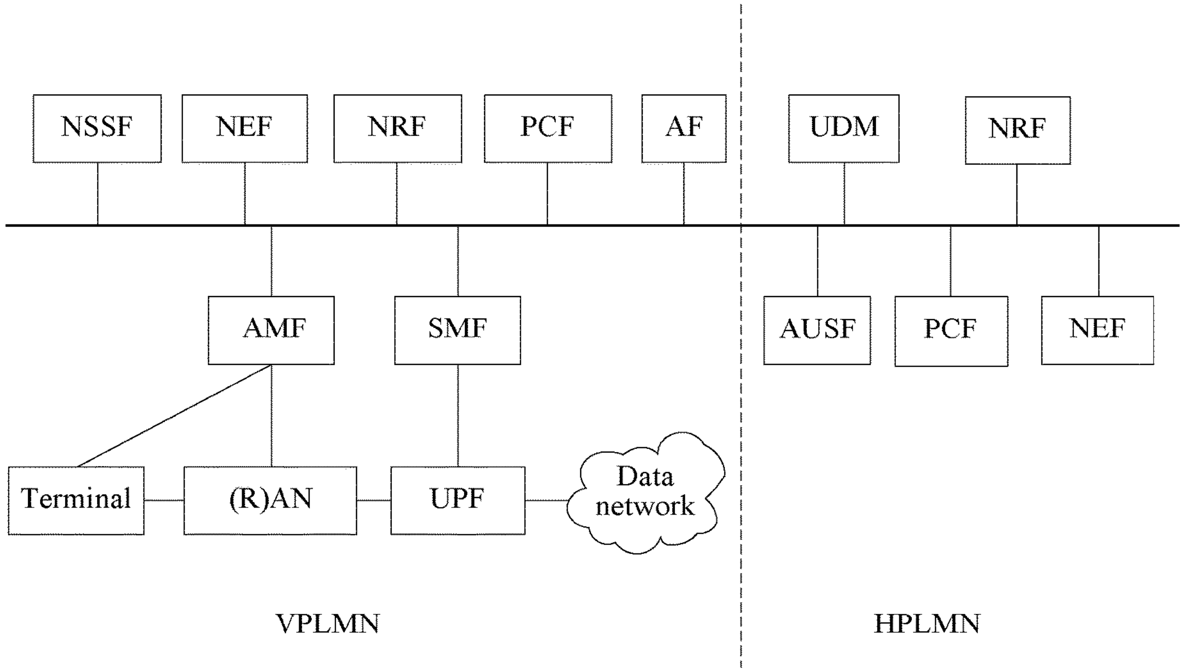
FIG. 10A is a first schematic diagram of a roaming servitization architecture according to an embodiment of the present application.
Figure 10B:
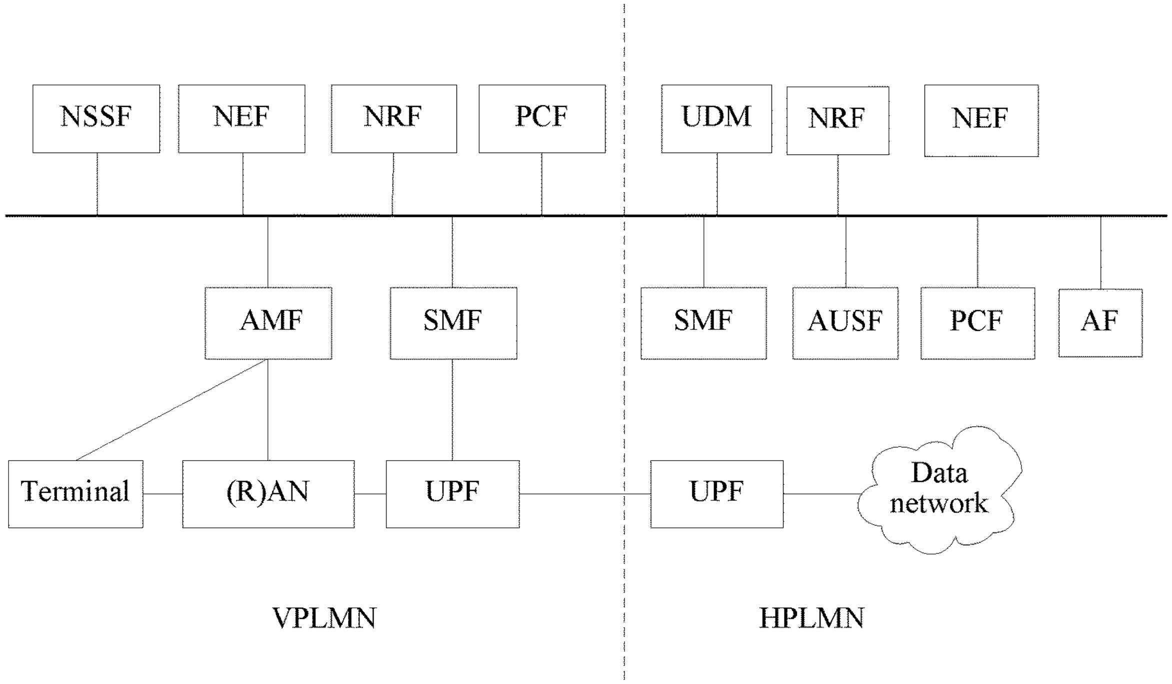
FIG. 10B is a second schematic diagram of a roaming servitization architecture according to an embodiment of the present application.

FIG. 10A shows a servitization architecture in a local breakout roaming scenario, and FIG. 10B is a servitization architecture in a home routed roaming scenario.

It should be noted that a session type is local breakout, and a target PCF determined in this embodiment of the present application is a PCF in a VPLMN, that is, a V-PCF; or a session type is home routed, and a target PCF determined in this embodiment of the present application is a PCF in an HPLMN, that is, an H-PCF.

Figure 11:
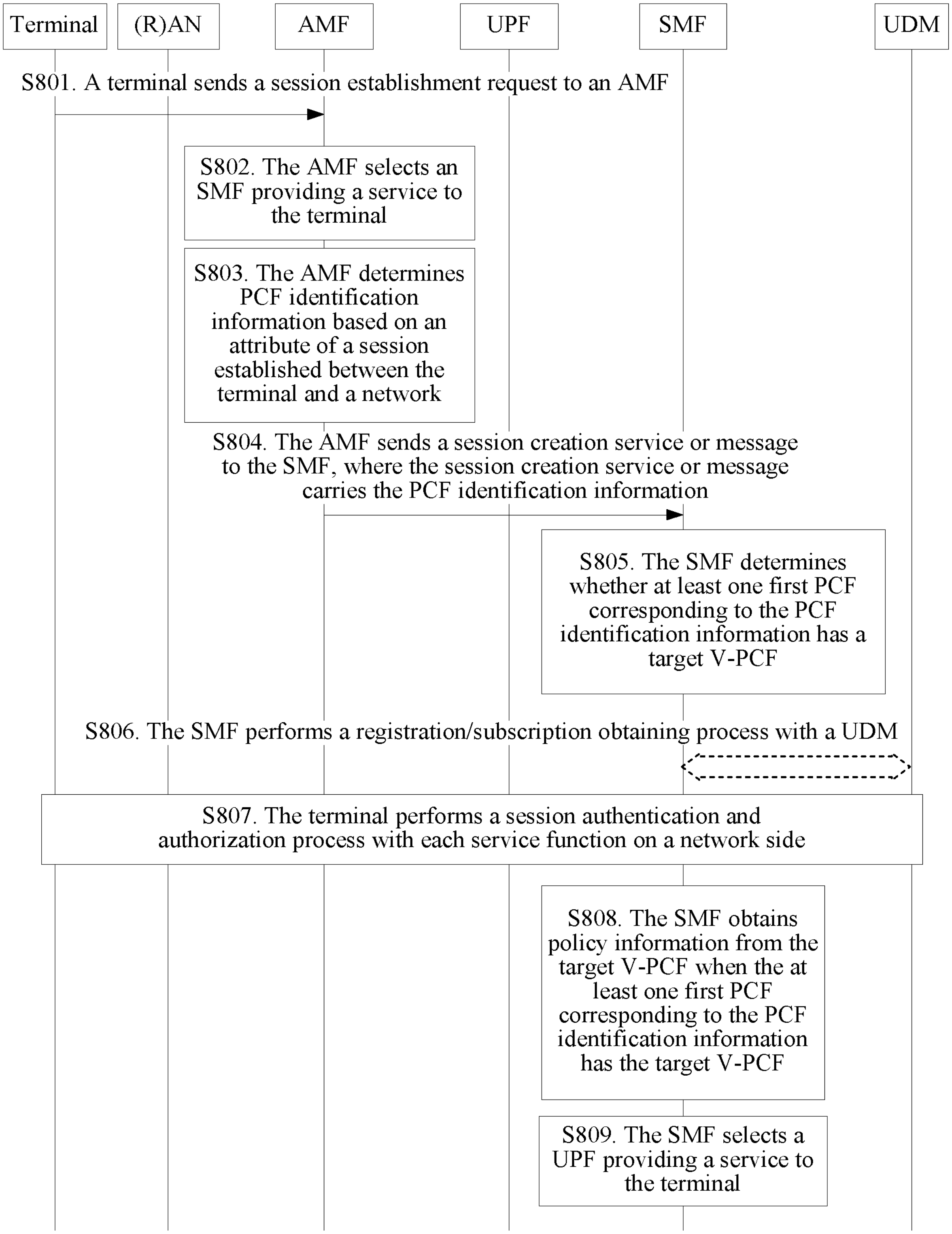
FIG. 11 is a seventh schematic diagram of a PCF determining method according to an embodiment of the present application.

With reference to FIG. 10A, as shown in FIG. 11, a type of a session established by a terminal with a network is local breakout, and a PCF determining method provided in an embodiment of the present application may include the following steps.

S801. The terminal sends a session establishment request to an AMF.

S802. The AMF selects an SMF providing a service to the terminal.

In this embodiment of the present application, because the terminal is in a roaming state, the SMF selected by the AMF for the terminal is an SMF in a VPLMN, that is, a V-SMF (in S801 to S807, each SMF is the V-SMF).

S803. The AMF determines PCF identification information based on an attribute of the session established between the terminal and the network.

In this embodiment of the present application, the PCF identification information is used to determine a target PCF, and the determining, by an AMF, PCF identification information based on an attribute of the session established between the terminal and the network may include determining, by the AMF if the AMF determines that a type of the session established between the terminal and the network is local breakout, that the PCF identification information is V-PCF identification information.

Optionally, the PCF identification information includes the V-PCF identification information determined by the AMF in the process in which the terminal accesses the network, and the PCF identification information may further include other V-PCF identification information (which may be understood as identification information of other V-PCF instances).

Optionally, in this embodiment of the present application, the AMF may further determine the PCF identification information based on at least one of an object served by the SMF or an object served by the PCF.

In this embodiment of the present application, the object served by the SMF is usually a network slice, and the object served by the PCF is usually an entire PLMN (which includes a VPLMN or an IPLMN). Optionally, the object served by the SMF may be an entire PLMN, and the object served by the PCF may be one or more network slices. This is not specifically limited in this embodiment of the present application.

Using an example in which the object served by the SMF is a network slice and the object served by the PCF is an entire PLMN, the determining, by the AMF, the PCF identification information based on at least one of an object served by the SMF or an object served by the PCF may include selecting, by the AMF, a network slice served by the SMF that may be served by at least one first PCF corresponding to the PCF identification information, selecting, by the AMF, a PLMN in which the terminal is currently located and that may be served by at least one first PCF corresponding to the PCF identification information, or selecting, by the AMF, at least one first PCF corresponding to the PCF identification information, where the PLMN that may be served by the first PCF includes the network slice that may be served by the SMF.

For example, assuming that the network slice served by the SMF is a network slice 1, and a PCF 1 and a PCF 3 of first PCFs corresponding to the PCF information obtained by the AMF may serve the network slice 1, the AMF determines information about the PCF 1 and information about the PCF 3 in the PCF information as the PCF identification information. Assuming that the terminal is currently located in a VPLMN 1, and a PCF 1 and a PCF 2 of first PCFs corresponding to the PCF information obtained by the AMF may both serve the VPLMN 1, the AMF determines information about the PCF 1 and information about the PCF 2 in the PCF information as the PCF identification information. Assuming that first PCFs corresponding to the PCF information obtained by the AMF include a PCF 1, a PCF 2, and a PCF 3, where an object served by the PCF 1 is a PLMN 1, where an object served by the PCF 2 is a PLMN 2, where an object served by the PCF 3 is a PLMN 3, where the PLMN 1 includes a network slice 1 and a network slice 2, where the PLMN 2 includes the network slice 1 and a network slice 3, where the PLMN 3 includes the network slice 2 and the network slice 3, and where an object served by the SMF is the network slice 1, it can be learned that an object served by the PLMN 1 includes the network slice 1 and an object served by the PLMN 2 includes the network slice 1. Therefore, the AMF determines information about the PCF 1 serving the PLMN 1 and information about the PCF 2 serving the PLMN 2 as the PCF identification information.

S804. The AMF sends a session creation service or message to the SMF, where the session creation service or message carries the PCF identification information.

S805. The SMF determines whether the at least one first PCF corresponding to the PCF identification information includes a target V-PCF.

In this embodiment of the present application, the type of the session established by the terminal with the network is local breakout. To be more specific, a service of the terminal is routed by the VPLMN in which the terminal is located. Therefore, the target PCF determined by the SMF is the target V-PCF. After the SMF receives the PCF identification information sent by the AMF, the SMF determines whether the at least one first PCF corresponding to the PCF identification information includes the target V-PCF.

It should be noted that, in this embodiment of the present application, the foregoing method for determining, by the SMF, whether the at least one first PCF corresponding to the PCF identification information includes the target PCF is similar to a method for determining, by the first AMF, whether the at least one first PCF corresponding to the PCF identification information includes the target PCF in the foregoing embodiment. For detailed descriptions of S805, refer to the related descriptions of S104 in the foregoing embodiment. Details are not described herein again.

In this embodiment of the present application, if the SMF determines that the at least one first PCF corresponding to the PCF identification information does not include the target V-PCF, the SMF interacts with a V-NRF (that is, an NRF in the VPLMN) to determine the target V-PCF. To be more specific, the SMF obtains PCF information from the V-NRF, and determines the target V-PCF based on the PCF information; or the SMF determines the target V-PCF based on PCF information stored in the SMF.

The foregoing method for interacting, by the SMF, with the V-NRF to determine the target V-PCF is similar to the method for interacting, by the first AMF, with the V-NRF to determine the target V-PCF in the foregoing embodiment. For detailed descriptions of the process in which the SMF interacts with the V-NRF to determine the target V-PCF, refer to the related descriptions of the process in which the first AMF interacts with the V-NRF to determine the target V-PCF in the foregoing embodiment. Details are not described herein again.

Optionally, in this embodiment of the present application, when the session creation service or message sent by the AMF in S804 does not include the PCF identification information, the SMF interacts with a V-NRF (that is, an NRF in the VPLMN) to determine the target V-PCF, or the SMF determines the target V-PCF based on PCF information stored in the SMF.

If the SMF determines that the at least one first PCF corresponding to the PCF identification information includes the target V-PCF, the SMF determines the target V-PCF based on the PCF identification information, and S806 to S809 may be performed after S805.

S806. The SMF performs a registration/subscription obtaining process with a UDM.

S807. The terminal performs a session authentication and authorization process with each service function on a network side.

S808. The SMF obtains policy information from the target V-PCF when the at least one first PCF corresponding to the PCF identification information includes the target V-PCF.

For detailed descriptions of S808, refer to the related descriptions of S702 in the foregoing embodiment. Details are not described herein again.

S809. The SMF selects a UPF providing a service to the terminal.

In this embodiment of the present application, after the SMF selects the UPF that may provide a service to the terminal, the UPF may process user plane data of the terminal.

It should be noted that, in this embodiment of the present application, after S808, the establishing, by the terminal, the session with the network further includes other steps. Because all subsequent session establishment steps are the same as existing steps for establishing the local breakout session, a detailed description is not made in this embodiment of the present application.

Figure 12A:
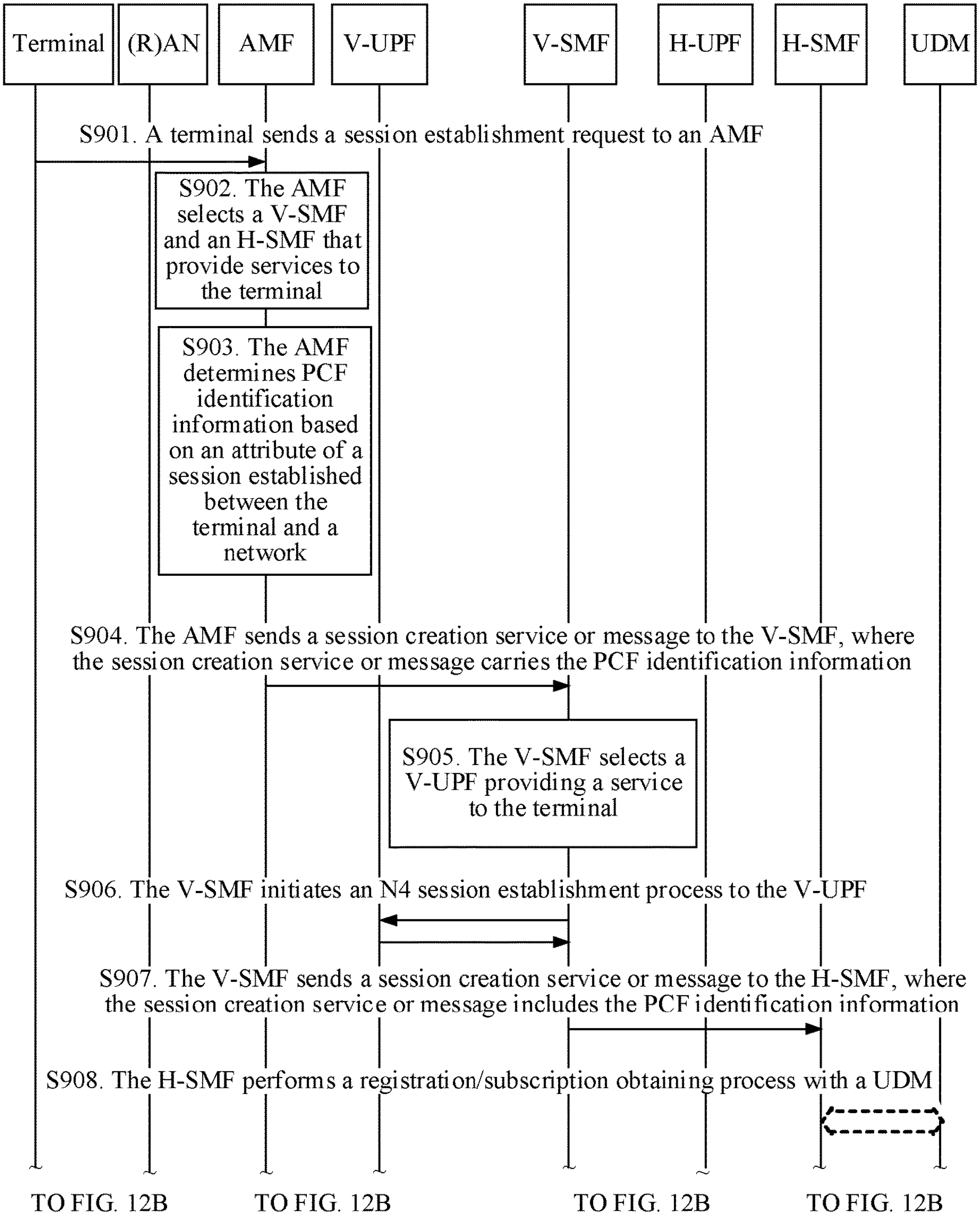
FIG. 12A and FIG. 12B are an eighth schematic diagram of a PCF determining method according to an embodiment of the present application.
Figure 12B:
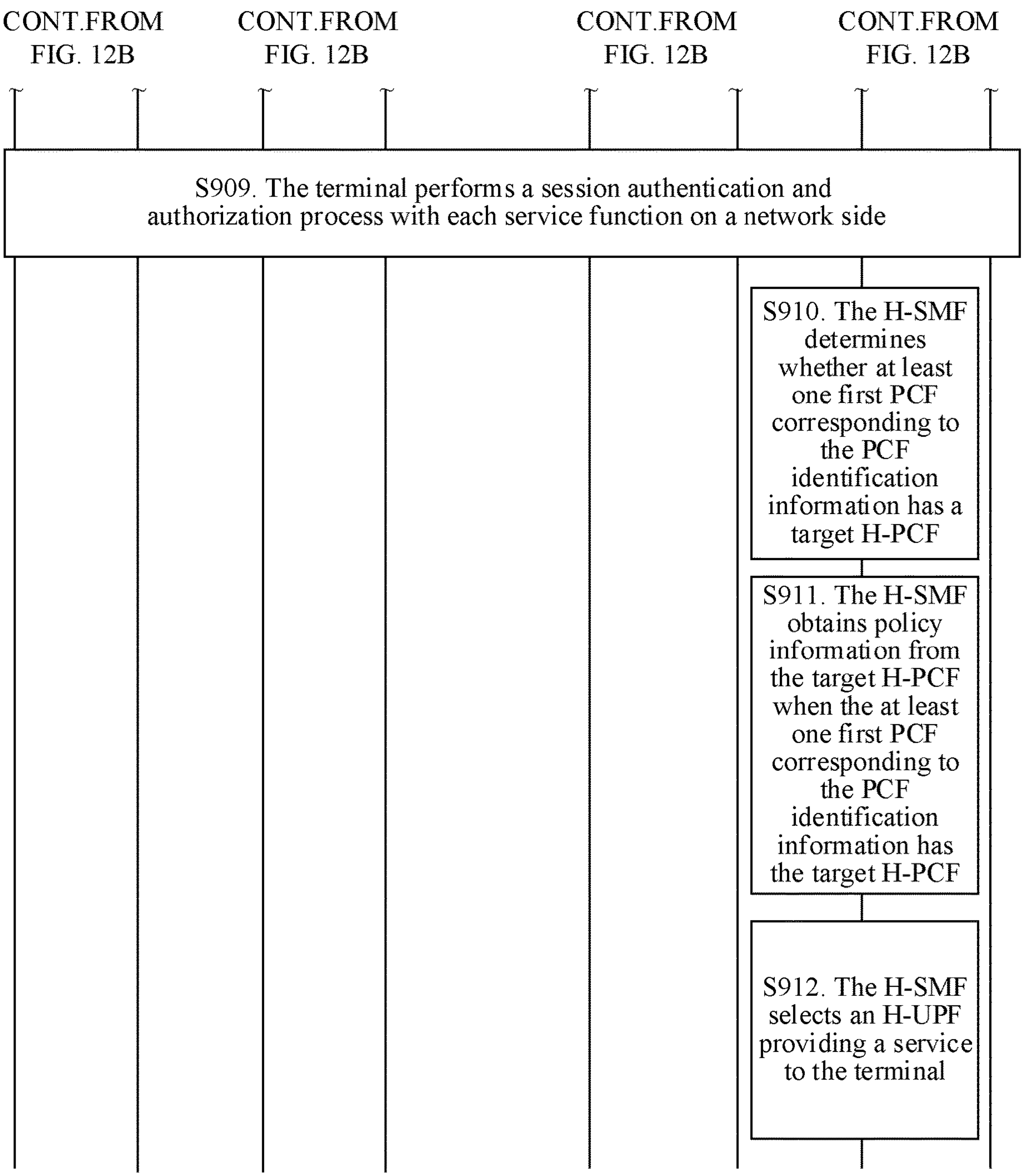

With reference to FIG. 10B, as shown in FIG. 12A and FIG. 12B, a type of a session established by a terminal with a network is home routed, and a PCF determining method provided in an embodiment of the present application may include the following steps.

S901. The terminal sends a session establishment request to an AMF.

S902. The AMF selects a V-SMF and an H-SMF that provide services to the terminal.

In this embodiment of the present application, because the terminal is in a roaming state, SMFs selected by the AMF for the terminal include the V-SMF and the H-SMF, where the V-SMF is an SMF in a VPLMN, and the H-SMF is an SMF in an H-PLMN.

S903. The AMF determines PCF identification information based on an attribute of the session established between the terminal and the network.

In this embodiment of the present application, the PCF identification information is used to determine a target PCF, and the determining, by an AMF, PCF identification information based on an attribute of the session established between the terminal and the network may include determining, by the AMF if the AMF determines that a type of the session established between the terminal and the network is home routed, that the PCF identification information is H-PCF identification information.

Optionally, the PCF identification information includes the H-PCF identification information determined by the AMF in the process in which the terminal accesses the network, and the PCF identification information may further include other H-PCF identification information (which may be understood as identification information of other H-PCF instances).

Optionally, in this embodiment of the present application, the AMF may further determine the PCF identification information based on at least one of an object served by the SMF or an object served by the PCF.

S904. The AMF sends a session creation service or message to the V-SMF, where the session creation service or message carries the PCF identification information.

S905. The V-SMF selects a V-UPF providing a service to the terminal.

In this embodiment of the present application, the UPF selected by the V-SMF is a UPF in the VPLMN, and may be marked as the V-UPF.

S906. The V-SMF initiates an N4 session establishment process to the V-UPF.

In this embodiment of the present application, the initiating, by the V-SMF, an N4 (N4 is an interface between the V-SMF and the V-UPF) session establishment process to the V-UPF may include sending, by the V-SMF, an N4 session establishment request message to the V-UPF, and then sending, by the V-UPF, an N4 session establishment response message to the V-SMF, such that the V-SMF establishes a connection with the V-UPF, in order to transmit data.

S907. The V-SMF sends a session creation service or message to the H-SMF, where the session creation service or message includes the PCF identification information.

S908. The H-SMF performs a registration/subscription obtaining process with the UDM.

S909. The terminal performs a session authentication and authorization process with each service function on a network side.

S910. The H-SMF determines whether the at least one first PCF corresponding to the PCF identification information includes a target H-PCF.

In this embodiment of the present application, the H-SMF receives the PCF identification information sent by the V-SMF, and the H-SMF determines whether the at least one first PCF corresponding to the PCF identification information includes the target PCF. As described in S903, the type of the session established by the terminal with the network is home routed. To be more specific, a service of the terminal is routed by a home network HPLMN of the terminal, where the PCF identification information is the H-PCF identification information, and where the target PCF determined by the H-SMF is the target H-PCF. Therefore, the H-SMF determines whether the at least one first PCF corresponding to the PCF identification information includes the target H-PCF.

For detailed descriptions of S910, refer to the related descriptions of S805 in the foregoing embodiment. Details are not described herein again.

In this embodiment of the present application, if the H-SMF determines that the at least one first PCF corresponding to the PCF identification information does not include the target H-PCF, the H-SMF interacts with an H-NRF (an NRF in the HPLMN) to determine the target H-PCF. To be more specific, the H-SMF obtains PCF information from the H-NRF, and determines the target H-PCF based on the PCF information; or the H-SMF determines the target H-PCF based on PCF information stored in the H-SMF.

The foregoing method for interacting, by the H-SMF, with the H-NRF to determine the target H-PCF is similar to the method for interacting, by the first AMF (the AMF in the HPLMN), with the H-NRF to determine the target H-PCF in the foregoing embodiment. For detailed descriptions of the process in which the H-SMF interacts with the H-NRF to determine the target H-PCF, refer to the related descriptions of the process in which the first AMF interacts with the H-NRF to determine the target H-PCF in the foregoing embodiment. Details are not described herein again.

Optionally, in this embodiment of the present application, when the session creation service or message sent by the AMF to the V-SMF in S904 does not include the PCF identification information, or the session creation service or message sent by the V-SMF to the H-SMF does not include the PCF identification information, the H-SMF interacts with the H-NRF (the NRF in the HPLMN) to determine the target H-PCF, or the H-SMF determines the target H-PCF based on the PCF information stored in the H-SMF.

S911. The H-SMF obtains policy information from the target H-PCF when the at least one first PCF corresponding to the PCF identification information includes the target H-PCF.

S912. The H-SMF selects an H-UPF providing a service to the terminal.

It should be noted that, in this embodiment of the present application, after S912, the establishing, by the terminal, the session with the network further includes other steps. Because all subsequent session establishment steps are the same as existing steps for establishing the home routed session, a detailed description is not made in this embodiment of the present application.

Second, for the second scenario, a network accessed by the terminal is an HPLMN. To be more specific, the terminal is in a non-roaming state, and the target PCF determined in this embodiment of the present application is a target H-PCF.

In this embodiment of the present application, the terminal is in the non-roaming state, and in a process in which the terminal establishes a session with the network, an AMF may determine identification information of an H-PCF determined by the AMF in the process in which the terminal accesses the network as PCF identification information, and then the AMF sends a session creation service or message carrying the PCF identification information to an SMF. Therefore, the SMF determines the H-PCF corresponding to the PCF identification information as the target H-PCF based on the PCF identification information. To be more specific, the SMF determines the H-PCF determined by the AMF in the process in which the terminal accesses the HPLMN as the target H-PCF.

Further, in this embodiment of the present application, when a type of the session established by the terminal with the network is unchanged, and the SMF providing a service to the terminal is changed in the network, the PCF determining method provided in this embodiment of the present application may also be used (for example, the AMF may also send the PCF identification information to the changed SMF, and the changed SMF may determine the target PCF based on the PCF identification information, and obtain the policy information from the target PCF), thereby ensuring that the terminal smoothly establishes a session with the network.

In this embodiment of the present application, after the terminal accesses the network and establishes the session with the network, when an (R)AN serving the terminal (in connected mode) is changed, for example, when the (R)AN serving the terminal is handed over from a second (R)AN to a first (R)AN, to ensure that the terminal smoothly runs a service in the network, when direct communication cannot be performed between the second (R)AN and the first (R)AN, and when a new AMF needs to be selected for the terminal, the new AMF needs to determine the target PCF.

Figure 13:
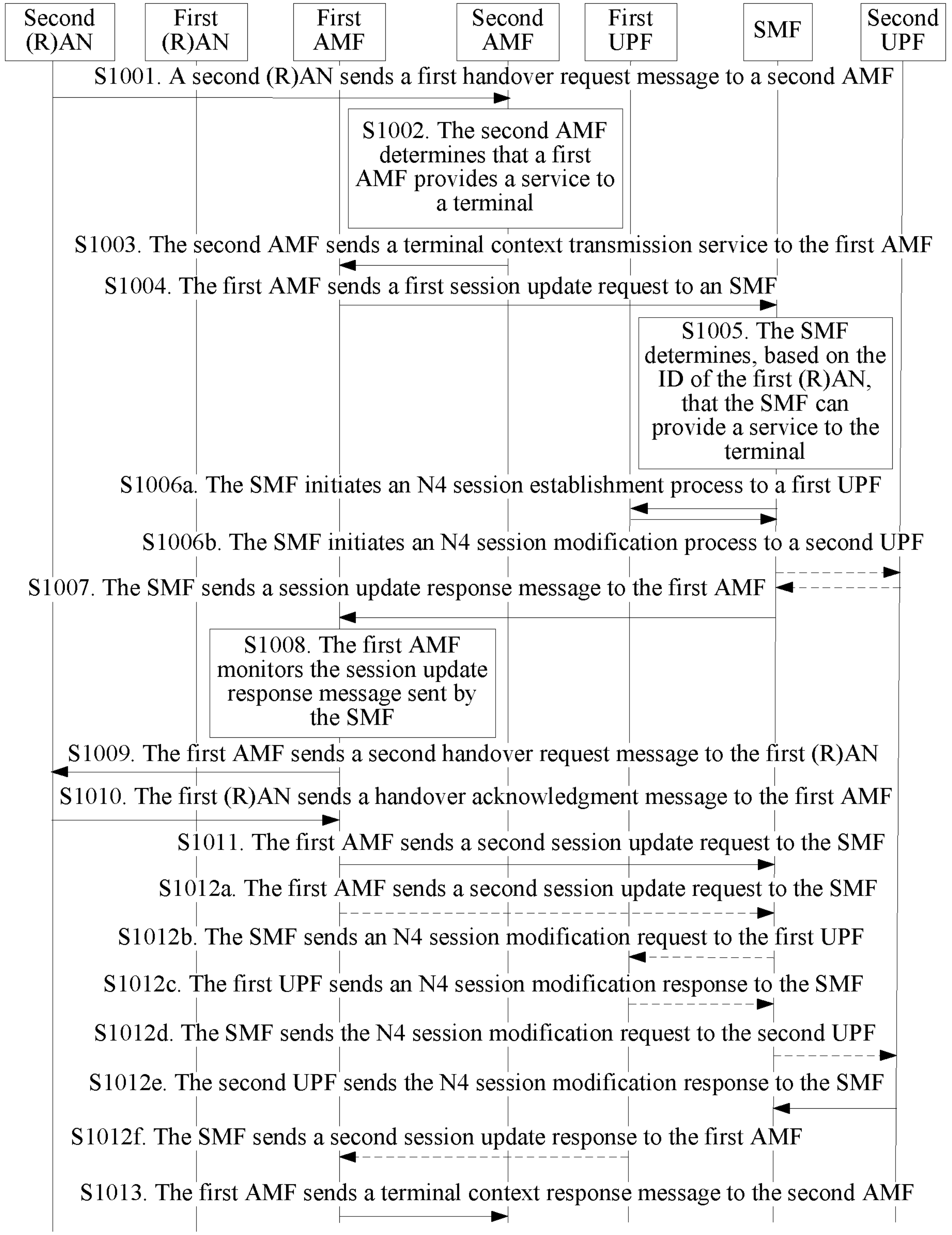
FIG. 13 is a ninth schematic diagram of a PCF determining method according to an embodiment of the present application.

As shown in FIG. 13, a PCF determining method provided in an embodiment of the present application may include the following steps.

S1001. A second (R)AN sends a first handover request message to a second AMF.

The first handover request message includes an ID of a first (R)AN (the first (R)AN is an (R)AN after handover), terminal registration information in the second (R)AN (the second (R)AN is an (R)AN before handover), a list of session management information on a port (an N2 port) between the second (R)AN and the second AMF, and a PDU session ID (that is, an identifier of a session).

S1002. The second AMF determines that a first AMF provides a service to a terminal.

In this embodiment of the present application, when the second AMF determines that the second AMF cannot provide a service to the terminal, the second AMF performs a process of selecting the first AMF, and determines that the first AMF provides a service to the terminal.

S1003. The second AMF sends a terminal context transmission service to the first AMF.

The context transmission service includes the ID of the first (R)AN, the terminal registration information in the second (R)AN, the list of the session management information on the port (the N2 port) between the second (R)AN and the second AMF, and a terminal context, and the terminal context includes a session ID list, SMF information, and PCF identification information.

In this embodiment of the present application, the second AMF sends related information that is sent by the second (R)AN and that is received by the second AMF (that is, the ID of the first (R)AN, the terminal registration information in the second (R)AN, and the like) to the first AMF, and sends information in the second AMF such as the SMF information, the session ID list, and the PCF identification information to the first AMF. Because the terminal context transmission service that is sent by the second AMF and that is received by the first AMF includes the PCF identification information, the first AMF may determine a target PCF based on the PCF identification information.

For example, when the first AMF determines that the at least one first PCF corresponding to the PCF identification information does not include the target PCF, the first AMF interacts with an NRF (for details, refer to the related descriptions of S105) or the first AMF determines a target H-PCF based on PCF information stored in the first AMF (that is, locally configured PCF information). Alternatively, if the first AMF determines that the at least one first PCF corresponding to the PCF identification information includes the target PCF, the first AMF determines the target H-PCF in the at least one first PCF corresponding to the PCF identification information.

Optionally, in this embodiment of the present application, a method for determining, by the first AMF, whether the at least one first PCF corresponding to the PCF identification information includes the target PCF may include initiating, by the first AMF, a connection to each PCF of the at least one first PCF corresponding to the PCF identifier information (that is, interacting with each PCF), where if the first PCF includes a PCF successfully connected to the first AMF, it indicates that the first PCF includes the target PCF. Alternatively, if each of all PCFs of the first PCF fails to be connected to the first AMF, it indicates that the first PCF does not include the target PCF.

For detailed descriptions of determining, by the first AMF, the target PCF, refer to the related descriptions of determining, by the first AMF, the target PCF in the first scenario to the fifth scenario. Details are not described herein again.

It should be noted that the determining, by the first AMF, the target PCF may be performed at any time after S1003, for example, performed after S1003 and before S1004, or may be performed after a handover preparation process ends. This is not specifically limited in this embodiment of the present application.

S1004. The first AMF sends a first session update request to an SMF.

The first session update request includes the PDU session ID, the ID of the first (R)AN, and an identifier of the first AMF, and the session update request is used to switch the terminal session from a first session to a second session after the (R)AN is changed.

S1005. The SMF determines, based on the ID of the first (R)AN, that the SMF may provide a service to the terminal.

In this embodiment of the present application, the SMF may determine, based on an ID of an (R)AN, whether the SMF may continue to provide a service to the terminal after the (R)AN providing a service to the terminal is changed. When the SMF may provide a service to the terminal, the SMF determines whether to reselect a new UPF (which is always referred to as a first UPF below). To be more specific, a second UPF (a UPF connected to the second (R)AN) is replaced with the first UPF.

If the SMF determines that the first UPF provides a service to the terminal, S1006*a* is performed; or if the SMF determines that the second UPF provides a service to the terminal, S1006*b* is performed.

S1006*a*. The SMF initiates an N4 session establishment process to the first UPF.

S1006*b*. The SMF initiates an N4 session modification process to the second UPF.

In this embodiment of the present application, the initiating, by the SMF an N4 session modification process to the second UPF may include sending, by the SMF, an N4 session modification request to the second UPF, and sending, by the second UPF, an N4 session modification response to the SMF.

S1007. The SMF sends a session update response message to the first AMF.

When the session is successfully switched from the first session to the second session, the update response message includes the PDU session ID, and session management information (that is, SM N2 information) between the first (R)AN and the AMF; or when the session fails to be switched, the update response message does not include session management information between the first (R)AN and the AMF.

S1008. The first AMF monitors the session update response message sent by the SMF.

S1009. The first AMF sends a second handover request message to the first (R)AN.

The second handover request message includes the terminal registration information in the second (R)AN, the session management information on the port (the N2 port) between the second (R)AN and the second AMF, and mobility management information on the port (the N2 port) between the second (R)AN and the second AMF.

It may be understood that the second (R)AN sends the terminal registration information in the second (R)AN to the second AMF through the first handover request message, then the second AMF sends the terminal registration information to the first AMF, and finally the first AMF sends the terminal registration information to the first (R)AN through the second handover request message. Therefore, the terminal registration information is transparently transmitted to the first (R)AN (the transparently transmitted terminal registration information may be referred to as a transparent container from the second (R)AN to the first (R)AN).

S1010. The first (R)AN sends a handover acknowledgment message to the first AMF.

Optionally, in this embodiment of the present application, if the handover acknowledgment message sent by the first (R)AN to the first AMF indicates that the PDU session fails to be switched, S1011 is performed; or if the handover acknowledgment message sent by the first (R)AN to the first AMF indicates that the PDU session is switched successfully, S1012*a* is performed.

S1011. The first AMF sends a second session update request to the SMF.

The second session update request includes the PDU session ID and a reason why the PDU session fails to be switched.

S1012*a*. The first AMF sends a second session update request to the SMF.

The second session request includes the PDU session ID, the session management information on the port (the N2 port) between the second (R)AN and the second AMF, and a list of session management information on a port (an N3 port) between the first (R)AN and a UPF (which includes the first UPF or the second UPF).

It should be noted that, when the SMF determines that the first UPF provides a service to the terminal, S1012*b* and S1012*c* are performed after S1012*a*; or when the SMF determines that the second UPF provides a service to the terminal, S1012*d* and S1012*e* are performed after S1012*a*.

S1012*b*. The SMF sends the N4 session modification request to the first UPF.

S1012*c*. The first UPF sends the N4 session modification response to the SMF.

S1012*d*. The SMF sends the N4 session modification request to the second UPF.

S1012*e*. The second UPF sends the N4 session modification response to the SMF.

S1012*f*. The SMF sends a second session update response to the first AMF.

S1013. The first AMF sends a terminal context response message to the second AMF.

Optionally, in this embodiment of the present application, the first AMF sends first indication information to the second AMF, where the first indication information is used to instruct that the first AMF has determined the target PCF in the at least one first PCF corresponding to the PCF identification information. Optionally, the first indication information may be sent by the first AMF to the second AMF at a PDU session switching preparation stage.

Optionally, in this embodiment of the present application, the second AMF may send second indication information to the target PCF.

Optionally, in this embodiment of the present application, the second AMF may send third indication information to the target PCF.

For details of the related descriptions of the first indication information, the second indication information, and the third indication information, refer to the descriptions of S105 to S107 in the process in which the terminal accesses the network in the foregoing embodiment. Details are not described herein again.

So far, PDU session switching preparation of the terminal is completed.

Based on the PCF determining method provided in this embodiment of the present application, for the terminal in connected mode, when the (R)AN serving the terminal is changed, an old AMF (that is, the second AMF) may provide the PCF identification information to a new AMF (that is, the first AMF). When the at least one first PCF corresponding to the PCF identification information includes the target H-PCF, the first AMF obtains the policy information from the target PCF. Therefore, the first AMF does not need to interact with the NRF to determine the target H-PCF, thereby reducing, to some extent, signaling overheads required for determining the target PCF.

In this embodiment of the present application, after the terminal establishes a session with the network, a UPF that serves the terminal and that is in the network may be changed (which may be referred to as UPF relocation), and a current service of the terminal needs to be switched, which is understood as re-establishing a session and switching the service of the terminal to the new session, for example, switching the service of the terminal from the first session to the second session. In the following embodiment, the first session is a session established by the terminal with the network before the UPF is changed, and the second session is a session established by the terminal with the network after the UPF is changed.

Figure 14:
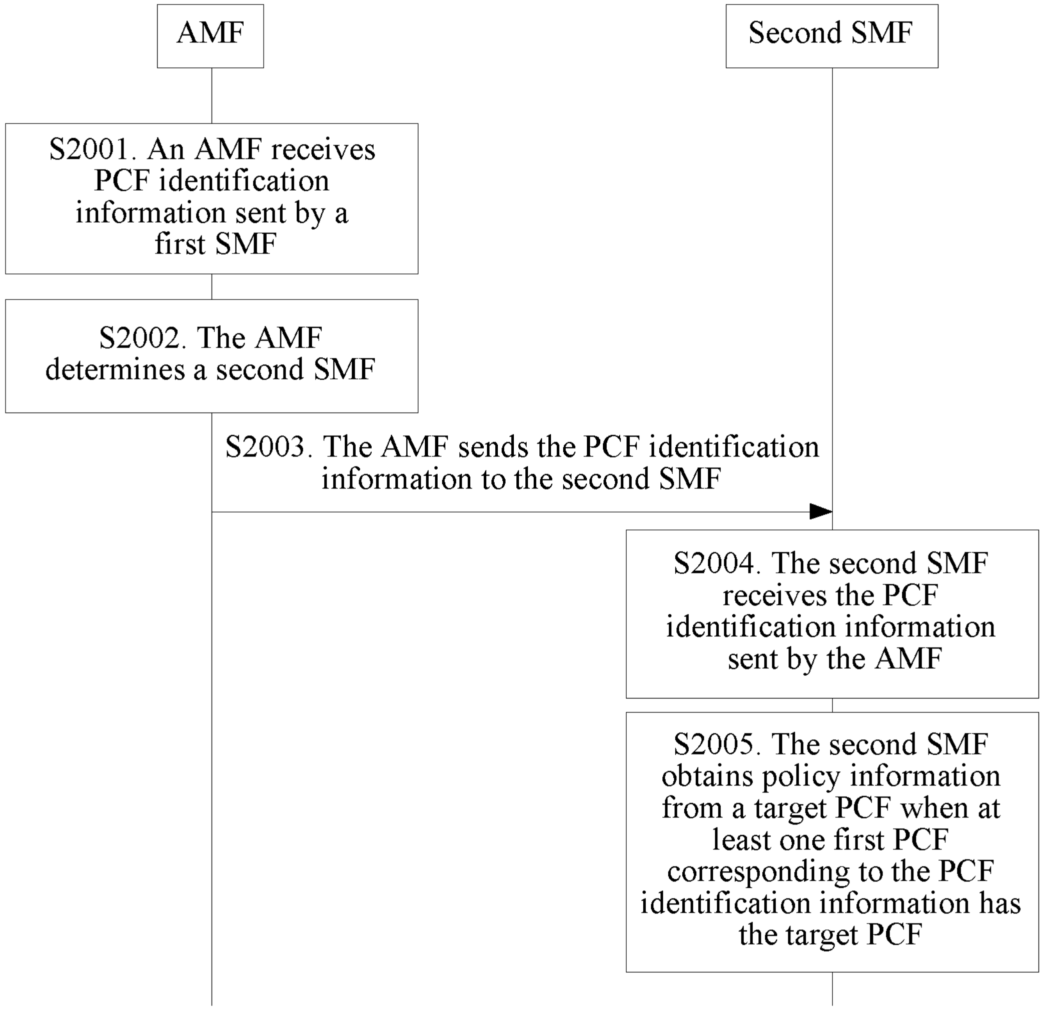
FIG. 14 is a tenth schematic diagram of a PCF determining method according to an embodiment of the present application.

As shown in FIG. 14, a PCF determining method provided in an embodiment of the present application in a process of relocating a UPF in a network may include the following steps.

S2001. An AMF receives PCF identification information sent by a first SMF.

The first SMF serves a first session.

In this embodiment of the present application, in a process in which a terminal establishes the first session with a network, the first SMF has obtained the PCF identification information, and when the first SMF determines that a UPF serving the terminal needs to be replaced (that is, determines that a UPF needs to be relocated), the first SMF may add the PCF identification information to a session establishment or release message (for example, Namf_Communication N1N2MessageTransfer) sent to the AMF.

It should be noted that the session establishment or release message sent by the first SMF to the AMF includes session management information (for example N1 SM information), and the session establishment or release message includes an identifier of a PDU session (which includes an identifier of the first session and an identifier of the second session, for example, a first session ID and a second session ID) and a reason indicating why a same data network re-establishes a session. The SMF transparently transmits the session management information to the terminal through the AMF, such that the terminal establishes the second session with the network, and releases the first session.

For other descriptions of the PCF identification information, refer to the related descriptions of the PCF identification information in S101 of the foregoing embodiment. Details are not described herein again.

S2002. The AMF determines a second SMF.

The second SMF serves the second session, and the second SMF is the same as or different from the first SMF.

In this embodiment of the present application, after the terminal receives the session management information transparently transmitted by the AMF, the terminal re-establishes a session, that is, establishes the second session. With reference to the foregoing embodiment in which the terminal establishes the session with the network, in the process in which the terminal establishes the second session with the network, the AMF first determines an SMF providing a service to the terminal. The first session and the second session serve a same data network (DN).

It should be noted that, in this embodiment of the present application, the second SMF determined by the AMF may be same as the first SMF, or may be different from the first SMF.

This is not specifically limited in this embodiment of the present application. For example, when the UPF is changed, the SMF providing a service to the terminal may be changed, or may be unchanged. To be more specific, the first SMF may continue to provide a service to the terminal. To be more specific, the second SMF is the same as the first SMF.

S2003. The AMF sends the PCF identification information to the second SMF.

In this embodiment of the present application, after the AMF determines the second SMF, the AMF may send the PCF identification information that is sent by the first SMF and that is received by the AMF to the second SMF.

Optionally, S2003 may be implemented through S2003*a*.

S2003*a*. The AMF sends the PCF identification information to the second SMF based on an identifier of the first session and an identifier of the second session that are sent by the terminal.

In this embodiment of the present application, the terminal receives a session establishment message transparently transmitted by the AMF, and the terminal may determine, based on the identifier of the first session and the identifier of the second session in the session establishment message, that the second session is a session to which the first session is switched (for example, when the UPF is changed, a service of the terminal is switched from the first session to the second session). In this case, the AMF sends the PCF identification information to the second SMF.

S2004. The second SMF receives the PCF identification information sent by the AMF.

S2005. The second SMF obtains policy information from a target PCF when at least one first PCF corresponding to the PCF identification information includes the target PCF.

In this embodiment of the present application, for detailed descriptions of S2005, refer to the related descriptions of S102 in the foregoing embodiment. Details are not described herein again.

Optionally, in this embodiment of the present application, the SMF determines, when the first AMF determines that the at least one first PCF corresponding to the PCF identification information does not include the target PCF, the target PCF based on PCF information.

In this embodiment of the present application, the PCF information is PCF information obtained by the SMF by interacting with an NRF in the network, or PCF information stored in (for example, locally preconfigured by) the SMF, such that the SMF may determine the target PCF based on the PCF information.

In a possible implementation, the foregoing method for determining, by the SMF, whether the at least one first PCF corresponding to the PCF identification information includes the target PCF may include initiating, by the SMF, a connection to each PCF of the at least one first PCF corresponding to the PCF identifier (that is, interacting with each PCF). If the first PCF includes a PCF successfully connected to the SMF, it indicates that the first PCF includes the target PCF. Alternatively, if each of all PCFs of the first PCF fails to be connected to the SMF, it indicates that the first PCF does not include the target PCF.

It should be noted that, if the session establishment or release message sent by the first SMF to the AMF does not include the PCF identification information, the SMF may also determine the target PCF based on the PCF information.

Based on the PCF determining method provided in this embodiment of the present application, in the process of relocating the UPF, the AMF in the network may receive the PCF identification information sent by the first SMF, and after the AMF determines the second SMF, the AMF may send the PCF identification information to the second SMF. When the at least one first PCF corresponding to the PCF identification information includes the target PCF, the second SMF obtains the policy information from the target PCF. Compared with some approaches, in this embodiment of the present application, because the at least one first PCF corresponding to the PCF identification information includes the target PCF, the second SMF does not need to interact with the NRF to obtain and determine the target PCF, thereby reducing, to some extent, signaling overheads required for determining a PCF.

In this embodiment of the present application, in the foregoing session switching process, based on a requirement of a service of the terminal for service continuity, session service modes of the terminal are divided into a second mode and a third mode. In the second mode, continuity does not need to be ensured for the service of the terminal, and in the third mode, service continuity of the terminal needs to be ensured. A process in which a terminal switches a session when a UPF is changed is described below separately from the perspective of the second mode and the third mode.

Figure 15:
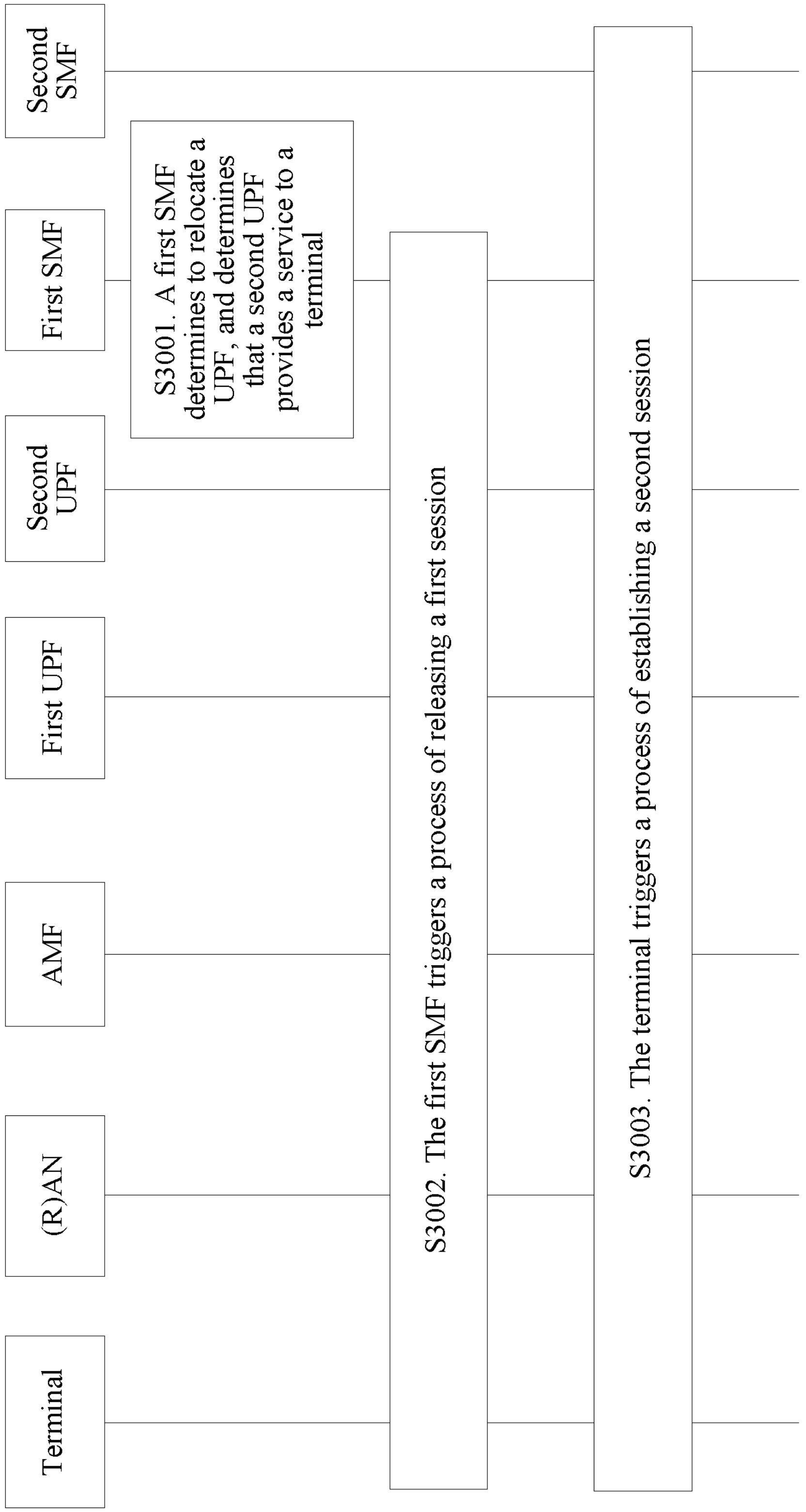
FIG. 15 is an eleventh schematic diagram of a PCF determining method according to an embodiment of the present application.

With reference to FIG. 14, as shown in FIG. 15, in an embodiment of the present application, when a session service mode of the terminal is the second mode, a PCF determining method may include the following steps.

S3001. A first SMF determines to relocate a UPF, and determines that a second UPF provides a service to the terminal.

In this embodiment of the present application, the determining, by the first SMF, to relocate the UPF is understood as determining, by the first SMF, to change the UPF.

S3002. The first SMF triggers a process of releasing a first session.

In this embodiment of the present application, the session service mode of the terminal is the second mode, and when the SMF determines to change the UPF, the SMF sends a session release message and PCF identification information to an AMF. Optionally, the first SMF sends a PDU session ID to the AMF. The session release message further includes an identifier of a PDU session, and indication information used to instruct the terminal to trigger establishment of a second session. Therefore, after the session release message is transparently transmitted to the terminal through the AMF, the terminal releases the first session. The AMF stores the PDU session ID and the PCF identification information.

S3003. The terminal triggers a process of establishing the second session.

In this embodiment of the present application, after the terminal receives the session release message transparently transmitted through the AMF, the terminal triggers, based on the indication information that is used to instruct the terminal to trigger establishment of the second session and that is sent by the AMF, the process of establishing the second session.

For example, the process of establishing the second session may include the following steps.

S3003*a*. The first SMF sends a session establishment message to the AMF, where the session establishment message includes the identifier of the PDU session and the PCF identification information.

S3003*b*. After the AMF receives the session establishment message, the AMF determines a second SMF.

S3003*c*. The AMF sends the PCF identification information to the second SMF.

S3003*d*. The second SMF determines whether at least one first PCF corresponding to the PCF identification information includes a target PCF.

It should be noted that, in this embodiment of the present application, the foregoing method for determining, by the second SMF, whether the at least one first PCF corresponding to the PCF identification information includes the target PCF is similar to a method for determining, by the second SMF, whether the at least one first PCF corresponding to the PCF identification information includes the target PCF in the foregoing embodiment (S2001 to S2005). For detailed descriptions of S3003*d*, refer to the related descriptions in the foregoing embodiment. Details are not described herein again.

In this embodiment of the present application, if the second SMF determines that the at least one first PCF corresponding to the PCF identification information includes the target PCF, the second SMF obtains policy information from the target PCF. If the second SMF determines that the at least one first PCF corresponding to the PCF identification information does not include the target PCF, the second SMF interacts with an NRF to determine the target PCF; or the second SMF determines the target PCF based on PCF information stored in the second SMF.

For the method for determining, by the second SMF, the target PCF, refer to the method for determining, by the SMF, the target PCF in the foregoing embodiment. Details are not described herein again.

It should be noted that after S3003*d*, the process of establishing the second session further includes other steps. The steps are not described in detail again in this embodiment of the present application.

Figure 16:
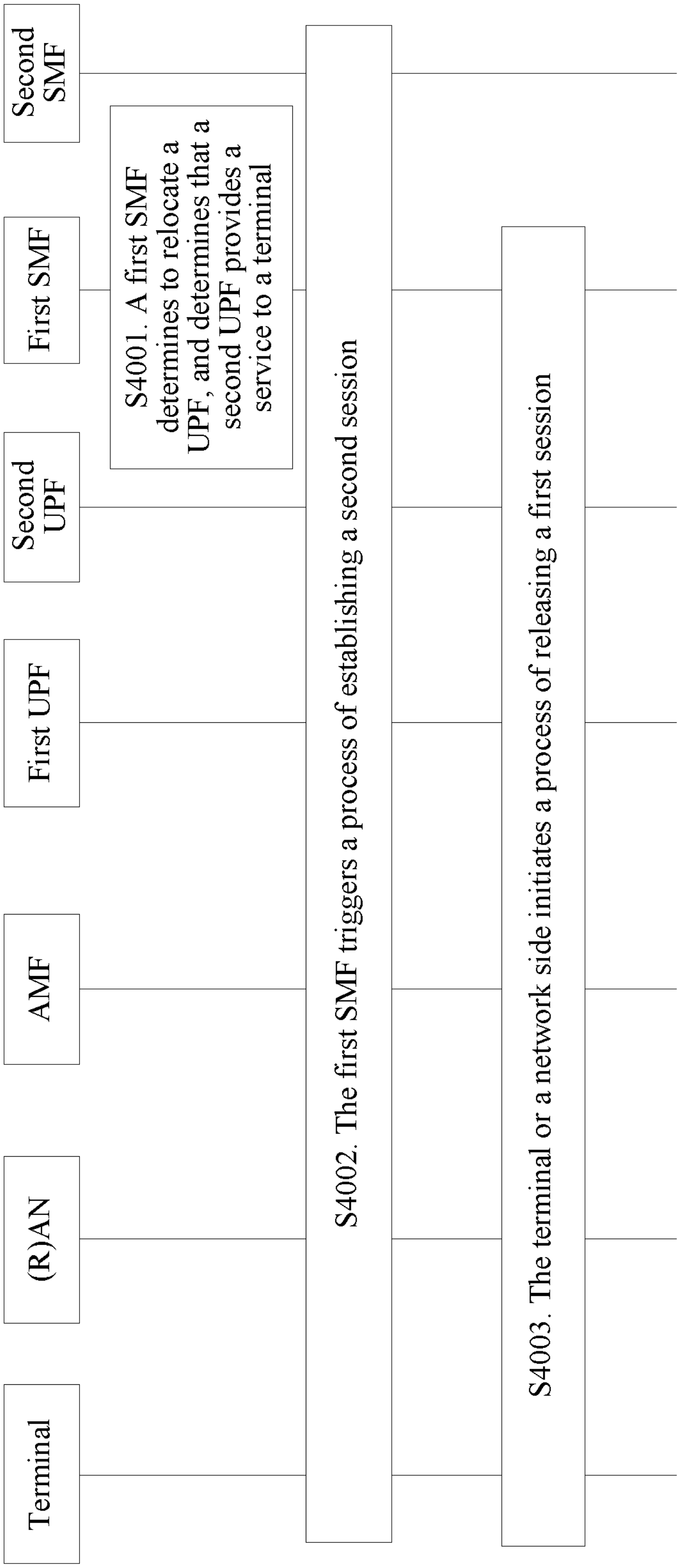
FIG. 16 is a twelfth schematic diagram of a PCF determining method according to an embodiment of the present application.

With reference to FIG. 14, as shown in FIG. 16, in an embodiment of the present application, when a session service mode of the terminal is the third mode, a PCF determining method may include the following steps.

S4001. A first SMF determines to relocate a UPF, and determines that a second UPF provides a service to the terminal.

S4002. The first SMF triggers a process of establishing a second session.

In this embodiment of the present application, the session service mode of the terminal is the third mode. To ensure service continuity of the terminal, when the SMF determines to change a UPF, the SMF first triggers the process of establishing the second session. For example, the first SMF sends a session establishment message to an AMF, where the session establishment message includes an identifier of a PDU session, PCF identification information, and indication information used to instruct the terminal to trigger establishment of the second session. Optionally, The AMF stores the identifier of the PDU session and the PCF identification information.

In this embodiment of the present application, in the process in which the terminal establishes the second session with the network, the AMF may send the PCF identification information to a second SMF determined by the AMF, such that when at least one first PCF corresponding to the PCF identification information includes a target PCF, the second SMF obtains policy information from the target PCF.

For other descriptions of S4002, refer to the related descriptions of S3003. Details are not described herein again.

S4003. The terminal or a network side initiates a process of releasing a first session.

Similar to the foregoing, it should be noted that, in S4003, the process of establishing the second session further includes other steps. The steps are not described in detail again in this embodiment of the present application.

It should be noted that, in this embodiment of the present application, the session service mode of the terminal is the third mode. In the process in which the terminal establishes the second session with the network, if the second SMF determined by the AMF is the same as the first SMF, the AMF sends one piece of indication information (which may be referred to as first indication information) to the second SMF, where the first indication information is used to instruct the second SMF to determine the target PCF based on the PCF identification information stored in the second SMF.

For example, the second SMF is the same as the first SMF, and the first SMF (that is, the second SMF) has stored the PCF identification information. Therefore, the AMF does not need to send the PCF identification information to the second SMF again, and the AMF may send one piece of indication information to the second SMF, to instruct the second SMF to determine the target PCF based on the PCF identification information stored in the second SMF.

The foregoing mainly describes the solutions provided in the embodiments of the present application from the perspective of interaction between network elements. It may be understood that, to implement the foregoing functions, the network elements such as the first AMF and the second AMF, or the AMF and the SMF include corresponding hardware structures and/or software modules for performing the functions. A person of ordinary skill in the art should easily be aware that, in combination with the examples described in the embodiments disclosed in this specification, units, algorithms, and steps may be implemented using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present application, function module division may be performed on the first AMF, the second AMF, the SMF, and the like based on the foregoing method examples. For example, each function module may be obtained through division based on each corresponding function, or two or more than two functions may be integrated in one processing module. The integrated module may be implemented in a form of hardware, or may be implemented in a form of a software function module. It should be noted that, in this embodiment of the present application, module division is exemplary, and is merely a logical function division. In actual implementation, another division manner may be used.

Figure 17:
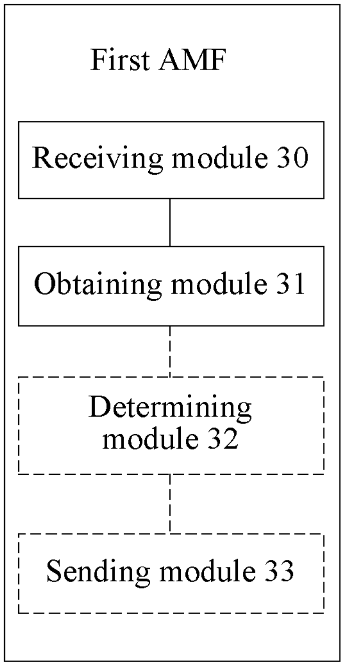
FIG. 17 is a first schematic structural diagram of a first AMF according to an embodiment of the present application.

When each function module is obtained through division based on each corresponding function, FIG. 17 is a possible schematic structural diagram of a first AMF in the foregoing embodiments. As shown in FIG. 17, the first AMF may include a receiving module 30 and an obtaining module 31. The receiving module 30 may be used by the first AMF to perform S101 in the foregoing method embodiments. The obtaining module 31 may be configured to support the first AMF in performing S102 in the foregoing method embodiments. Optionally, as shown in FIG. 17, the first AMF may further include a determining module 32 and a sending module 33. The determining module 32 may be configured to support the first AMF in performing S104, S103, S206, S209, S214, S217 (which includes S2171 to S2174), S207*a*, S210*a*, S215*a*, S306, S309, S314, S317 (which includes S3171 to S3174), S307*a*, S310*a*, S312*a*, S313*a*, S315*a*, S406, S407, S410, S415, S506, S507, S510, S515, S606, S607, S610, and S615 in the foregoing embodiments. The sending module 33 may be configured to support the first AMF in performing S105, S106, S107, S204, S207, S211, S212, S218, S219, S220, S222, S208*a*, S212*a*, S213*a*, S218*a*, S220*a*, S221*a*, S223*a*, S304, S307, S311, S312, S318, S319, S320, S322, S308*a*, S318*a*, S320*a*, S321*a*, S323*a*, S404, S408, S412, S413, S418, S420, S421, S423, S504, S508, S512, S513, S518, S520, S521, S523, S604, S608, S612, S613, S618, S620, S621, and S623.

For all related content of the steps in the foregoing method embodiments, refer to function descriptions of corresponding function modules, and details are not described herein again.

Figure 18:
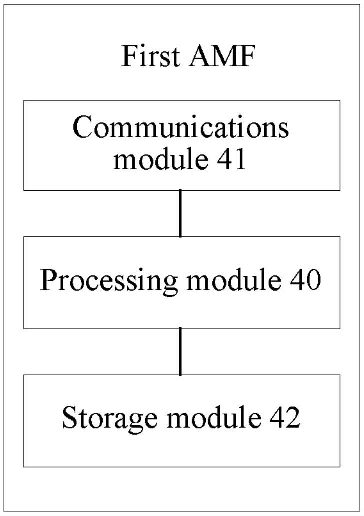
FIG. 18 is a second schematic structural diagram of a first AMF according to an embodiment of the present application.

When an integrated unit is used, FIG. 18 is a possible schematic structural diagram of a first AMF in the foregoing embodiments. As shown in FIG. 18, the first AMF may include a processing module 40 and a communications module 41. The processing module 40 may be configured to control and manage an action of the first AMF. For example, the processing module 40 may be configured to support the first AMF in performing related steps performed by the obtaining module 31 and the determining module 32, and/or used for other processes of a technology described herein. The communications module 41 may be configured to support the first AMF in communicating with another network entity. For example, the communications module 41 may be configured to support the first AMF in performing related steps performed by the receiving module 30 and the sending module 33. Optionally, as shown in FIG. 18, the first AMF may further include a storage module 42 configured to store program code and data of the first AMF.

The processing module 40 may be a processor or a controller, such as may be a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processing module 40 may implement or execute various example logical blocks, modules, and circuits described with reference to content disclosed in the embodiments of the present application. The foregoing processor may be a combination of processors implementing a computing function, for example, a combination of one or more microprocessors, or a combination of the DSP and a microprocessor. The communications module 41 may be a transceiver, a transceiver circuit, a communications interface, or the like. The storage module 42 may be a memory.

When the processing module 40 is a processor, the communications module 41 is a transceiver, and the storage module 42 is a memory, the processor, the transceiver, and the memory may be connected through a bus. The bus may be a peripheral component interconnect (PCI) bus, an extended industry standard architecture (EISA) bus, or the like. The bus may be classified into an address bus, a data bus, a control bus, or the like.

Figure 19:
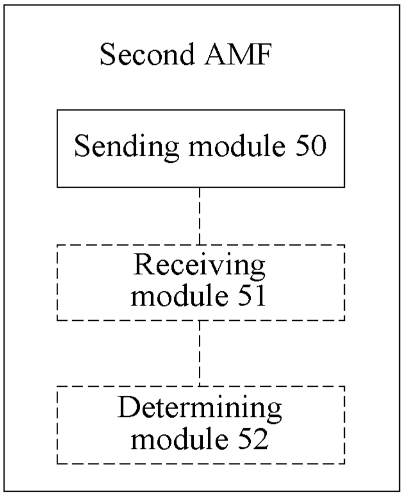
FIG. 19 is a first schematic structural diagram of a second AMF according to an embodiment of the present application.

When each function module is obtained through division based on each corresponding function, FIG. 19 is a possible schematic structural diagram of a second AMF in the foregoing embodiments. As shown in FIG. 19, the second AMF may include a sending module 50. The sending module 50 may be configured to support the second AMF in performing S205, S305, S405, S505, and S605 in the foregoing method embodiments. Optionally, as shown in FIG. 19, the second AMF may further include a receiving module 51 and a determining module 52. The receiving module 51 may be configured to support the second AMF in performing a related action in the foregoing method embodiments. The determining module 52 may be configured to support the second AMF in performing a related action in the foregoing method embodiments. For all related content of the steps in the foregoing method embodiments, refer to function descriptions of corresponding function modules, and details are not described herein again.

Figure 20:
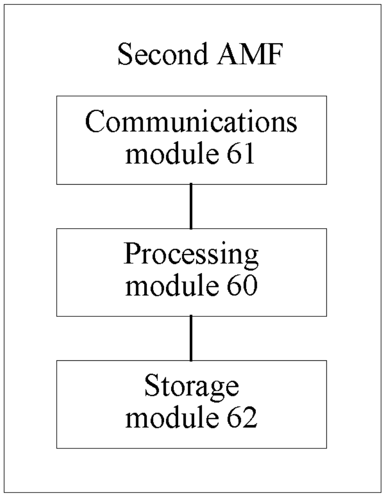
FIG. 20 is a second schematic structural diagram of a second AMF according to an embodiment of the present application.

When an integrated unit is used, FIG. 20 is a possible schematic structural diagram of a second AMF in the foregoing embodiments. As shown in FIG. 20, the second AMF may include a processing module 60 and a communications module 61. The processing module 60 may be configured to control and manage an action of the second AMF and/or used for other processes of a technology described herein. The communications module 61 may be configured to support the second AMF in communicating with another network entity. For example, the communications module 61 may be configured to support the second AMF in performing related steps performed by the sending module and the receiving module. Optionally, as shown in FIG. 20, the second AMF may further include a storage module 62 configured to store program code and data of the second AMF.

The processing module 60 may be a processor or a controller, for example, may be a CPU, a general purpose processor, a DSP, an ASIC, an FPGA, or another programmable logic device, a transistor logic device, a hardware component, or any combination thereof. The processing module 60 may implement or execute various example logical blocks, modules, and circuits described with reference to content disclosed in the embodiments of the present application. The foregoing processor may be a combination of processors implementing a computing function, for example, a combination of one or more microprocessors, or a combination of the DSP and a microprocessor. The communications module 61 may be a transceiver, a transceiver circuit, a communications interface, or the like. The storage module 62 may be a memory.

When the processing module 60 is a processor, the communications module 61 is a transceiver, and the storage module 62 is a memory, the processor, the transceiver, and the memory may be connected through a bus. The bus may be a PCI bus, an EISA bus, or the like. The bus may be classified into an address bus, a data bus, a control bus, or the like.

Figure 21:
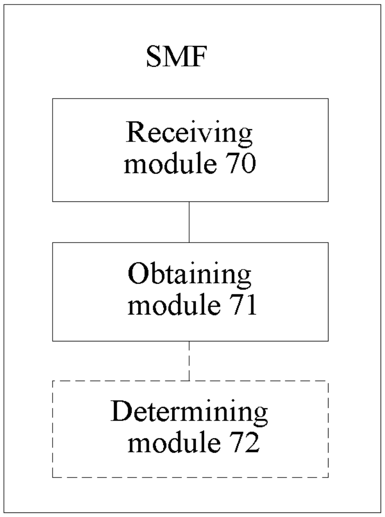
FIG. 21 is a first schematic structural diagram of an SMF according to an embodiment of the present application.

When each function module is obtained through division based on each corresponding function, FIG. 21 is a possible schematic structural diagram of an SMF in the foregoing embodiments. As shown in FIG. 21, the SMF may include a receiving module 70 and an obtaining module 71. The receiving module 70 may be configured to support the SMF in performing S701 and S2004 in the foregoing method embodiments. The obtaining module 70 may be configured to support the SMF in performing S702, S808, S911, and S2005 in the foregoing method embodiments. Optionally, as shown in FIG. 21, the SMF may further include a determining module 72, and the determining module 72 may be configured to support the SMF in performing S703, S704, S805, S809, S905, S910, S912, and S3003*d* in the foregoing method embodiments. For all related content of the steps in the foregoing method embodiments, refer to function descriptions of corresponding function modules, and details are not described herein again.

Figure 22:
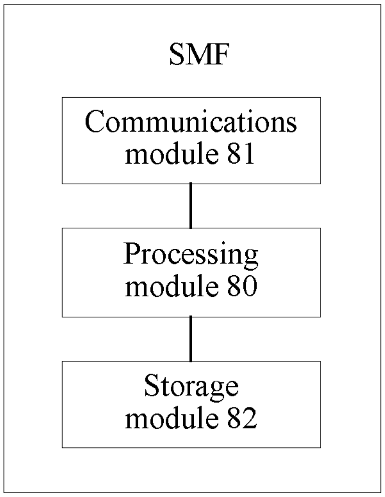
FIG. 22 is a second schematic structural diagram of an SMF according to an embodiment of the present application.

When an integrated unit is used, FIG. 22 is a possible schematic structural diagram of an SMF in the foregoing embodiments. As shown in FIG. 22, the SMF may include a processing module 80 and a communications module 81. The processing module 80 may be configured to control and manage an action of the SMF. The communications module 81 may be configured to support the SMF in communicating with another network entity. For example, the communications module 81 may be configured to support the SMF in performing a related step performed by the receiving module 70 in the foregoing method embodiments and other steps in the foregoing method embodiments. Optionally, as shown in FIG. 22, the SMF may further include a storage module 82 configured to store program code and data of the SMF.

The processing module 80 may be a processor or a controller, for example, may be a CPU, a general purpose processor, a DSP, an ASIC, an FPGA, or another programmable logic device, a transistor logic device, a hardware component, or any combination thereof. The processing module 80 may implement or execute various example logical blocks, modules, and circuits described with reference to content disclosed in the embodiments of the present application. The foregoing processor may be a combination of processors implementing a computing function, for example, a combination of one or more microprocessors, or a combination of the DSP and a microprocessor. The communications module 81 may be a transceiver, a transceiver circuit, a communications interface, or the like. The storage module 82 may be a memory.

When the processing module 80 is a processor, the communications module 81 is a transceiver, and the storage module 82 is a memory, the processor, the transceiver, and the memory may be connected through a bus. The bus may be a PCI bus, an EISA bus, or the like. The bus may be classified into an address bus, a data bus, a control bus, or the like.

Figure 23:
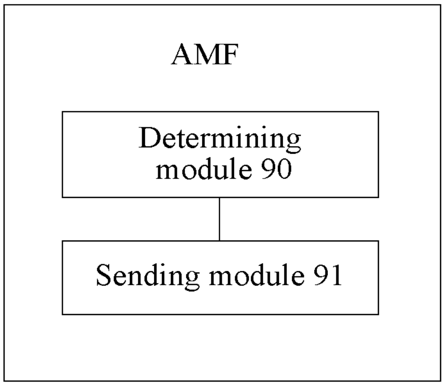
FIG. 23 is a first schematic structural diagram of an AMF according to an embodiment of the present application.

When each function module is obtained through division based on each corresponding function, FIG. 23 is a possible schematic structural diagram of an AMF in the foregoing embodiments. As shown in FIG. 23, the AMF may include a determining module 90 and a sending module 91. The determining module 90 may be configured to support the AMF in performing S802, S803, S902, and S903 in the foregoing method embodiments. The sending module 91 may be configured to support the AMF in performing S804 and S904 in the foregoing method embodiments. For all related content of the steps in the foregoing method embodiments, refer to function descriptions of corresponding function modules, and details are not described herein again.

Figure 24:
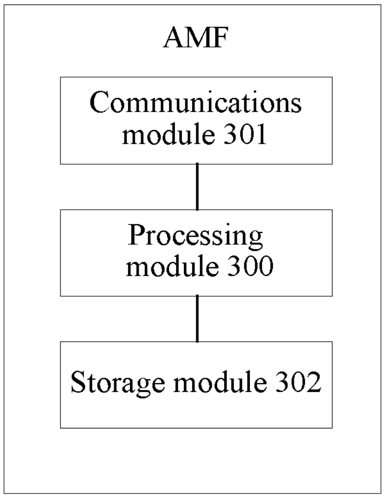
FIG. 24 is a second schematic structural diagram of an AMF according to an embodiment of the present application.

When an integrated unit is used, FIG. 24 is a possible schematic structural diagram of an AMF in the foregoing embodiments. As shown in FIG. 24, the AMF may include a processing module 300 and a communications module 301. The processing module 300 may be configured to control and manage an action of the AMF, and the processing module 300 is configured to perform a related step performed by the determining module 90. The communications module 301 may be configured to support the SMF in communicating with another network entity. For example, the communications module 301 may be configured to support the AMF in performing a related step performed by the sending module 91 in the foregoing method embodiments and other steps in the foregoing method embodiments. Optionally, as shown in FIG. 24, the AMF may further include a storage module 302 configured to store program code and data of the AMF.

The processing module 300 may be a processor or a controller, for example, may be a CPU, a general purpose processor, a DSP, an ASIC, an FPGA, or another programmable logic device, a transistor logic device, a hardware component, or any combination thereof. The processing module 300 may implement or execute various example logical blocks, modules, and circuits described with reference to content disclosed in the embodiments of the present application. The foregoing processor may be a combination of processors implementing a computing function, for example, a combination of one or more microprocessors, or a combination of the DSP and a microprocessor. The communications module 301 may be a transceiver, a transceiver circuit, a communications interface, or the like. The storage module 302 may be a memory.

When the processing module 300 is a processor, the communications module 301 is a transceiver, and the storage module 302 is a memory, the processor, the transceiver, and the memory may be connected through a bus. The bus may be a PCI bus, an EISA bus, or the like. The bus may be classified into an address bus, a data bus, a control bus, or the like.

When each function module is obtained through division based on each corresponding function, an embodiment of the present application provides a PCF, and the PCF may include a receiving module, an update module, and a sending module. The receiving module may be configured to support the PCF in performing a related action in the foregoing method embodiments. The update module may be configured to support the PCF in performing S219*a*, S319*a*, S419, S519, and S619 in the foregoing method embodiments. The sending module may be configured to support the PCF in performing a related action in the foregoing method embodiments. For all related content of the steps in the foregoing method embodiments, refer to function descriptions of corresponding function modules, and details are not described herein again.

Figure 25:
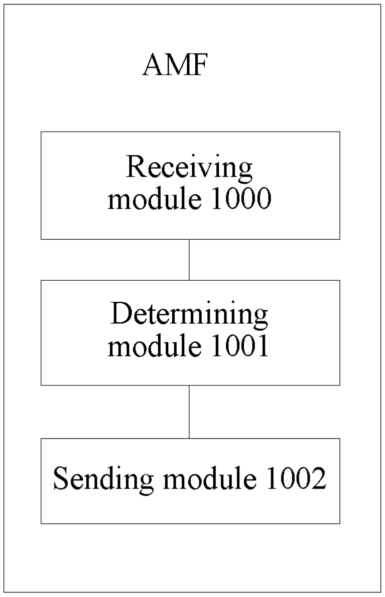
FIG. 25 is a first schematic structural diagram of an AMF according to an embodiment of the present application.

When each function module is obtained through division based on each corresponding function, FIG. 25 is a possible schematic structural diagram of an AMF in the foregoing embodiments. As shown in FIG. 25, the AMF may include a receiving module 1000, a determining module 1001, and a sending module 1002. The receiving module 1000 is configured to support the AMF in performing S2001 in the foregoing method embodiments. The determining module 1001 may be configured to support the AMF in performing S2002 in the foregoing method embodiments. The sending module 1002 may be configured to support the AMF in performing S2003 (which includes S2003*a*) in the foregoing method embodiments. For all related content of the steps in the foregoing method embodiments, refer to function descriptions of corresponding function modules, and details are not described herein again.

Figure 26:
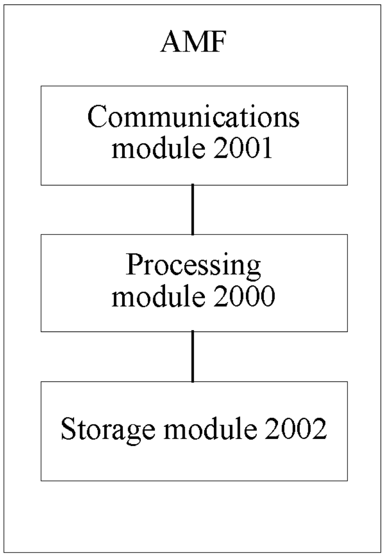
FIG. 26 is a second schematic structural diagram of an AMF according to an embodiment of the present application.

When an integrated unit is used, FIG. 26 is a possible schematic structural diagram of an AMF in the foregoing embodiments. As shown in FIG. 26, the AMF may include a processing module 2000 and a communications module 2001. The processing module 2000 may be configured to control and manage an action of the AMF, and the processing module 2000 is configured to perform S2002. The communications module 2001 may be configured to support the SMF in communicating with another network entity. For example, the communications module 2001 may be configured to support the AMF in performing S2001 and S2003 (which includes S2003*a*) in the foregoing method embodiments and other steps in the foregoing method embodiments. Optionally, as shown in FIG. 26, the AMF may further include a storage module 2002 configured to store program code and data of the AMF.

The processing module 2000 may be a processor or a controller, for example, may be a CPU, a general purpose processor, a DSP, an ASIC, an FPGA, or another programmable logic device, a transistor logic device, a hardware component, or any combination thereof. The processing module 2000 may implement or execute various example logical blocks, modules, and circuits described with reference to content disclosed in the embodiments of the present application. The foregoing processor may be a combination of processors implementing a computing function, for example, a combination of one or more microprocessors, or a combination of the DSP and a microprocessor. The communications module 2001 may be a transceiver, a transceiver circuit, a communications interface, or the like. The storage module 2002 may be a memory.

When the processing module 2000 is a processor, the communications module 2001 is a transceiver, and the storage module 2002 is a memory, the processor, the transceiver, and the memory may be connected through a bus. The bus may be a PCI bus, an EISA bus, or the like. The bus may be classified into an address bus, a data bus, a control bus, or the like.

When an integrated unit is used, an embodiment of the present application provides a PCF, and the PCF may include a processing module and a communications module. The processing module may be configured to control and manage an action of the PCF. For example, the processing module may perform a related step performed by the update module. The communications module may be configured to support the PCF in communicating with another network entity. For example, the communications module may be configured to support the second PCF in performing related actions performed by the receiving module and the sending module. Optionally, the SMF may further include a storage module configured to store program code and data of the SMF.

The processing module may be a processor or a controller, for example, may be a CPU, a general purpose processor, a DSP, an ASIC, an FPGA, or another programmable logic device, a transistor logic device, a hardware component, or any combination thereof. The processing module may implement or execute various example logical blocks, modules, and circuits described with reference to content disclosed in the embodiments of the present application. The foregoing processor may be a combination of processors implementing a computing function, for example, a combination of one or more microprocessors, or a combination of the DSP and a microprocessor. The communications module may be a transceiver, a transceiver circuit, a communications interface, or the like. The storage module may be a memory.

When the processing module is a processor, the communications module is a transceiver, and the storage module is a memory, the processor, the transceiver, and the memory may be connected through a bus. The bus may be a PCI bus, an EISA bus, or the like. The bus may be classified into an address bus, a data bus, a control bus, or the like.

All or some of the foregoing embodiments may be implemented using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of the present application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid-state drive (SSD)), or the like.

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A method comprising:

sending, by a second visited access and mobility management function apparatus that previously served a terminal and to a first visited access and mobility management function apparatus serving the terminal, a policy control function identifier identifying a policy control function apparatus that has stored a context of the terminal and that was previously used by the second visited access and mobility management function apparatus, the first visited access and mobility management function apparatus and the second visited access and mobility management function apparatus belonging to a same visited public land mobile network (VPLMN), and the policy control function apparatus comprising a home policy control function apparatus in a home public land mobile network (HPLMN) and a visited policy control function apparatus in the VPLMN;

receiving, by the second visited access and mobility management function apparatus from the first visited access and mobility management function apparatus, a message which indicates that the terminal is registered with the first visited access and mobility management function apparatus successfully and which includes a first indication information indicating that the first visited access and mobility management function apparatus has determined to select a target policy control function apparatus other than the policy control function apparatus identified by the policy control function identifier; and initiating, based on the first indication information in the message and by the second visited access and mobility management function apparatus, a procedure to delete the context of the terminal stored in the policy control function apparatus identified by the policy control function identifier.

2. The method of claim 1, further comprising receiving, prior to initiating the procedure, a terminal context management deletion notification from a unified data management function apparatus.

3. The method of claim 1, wherein the policy control function identifier comprises at least one of an Internet Protocol (IP) address of the policy control function apparatus, an IP prefix of the policy control function apparatus, or a fully qualified domain name (FQDN) of the policy control function apparatus.

4. The method of claim 1, further comprising:

receiving, by the first visited access and mobility management function apparatus serving the terminal and from the second visited access and mobility management function apparatus that previously served the terminal, the policy control function identifier identifying the policy control function apparatus that has stored the context of the terminal and that was previously used by the second visited access and mobility management function apparatus;

selecting, by the first visited access and mobility management function apparatus, the target policy control function apparatus according to policy control function information from a network function repository function apparatus or policy control function information stored in the first visited access and mobility management function apparatus;

sending, by the first visited access and mobility management function apparatus, the message to the second visited access and mobility management function apparatus; and obtaining, by the first visited access and mobility management function apparatus, policy information from the target policy control function apparatus.

5. The method of claim 4, wherein sending, by the first visited access and mobility management function apparatus, the message to the second visited access and mobility management function apparatus comprises sending, by the first visited access and mobility management function apparatus and in response to determining to select the target policy control function apparatus other than the policy control function apparatus identified by the policy control function identifier, the message comprising the first indication information to the second visited access and mobility management function apparatus.

6. The method of claim 4, further comprising obtaining, by the first visited access and mobility management function apparatus, policy information from the policy control function apparatus in response to determining the policy control function apparatus identified by the policy control function identifier as the target policy control function apparatus.

7. A method implemented by a first visited access and mobility management function apparatus serving a terminal, wherein the method comprises:

receiving, from a second visited access and mobility management function apparatus that previously served the terminal, a policy control function identifier identifying a policy control function apparatus that stored a context of the terminal and that was previously used by the second visited access and mobility management function apparatus, the first visited access and mobility management function apparatus and the second visited access and mobility management function apparatus belonging to a same visited public land mobile network (VPLMN), and the policy control function apparatus comprising a home policy control function apparatus in a home public land mobile network (HPLMN) and a visited policy control function apparatus in the VPLMN;

selecting a target policy control function apparatus according to policy control function information from a network function repository function apparatus or policy control function information stored in the first visited access and mobility management function apparatus;

sending to the second visited access and mobility management function apparatus a message which indicates that the terminal is registered with the first visited access and mobility management function apparatus successfully and which includes first indication information indicating that the first visited access and mobility management function apparatus has determined to select the target policy control function apparatus other than the policy control function apparatus identified by the policy control function identifier, and wherein the first indication information in the message is for initiating a procedure to delete the context of the terminal stored in the policy control function apparatus identified by the policy control function identifier; and obtaining policy information from the target policy control function apparatus.

8. The method of claim 7, wherein sending the first indication information to the second visited access and mobility management function apparatus comprises sending, in response to determining to select the target policy control function apparatus other than the policy control function apparatus identified by the policy control function identifier, the first indication information to the second visited access and mobility management function apparatus.

9. The method of claim 7, further comprising obtaining policy information from the policy control function apparatus in response to determining the policy control function apparatus identified by the policy control function identifier as the target policy control function apparatus.

10. The method of claim 9, further comprising sending, to the policy control function apparatus, second indication information indicating to update the context of the terminal in the policy control function apparatus.

11. The method of claim 7, wherein the policy control function identifier comprises at least one of an Internet Protocol (IP) address of the policy control function apparatus, an IP prefix of the policy control function apparatus, or a fully qualified domain name (FQDN) of the policy control function apparatus.

12. A second visited access and mobility management function apparatus that previously served a terminal, wherein the second visited access and mobility management function apparatus comprises:

one or more processors coupled to a memory storing instructions, wherein when the instructions are executed by the one or more processors, the second access and mobility management function apparatus is caused to:

send, to a first visited access and mobility management function apparatus serving the terminal, a policy control function identifier identifying a policy control function apparatus that has stored a context of the terminal and that was previously used by the second visited access and mobility management function apparatus, the first visited access and mobility management function apparatus and the second visited access and mobility management function apparatus belong to a same visited public land mobile network (VPLMN), and the policy control function apparatus including a home policy control function apparatus in a home public land mobile network (HPLMN) and a visited policy control function apparatus in the VPLMN;

receive from the first visited access and mobility management function apparatus, a message which indicates that the terminal is registered with the first visited access and mobility management function apparatus successfully and which includes first indication information indicating that the first access and mobility function apparatus has determined to select a target policy control function apparatus other than the policy control function apparatus identified by the policy control function identifier; and initiate, based on the first indication information in the message, a procedure to delete the context of the terminal stored in the policy control function apparatus identified by the policy control function identifier.

13. The second visited access and mobility management function apparatus of claim 12, wherein the instructions further cause the second visited access and mobility management function apparatus to receive, prior to initiating the procedure, a terminal context management deletion notification from a unified data management function apparatus.

14. The second visited access and mobility management function apparatus of claim 12, wherein the policy control function identifier comprises at least one of an Internet Protocol (IP) address of the policy control function apparatus, an IP prefix of the policy control function apparatus, or a fully qualified domain name (FQDN) of the policy control function apparatus.

15. A first visited access and mobility management function apparatus serving a terminal, wherein the first visited access and mobility management function apparatus comprises:

one or more processors coupled to a memory storing instructions, wherein when the instructions are executed by the one or more processors, the first visited access and mobility management function apparatus is caused to:

receive, from a second visited access and mobility management function apparatus previously served the terminal, a policy control function identifier identifying a policy control function apparatus that has stored a context of the terminal and that was previously used by the second visited access and mobility management function apparatus, the first visited access and mobility management function apparatus and the second visited access and mobility management function apparatus belonging to a same visited public land mobile network (VPLMN), and the policy control function apparatus comprising a home policy control function apparatus in a home public land mobile network (HPLMN) and a visited policy control function apparatus in the VPLMN; select a target policy control function apparatus according to policy control function information from a network function repository function apparatus or policy control function information stored in the first visited access and mobility management function apparatus;

send, to the second visited access and mobility management function apparatus, a message that indicates that the terminal is registered with the first visited access and mobility management function apparatus successfully and that includes first indication information indicating that the first visited access and mobility management function apparatus had determined to select the target policy control function apparatus other than the policy control function apparatus identified by the policy control function identifier, and the first indication information in the message being for initiating a procedure to delete the context of the terminal stored in the policy control function apparatus identified by the policy control function identifier; and obtain, from the target policy control function apparatus, policy information.

16. The first visited access and mobility management function apparatus of claim 15, wherein sending the first indication information to the second visited access and mobility management function apparatus comprises sending, in response to determining to select the target policy control function apparatus other than the policy control function apparatus identified by the policy control function identifier, the first indication information to the second visited access and mobility management function apparatus.

17. The first visited access and mobility management function apparatus of claim 15, wherein the instructions further cause the first visited access and mobility management function apparatus to obtain policy information from the policy control function apparatus in response to determining the policy control function apparatus identified by the policy control function identifier as the target policy control function apparatus.

18. The first visited access and mobility management function apparatus of claim 15, wherein the policy control function identifier comprises at least one of an Internet Protocol (IP) address of the policy control function apparatus, an IP prefix of the policy control function apparatus, or a fully qualified domain name (FQDN) of the policy control function apparatus.

19. The first visited access and mobility management function apparatus of claim 17, wherein the instructions further cause the first visited access and mobility management function apparatus to send, to the policy control function apparatus, second indication information indicating to update the context of the terminal in the policy control function apparatus.

* * * * *